United States Patent
Isono

(10) Patent No.: US 8,052,227 B2
(45) Date of Patent: Nov. 8, 2011

(54) BRAKE APPARATUS FOR VEHICLE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 858 days.

(21) Appl. No.: 12/090,295

(22) PCT Filed: Oct. 18, 2007

(86) PCT No.: PCT/JP2007/070341
§ 371 (c)(1),
(2), (4) Date: Apr. 15, 2008

(87) PCT Pub. No.: WO2008/050668
PCT Pub. Date: May 2, 2008

(65) Prior Publication Data
US 2010/0171363 A1     Jul. 8, 2010

(30) Foreign Application Priority Data

Oct. 24, 2006    (JP) ................................ 2006-288769
Oct. 5, 2007    (JP) ................................ 2007-262433

(51) Int. Cl.
*B60T 8/36*     (2006.01)
(52) U.S. Cl. ................... 303/119.2; 303/13; 303/DIG. 2
(58) Field of Classification Search ............... 303/119.1, 303/13, 115.2, DIG. 2, DIG. 4, 117.1, 115.4, 303/119.2
See application file for complete search history.

(56) References Cited

U.S. PATENT DOCUMENTS

| 4,832,416 A | | 5/1989 | Kaes et al. | |
| 4,890,891 A | * | 1/1990 | Leiber | 303/115.4 |
| 5,123,717 A | | 6/1992 | Willmann | |
| 5,221,126 A | | 6/1993 | Inoue | |
| 5,273,348 A | | 12/1993 | Yagi et al. | |
| 5,372,412 A | | 12/1994 | Yagi | |
| 5,609,399 A | | 3/1997 | Feigel et al. | |
| 5,713,640 A | | 2/1998 | Feigel et al. | |
| 5,997,106 A | * | 12/1999 | Takayama | 303/122.05 |
| 6,247,765 B1 | * | 6/2001 | Oyama | 303/119.2 |

FOREIGN PATENT DOCUMENTS

EP    0 469 978 A2    2/1992
(Continued)

OTHER PUBLICATIONS

Office Action issued Jun. 22, 2011 in Chinese Patent Application No. 200780021719.1 (with English translation).

*Primary Examiner* — Melanie Torres Williams
(74) *Attorney, Agent, or Firm* — Oblon, Spivak, McClelland, Maier & Neustadt, L.L.P.

(57) ABSTRACT

A brake apparatus for a vehicle has a master cylinder (11) having a front pressure chamber ($R_1$) and a rear pressure chamber ($R_2$) defined by a drive piston (13) in a cylinder (12). The brake apparatus also has a pressure control valve (44) which can output a control pressure obtained by adjusting a hydraulic pressure from an accumulator (42) to the rear pressure chamber ($R_2$) and wheel cylinders (21RR and 21RL) by coupling wheel cylinders (21FR and 21FL) to the front pressure chamber ($R_1$) and moving a drive valve (56) by an electromagnetic force based on a target control pressure, and which can output a control pressure obtained by adjusting a hydraulic pressure from the accumulator (42) by moving the drive valve (56) by an external piston (58) that is moved by an external pressure from the front pressure chamber ($R_1$), to the rear pressure chamber ($R_2$) and wheel cylinders (21RR and 21RL).

15 Claims, 11 Drawing Sheets

FOREIGN PATENT DOCUMENTS

| | | |
|---|---|---|
| EP | 0 469 978 A3 | 2/1992 |
| JP | 63 159169 | 7/1988 |
| JP | 3 503269 | 7/1991 |
| JP | 2005 14754 | 1/2005 |
| JP | 2005 153555 | 6/2005 |
| WO | 01 30627 | 5/2001 |

* cited by examiner

BRAKE APPARATUS FOR VEHICLE

TECHNICAL FIELD

The present invention relates to a brake apparatus for a vehicle for electronically controlling a braking force applied to the vehicle in accordance with a brake operation of an occupant.

BACKGROUND ART

As a brake apparatus for a vehicle or an electronically-controlled brake apparatus for electrically controlling a braking force of the brake apparatus in accordance with a brake operation force, an operation amount, or the like input from a brake pedal, that is, the hydraulic pressure supplied to a wheel cylinder for driving the brake apparatus, an ECB (Electronically controlled Brake) for controlling a braking force by a hydraulic pressure accumulated in an accumulator is known.

In the ECB, the hydraulic pressure boosted by a pump is accumulated in the accumulator and adjusted in response to a brake request of the driver, and the resultant pressure is supplied to the wheel cylinder as the brake apparatus. When the driver operates the brake pedal, a master cylinder generates a hydraulic pressure according to the operation amount. A part of the hydraulic oil flows in a stroke simulator, and the operation amount of the brake pedal is adjusted in accordance with the pedal effort (operation force) on the brake pedal. On the other hand, a brake ECU sets a target reduction speed of the vehicle in accordance with a pedal stroke, determines distribution of braking forces to be applied to the wheels, and a predetermined hydraulic pressure is applied from the accumulator to each of the wheel cylinders.

The ECB sets a proper brake hydraulic pressure according to the brake operation input from the brake pedal and supplies a proper hydraulic pressure from the accumulator to each of the wheel cylinders, thereby electrically controlling the braking force. Consequently, when a power supply unit fails, a proper hydraulic pressure cannot be supplied to the wheel cylinders. There is, for example, a power supply unit for a vehicle disclosed in Patent Document 1 as a technique for making an electronically controlled unit such as a brake apparatus operate normally even when the power supply unit fails.

The power supply unit for a vehicle described in Patent Document 1 includes, as an auxiliary power supply, a power supply backup unit using a capacitor unit made of a plurality of capacitors. The power supply unit has a power supply device that enables power from the capacitor unit to be supplied also when a battery is normal, and a forced-operation device for making the power supply device operate. In a normal state, the operation state of the power supply unit is checked.
Patent Document 1: Japanese Patent Application Laid-Open No. 2005-014754

DISCLOSURE OF INVENTION

Problem to be Solved by the Invention

In the above-described conventional power supply unit for a vehicle, a battery and an auxiliary power supply (capacitor unit) are provided. The power supply unit includes the power supply device for enabling power from the capacitor unit to be supplied also in the normal state of the battery, and the operation state of the power supply device is checked. Since the capacitor unit is mounted as the auxiliary power supply on the vehicle in addition to the battery usually used, not only the manufacture cost but also the weight of the vehicle increase, and it causes deterioration in fuel consumption.

The present invention has been achieved to solve such a problem and an object of the invention is to provide a brake apparatus for a vehicle realizing improvement in reliability and safety by assuring a proper braking force by enabling a hydraulic pressure to be supplied to a wheel cylinder even when a power supply unit fails.

Means for Solving Problem

To solve the problems as described above and to achieve an object, a brake apparatus for a vehicle of the present invention includes an operation member on which a braking operation is performed by an occupant; a master cylinder in which a front pressure chamber and a rear pressure chamber are defined by movably supporting a drive piston in a cylinder and which can output a hydraulic pressure in the front pressure chamber by moving the drive piston by the operation member; a control pressure setting unit for setting a target control pressure according to an operation force input from the operation member to the drive piston; a hydraulic pressure supplying source; a wheel cylinder coupled to the front pressure chamber and generating a braking force to a wheel; and a pressure control valve capable of adjusting a hydraulic pressure from the hydraulic pressure supplying source by moving a drive valve by an electromagnetic force on the basis of the target control pressure, outputting the adjusted hydraulic pressure to the rear pressure chamber and the wheel cylinder, adjusting a hydraulic pressure from the hydraulic pressure supplying source by moving the drive valve by an external piston which is moved by the hydraulic pressure from the front pressure chamber, and outputting the adjusted hydraulic pressure to the rear pressure chamber and the wheel cylinder.

In the brake apparatus for a vehicle of the present invention, the pressure control valve has a hollow-shaped housing provided with a high-pressure port, a pressure reduction port, a control pressure port, and an external pressure port, the high-pressure port is coupled to the hydraulic pressure supplying source, the pressure reduction port is coupled to a reservoir tank, the control pressure port is coupled to the rear pressure chamber, the external pressure port is coupled to the front pressure chamber, the drive valve and the external piston are supported in series in the housing so as to be movable relative to each other, the drive valve is supported so as to be energized in a direction of interrupting the high-pressure port and the control pressure port, the pressure reduction port and the control pressure port are interrupted and the high-pressure port and the control pressure port are allowed to be communicated with each other by moving the drive valve with an electromagnetic force, the pressure reduction port and the control pressure port are communicated with each other and the high-pressure port and the control pressure port can be interrupted by reducing the electromagnetic force of the solenoid and decreasing drive force of the drive valve, and the pressure reduction port and the control pressure port are interrupted and the high-pressure port and the control pressure port can be communicated with each other by moving the drive valve via the external piston by a hydraulic pressure from the front pressure chamber.

In the brake apparatus for a vehicle of the present invention, the drive piston has a step portion, and pressure reception area of the front pressure chamber is set to be larger than pressure reception area of the rear pressure chamber.

In the brake apparatus for a vehicle of the present invention, the hydraulic pressure supplying source has an accumulator.

In the brake apparatus for a vehicle of the present invention, the drive piston has an input piston and a pressure piston disposed in series in a cylinder, an operation force on the operation member can be entered to the input piston, the front pressure chamber is defined in front of the pressure piston, the rear pressure chamber is defined between the input piston and the pressure piston, a reaction force chamber is defined for the input piston, and the hydraulic pressure supplying source is coupled to the reaction force chamber via a reaction control valve.

In the brake apparatus for a vehicle of the present invention, the wheel cylinder on a front wheel side is coupled to the front pressure chamber, and the wheel cylinder on a rear wheel side is coupled to the rear pressure chamber.

In the brake apparatus for a vehicle of the present invention, a hydraulic pressure adjusted by the pressure control valve is output to the rear pressure chamber, thereby enabling a hydraulic pressure in the front pressure chamber to be output to first and second wheel cylinders, and a hydraulic line coupling the first and second wheel cylinders is provided with an open/close valve.

In the brake apparatus for a vehicle of the present invention, the hydraulic line coupling the first and second wheel cylinders is provided with the open/close valve and a power separating mechanism.

In the brake apparatus for a vehicle of the present invention, a hydraulic line coupling the front pressure chamber and the wheel cylinder is provided with a master cut valve, a hydraulic pressure adjusted by the pressure control valve can be output to the wheel cylinder when the master cut valve is closed, the hydraulic pressure in the front pressure chamber can be output to the wheel cylinder when the master cut valve is opened, and a hydraulic pressure adjusted by the pressure control valve can be output to the rear pressure chamber and the wheel cylinder.

In the brake apparatus for a vehicle of the present invention, a hydraulic line coupling the rear pressure chamber and a reservoir tank is provided with a negative pressure preventing valve.

In the brake apparatus for a vehicle of the present invention, a hydraulic line coupling the front pressure chamber and the rear pressure chamber is provided with a negative pressure preventing valve.

In the brake apparatus for a vehicle of the present invention, the hydraulic line coupling the front pressure chamber and the pressure control valve is provided with an open/close valve.

In the brake apparatus for a vehicle of the present invention, the external piston has a step portion, and pressure reception area of a first pressure chamber defined between the external piston and the drive valve on the front side of the external piston is set to be smaller than pressure reception area of a second pressure chamber on which a hydraulic pressure from the front pressure chamber acts on the rear side of the external piston.

In the brake apparatus for a vehicle of the present invention, the drive piston has an input piston and a pressure piston disposed in series in a cylinder, an operation force on the operation member can be entered to the input piston, the front pressure chamber is defined in front of the pressure piston, the rear pressure chamber is defined between the input piston and the pressure piston, a communication path for communicating the front pressure chamber and the rear pressure chamber with each other is provided, a closing member for closing the communication path when the input piston approaches the pressure piston is provided, the external piston has a step portion, and pressure reception area of the first pressure chamber defined between the external piston and the drive valve in front of the external piston is set to be larger than pressure reception area of a second pressure chamber on which a hydraulic pressure from the front pressure chamber acts on the rear side of the external piston.

In the brake apparatus for a vehicle of the present invention, the drive piston has an input piston and a pressure piston disposed in series in a cylinder, an operation force on the operation member can be entered to the input piston, the front pressure chamber is defined in front of the pressure piston, the rear pressure chamber is defined between the input piston and the pressure piston, a hydraulic pressure can be supplied to the front pressure chamber and the rear pressure chamber from the pressure control valve, the external piston has a step portion, and pressure reception area of a first pressure chamber defined between the external piston and the drive valve on the front side of the external piston is set to be larger than pressure reception area of a second pressure chamber on which the hydraulic pressure from the front reaction chamber acts on the rear side of the external piston.

Effect of the Invention

A brake apparatus for a vehicle of the present invention has a master cylinder in which a front pressure chamber and a rear pressure chamber are defined by movably supporting a drive piston in a cylinder and which can output a hydraulic pressure in the front pressure chamber by moving a drive piston by an operation member. The brake apparatus has a pressure control valve capable of adjusting a hydraulic pressure from a hydraulic pressure supplying source by coupling a wheel cylinder for generating a braking force to a wheel to the front pressure chamber and moving a drive valve by an electromagnetic force on the basis of a target control pressure and outputting the adjusted hydraulic pressure to the rear pressure chamber and the wheel cylinder, and capable of adjusting a hydraulic pressure from the hydraulic pressure supplying source by moving the drive valve by an external piston which is moved by a hydraulic pressure from the front pressure chamber, and outputting the adjusted hydraulic pressure to the rear pressure chamber and the wheel cylinder.

Therefore, when the power supply unit is normal, the pressure control valve adjusts the hydraulic pressure from the hydraulic pressure supplying source by moving the drive valve by the electromagnetic force on the basis of the target control pressure, and outputs the proper control pressure to the rear pressure chamber and the wheel cylinder. Consequently, the wheel cylinder can apply a proper braking force to a wheel. On the other hand, when the power supply unit fails, the pressure control valve adjusts the hydraulic pressure from the hydraulic pressure supplying source by moving the drive valve by an external piston which is moved by a hydraulic pressure from the front pressure chamber, and outputs the proper control pressure to the rear pressure chamber and the wheel cylinder. As a result, the wheel cylinder can apply a proper braking force to the wheel. By always assuring a proper braking force, the reliability and safety can be improved.

Figure 1:
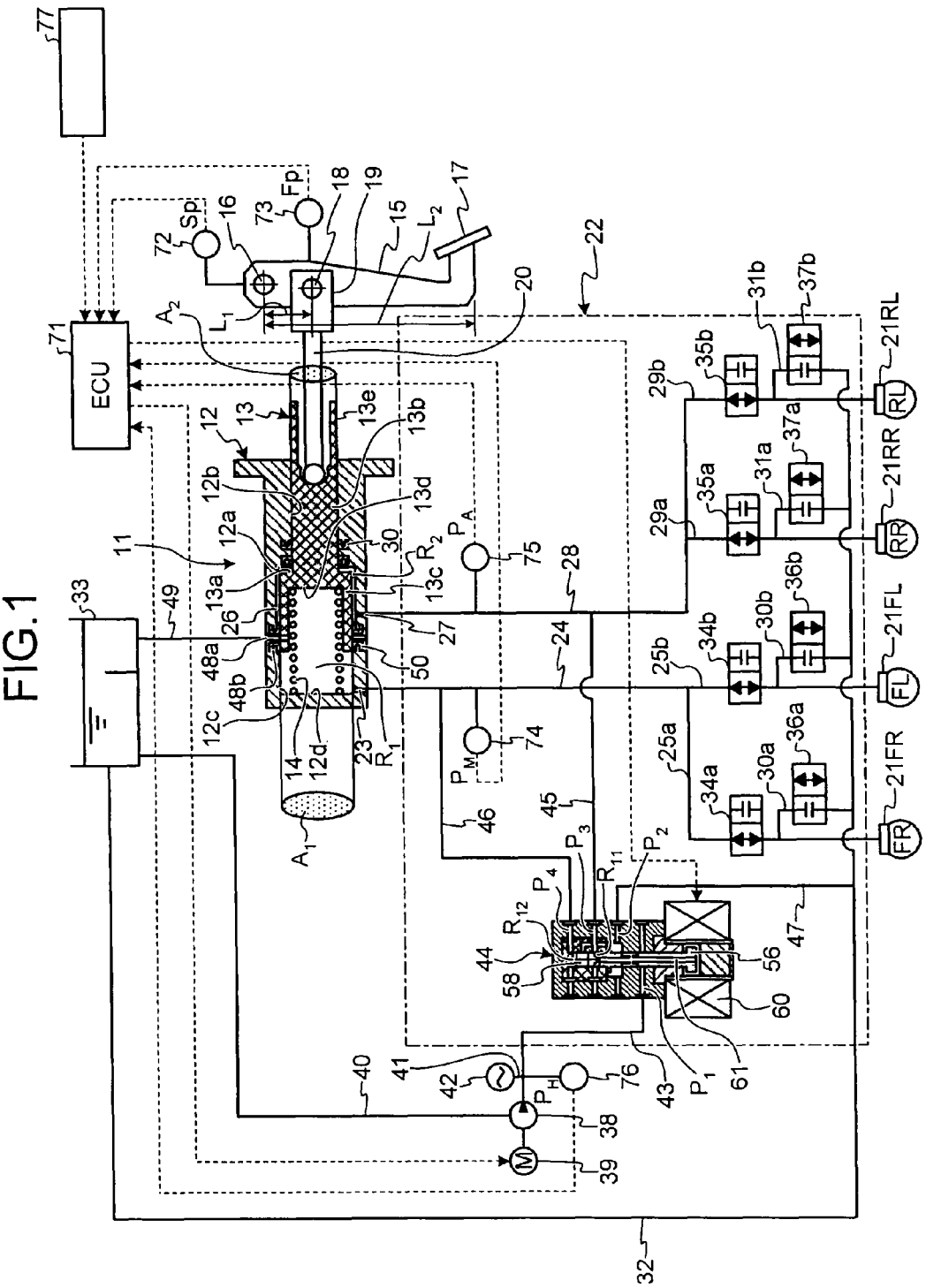
FIG. 1 is a schematic configuration diagram showing a brake apparatus for a vehicle according to a first embodiment of the present invention.

EXPLANATION OF LETTERS OR NUMERALS 11, 111, 611, 711 master cylinders
12, 112, 612, 712 cylinders
13 drive piston
14, 119, 617, 726 reaction force springs
15 brake pedal (operating member)
20 operation rod
21FR, 21FL, 21RR, 21RL wheel cylinders
22 ABS
24, 140, 624 first hydraulic pipes (hydraulic pressure supplying source)
28, 141, 626 second hydraulic pipes (hydraulic pressure supplying source)
32 third hydraulic pipe
33 reservoir tank
38, 122 hydraulic pumps (hydraulic pressure supplying sources)
42, 127 accumulators (hydraulic pressure supplying sources)
43, 215, 630 high-pressure supply pipes
44, 212, 213, 214, 511, 631 pressure control valves
45, 216, 219, 221, 222, 633 control pressure supply pipes
46, 220, 624 external pressure supply pipes
47, 224 reduced-pressure supply pipes
56, 514 drive valves
57, 515 return springs
58, 518, 632 external pistons
71 electronic control unit, ECU (control pressure setting means)
72 stroke sensor
73 pedal effort sensor
74 first pressure sensor
75 second pressure sensor
76 pressure sensor
78 pressure sensor
113, 613 input pistons (drive pistons)
114, 614 pressure pistons (drive pistons)
120, 620 energization springs
121, 621 communication paths
131 high-pressure branch pipe
132, 636 reaction force control valves
133, 223 reaction force pressure supply pipes
135 reduced-pressure supply pipe
217 power separating mechanism
237 external pressure branch pipe
238 open/close valve
251 third pressure sensor
252 fourth pressure sensor
253 fifth pressure sensor
312 simulator cut valve
313 stroke simulator
314, 315 master cut valves
318 open/close valve
320, 412 negative pressure preventing valves
622 seal member (shut-off member)
635 fourth hydraulic pipe
$R_1$ front pressure chamber
$R_2$ rear pressure chamber
$R_3$ circulating pressure chamber
$R_4$ reaction force chamber
$R_5$ pressure absorption chamber
$R_{11}$ first pressure chamber
$R_{12}$ second pressure chamber
$R_{13}$ reduced-pressure chamber
$P_1$ high pressure port
$P_2$ pressure reduction port
$P_3$ control pressure port
$P_4$ external pressure port

BEST MODES FOR CARRYING OUT THE INVENTION

Embodiments of a brake apparatus for a vehicle of the present invention will be described in detail hereinbelow with reference to the drawings. The present invention is not limited to the embodiments.

First Embodiment

Figure 2:
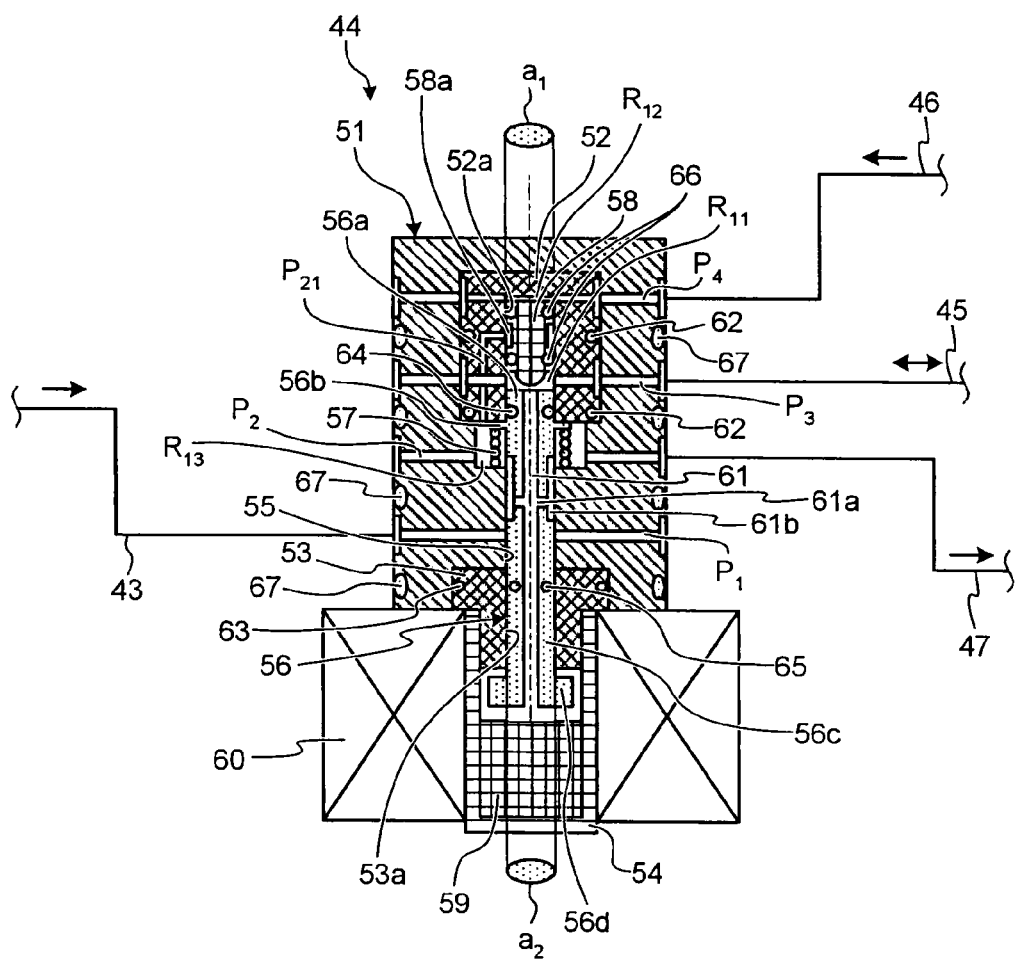
FIG. 2 is a cross sectional diagram of a pressure control valve in the brake apparatus for a vehicle of the first embodiment.

FIG. 1 is a schematic configuration diagram showing a brake apparatus for a vehicle according to a first embodiment of the invention. FIG. 2 is a cross sectional diagram of a pressure control valve in the brake apparatus for a vehicle of the first embodiment.

In the brake apparatus for a vehicle of the first embodiment, as shown in FIG. 1, a master cylinder 11 is constructed so that a drive piston 13 is supported movably in the axial direction in a cylinder 12. The cylinder 12 has a cylindrical shape whose bottom end is open and whose front end is closed. A step portion 12a is formed in an almost intermediate position in the axial direction on the inside, thereby forming a small-diameter part 12b on the base end side and forming a large-diameter part 12c on the front end side. In the cylinder 12, the drive piston 13 is supported movably in the axial direction. The drive piston 13 has a step portion 13a, so that a small-diameter piston 13b movably fit in the small-diameter part 12b of the cylinder 12 and a large-diameter piston 13c movably fit in the large-diameter part 12c are integrally formed.

In the drive piston 13, the large-diameter piston 13c comes into contact with a bottom 12d of the cylinder 12 on the forward side, and the step portion 13a comes into contact with the step portion 12a of the cylinder 12, thereby regulating the moving stroke. In the drive piston 13, an opening 13d is formed at the tip of the large-diameter piston 13c. The drive piston 13 is supported in a position where the step portion 13a comes into contact with the step portion 12a by the energizing force of a reaction force spring 14 stretched between the bottom 12d of the cylinder 12 and the opening 13d.

The upper end of a brake pedal 15 as an operating member is supported swingably by a support shaft 16 to an attachment bracket of a not-shown vehicle body. A pedal 17 which can be stepped on by the driver is attached to the lower end of the brake pedal 15. A clevis 19 is attached to an intermediate part of the brake pedal 15 by a coupling shaft 18. The base end of an operation rod 20 is coupled to the clevis 19, and the front end of the operation rod 20 is coupled to a coupling part 13e of the drive piston 13. Therefore, when the driver steps on the pedal 17 and the brake pedal 15 is operated, the operation force is transmitted to the drive piston 13 via the operation rod 20, and the drive piston 13 can move forward against the energizing force of the reaction force spring 14.

By disposing the drive piston 13 movably in the cylinder 12, the space of the cylinder 12 is defined into a front pressure chamber $R_1$ in the forward direction (left in FIG. 1) of the large-diameter piston 13c and a rear pressure chamber $R_2$ in the backward direction (right in FIG. 1) in the large-diameter piston 13b of the drive piston 13. In this case, since the drive piston 13 has the step portion 13a, a pressure reception area $A_1$ of the front pressure chamber $R_1$ is set to be larger than a pressure reception area $A_2$ of the rear pressure chamber $R_2$, thereby setting a predetermined servo ratio.

On the other hand, front wheels FR and FL and rear wheels RR and RL are provided with wheel cylinders 21FR, 21FL, 21RR, and 21RL for operating a brake apparatus, and can be operated by an ABS (Antilock Brake apparatus) 22. To a first pressure port 23 communicated with the front pressure chamber $R_1$ of the master cylinder 11, one end of a first hydraulic pipe 24 is coupled. The other end of the first hydraulic pipe 24 is branched to two hydraulic supply pipes 25a and 25b which are coupled to the wheel cylinders 21FR and 21FL of the brake apparatus disposed in the front wheels FR and FL. One end of a second hydraulic pipe 28 is coupled to a second pressure port 27 communicated with the rear pressure chamber $R_2$ in the master cylinder 11 via an annular-shaped coupling path 26. The other end of the second hydraulic pipe 28 is branched to two hydraulic supply pipes 29a and 29b which are coupled to the wheel cylinders 21RR and 21RL of the brake apparatus disposed in the rear wheels RR and RL.

The base ends of hydraulic exhaust pipes 30a and 30b are coupled to the hydraulic supply pipes 25a and 25b branched from the first hydraulic pipe 24. The base ends of hydraulic exhaust pipes 31a and 31b are coupled to the hydraulic supply pipes 29a and 29b branched from the second hydraulic pipe 28. The front ends of the hydraulic exhaust pipes 30a, 30b, 31a, and 31b are gathered and coupled to a reservoir tank 33 via a third hydraulic pipe 32.

In the hydraulic supply pipes 25a, 25b, 29a, and 29b, electromagnetic pressure boosting valves 34a, 34b, 35a, and 35b are disposed on the upstream side of the parts of connection to the hydraulic exhaust pipes 30a, 30b, 31a, and 31b (on the side of the first and second hydraulic pipes 24 and 28). In the hydraulic exhaust pipes 30a, 30b, 31a, and 31b, electromagnetic pressure reducing valves 36a, 36b, 37a, and 37b are disposed. The pressure boosting valves 34a, 34b, 35a, and 35b are normal-open-type valves and are closed when power is supplied. On the other hand, the pressure reducing valves 36a, 36b, 37a, and 37b are normal-close-type valves and are open when power is supplied.

A hydraulic pump 38 can be driven by a motor 39 and is coupled to the reservoir tank 33 via a pipe 40 and coupled to an accumulator 42 via a pipe 41. Therefore, when the motor 39 is driven, the hydraulic pump 38 can boost pressure by supplying hydraulic fluid stored in the reservoir tank 33 to the accumulator 42, and the accumulator 42 can store the hydraulic fluid of predetermined pressure. In the embodiment, a hydraulic supply source is constructed by the hydraulic pump 38 and the accumulator 42.

The accumulator 42 is coupled to a pressure control valve 44 via a high-pressure supply pipe 43. The pressure control valve 44 adjusts the hydraulic pressure accumulated in the accumulator 42 by electromagnetic force and can output the adjusted hydraulic pressure to the rear pressure chamber $R_2$ of the master cylinder 11 and the wheel cylinders 21RR and 21RL of the ABS 22. The pressure control valve 44 adjusts the hydraulic pressure accumulated in the accumulator 42 by hydraulic pressure from the front pressure chamber $R_1$ in the master cylinder 11 and can output the adjusted hydraulic pressure to the rear pressure chamber $R_2$ in the master cylinder 11 and the wheel cylinders 21RR and 21RL of the ABS 22. Consequently, the pressure control valve 44 is coupled to the second hydraulic pipe 28 via a control pressure supply pipe 45, coupled to the first hydraulic pipe 24 via an external pressure supply pipe 46, and coupled to the third hydraulic pipe 32 via a reduced-pressure supply pipe 47.

In the front pressure chamber $R_1$ in the master cylinder 11, auxiliary ports 48a and 48b are formed so as to penetrate the cylinder 12 and the large-diameter piston 13c of the drive piston 13. The auxiliary ports 48a and 48b are coupled to the reservoir tank 33 via a hydraulic pipe 49. By attaching a one-way seal 50 in a main part between the cylinder 12 and the drive piston 13, leakage of hydraulic pressure is prevented.

The pressure control valve 44 will be described in detail. In the pressure control valve 44, as shown in FIG. 2, a housing 51 has a cylindrical shape having an U shape in cross section with the bottom side open. A cylindrical-shaped upper support block 52 having a U shape in cross section with the bottom side open is fit in the upper part of the housing 51. A lower support block 53 having a cylindrical shape is fit in the lower part of the housing 51. A cylindrical-shaped case 54 having a U-shape in cross section with the upper part open is fit in the lower part of the lower support block 53, thereby making the inside sealed by the housing 51, the upper support block 52, the lower support block 53, and the case 54.

In the housing 51, a support hole 55 is formed in the vertical direction in an almost center part in the vertical direction, and a drive valve 56 is movably supported by the support hole 55. The drive valve 56 has a rod shape and is constructed by a first support part 56a formed in a column shape at the upper end, a first flange 56b formed below the first support part 56a in the upper part, a second support part 56c formed in a column shape with predetermined length below the first flange 56b, and a second flange 56d formed at the lower end. The first support part 56a fits in a support hole 52a in the upper support block 52 and the second support part 56c fits in the support hole 55 in the housing 51 and a support hole 53a in the lower support block 53, so that the drive valve 56 is supported movably in the vertical direction in the housing 51. A return spring 57 is interposed between the housing 51 and the first flange 56b in the drive valve 56. The drive valve 56 is energized and supported in a position where the first flange 56b is in contact with the under face of the upper support block 52.

Therefore, the drive valve 56 is supported movably in the vertical direction in the housing, energized upward by the energization force of the return spring 57, and positioned in a position where the first flange 56b is in contact with the under face of the upper support block 52.

The support hole 52a opening downward is formed in the upper support block 52, and an external piston 58 having a column shape is fit in the support hole 52a so as to be movable in the vertical direction. The external piston 58 is disposed above the drive valve 56 in series. The lower end face of the external piston 58 has a spherical shape and can come into contact with the top face of the drive valve 56.

On the other hand, in a lower part of the case 54, an attracting member 59 made of iron is fixed with a predetermined interval so as to face the second flange 56d of the drive valve 56. On the outside of the case 54, a coil 60 is wound so as to face the attracting member 59. The attracting member 59 can generate an attraction force by an electromagnetic force generated by passing current to the coil 60. By the attraction force, the drive valve 56 can be attracted via the second flange 56d.

Therefore, the drive valve 56 is energized upward by the energizing force of the return spring 57, and the first flange 56b is positioned in contact with the upper support block 52. By the electromagnetic force generated by passing current to the coil 60, the attracting member 59 generates the attraction force. By the attraction force, the second flange 56d is attracted so that the drive valve 56 can be moved downward against the energizing force of the return spring 57.

Further, since the drive valve 56 and the external piston 58 engage with each other and are movably supported in the housing 51, a first pressure chamber $R_{11}$ and a second pressure chamber $R_{12}$ are defined on one side and on the other side in the axial direction of the external piston 58 by the housing 51, the upper support block 52, the drive valve 56, and the external piston 58. In this case, the first pressure chamber $R_{11}$ is defined by the upper support block 52, the drive valve 56, and the external piston 58, and the second pressure chamber $R_{12}$ is defined by the upper support block 52 and the external piston 58. A communication hole 61 is formed in a center portion of the drive valve 56 so as to penetrate in the axial direction. The upper end of the communication hole 61 is communicated with the first pressure chamber $R_{11}$. A plurality of coupling ports 61a are formed in the radial direction in an almost intermediate position in the axial direction, and an annular coupling groove 61b is positioned on the outside of the coupling ports 61a and formed in the peripheral face of the drive valve 56. The communication hole 61, the coupling ports 61a, and the coupling groove 61b are communicated with each other.

In the housing 51, a high-pressure port $P_1$ via which the outside and the support hole 55 are communicated with each other is formed, and a pressure reduction port $P_2$ via which the outside and a reduced-pressure chamber $R_{13}$ housing the return spring 57 are communicated with each other is formed. The high-pressure port $P_1$ and the pressure reduction port $P_2$ can be communicated with the communication hole 61 via the coupling groove 61b and the coupling ports 61a in different movement positions in the drive valve 56. A control pressure port $P_3$ via which the outside and the support hole 52a are communicated with each other is formed in the housing 51 and the upper support block 52. The control pressure port $P_3$ is communicated with the first pressure chamber $R_{11}$. The high-pressure port $P_1$ is coupled to the accumulator 42 (see FIG. 1) via the high-pressure supply pipe 43, the pressure reduction port $P_2$ is coupled to the third hydraulic pipe 32 via the reduced-pressure supply pipe 47, and the control pressure port $P_3$ is coupled to the second hydraulic pipe 28 via the control pressure supply pipe 45. The pressure reduction port $P_2$ is communicated with an annular groove 58a formed in the peripheral part of the external piston 58 via the reduced-pressure chamber $R_{13}$ and a coupling port $P_{21}$.

In this case, the outer diameters of the support parts 56a and 56c of the drive valve 56 are set so that a pressure reception area $a_1$ of the hydraulic pressure received by the first support part 56a of the drive valve 56 from the first pressure chamber $R_{11}$ and a pressure reception area $a_2$ of the hydraulic pressure received by the second support part 56c of the drive piston 13 have the relation $a_1 > a_2$. Consequently, with respect to the electromagnetic force applied from the coil 60 when the drive valve 56 moves downward, that is, the value of current to the coil 60, it is sufficient to assure the resultant force of the driving force corresponding to the difference $a_1 - a_2$ of the front and rear pressure reception faces in the drive valve 56 and the energizing force of the return spring 57 and the driving force corresponding to various sliding resistances. By setting the difference $a_1 - a_2$ of the pressure reception faces to a small value, power consumption can be reduced.

In the housing 51 and the upper support block 52, an external pressure port $P_4$ by which the outside and the support hole 52a are communicated with each other is formed in a position above the control pressure port $P_3$. One end of the external pressure port $P_4$ is communicated with the second pressure chamber $R_{12}$, and the other end is coupled to the first hydraulic pipe 24 via the external pressure supply pipe 46.

In this case, the control pressure acting on the first pressure chamber $R_{11}$ acts as an upward force on the external piston 58. On the other hand, the external pressure acting on the second pressure chamber $R_{12}$ acts as a downward force on the external piston 58. In the external piston 58 which movably fits in the support hole 52a in the upper support block 52, the pressure reception area in which the hydraulic pressure from the first pressure chamber $R_{11}$ acts and the pressure reception area in which the hydraulic pressure from the second pressure chamber $R_{12}$ acts are the same. That is, "control pressure×pressure reception area of external piston 58=external pressure×pressure reception area of external piston 58". The external piston 58 is floated and prevented from being fixedly attached to the upper support block 52.

Therefore, when current is not passed to the coil 60, the drive valve 56 is positioned in contact with the upper support block 52 by the energizing force of the return spring 57. The communication hole 61 in the drive valve 56 is communicated with the first pressure chamber $R_{11}$ and, on the other hand, the coupling port 61a and the coupling groove 61b are communicated with the pressure reduction port $P_2$ via a reduced-pressure chamber $R_{13}$. Thus, the control pressure port $P_3$ and the pressure reduction port $P_2$ are communicated with each other via the communication hole 61.

On the other hand, when current is passed to the coil 60, the drive valve 56 moves downward by the attraction force against the energizing force of the return spring 57. The coupling port 61a and the coupling groove 61b become communicated with the high-pressure port $P_1$ in a state where the communication hole 61 in the drive valve 56 is communicated with the first pressure chamber $R_{11}$, so that the high-pressure port $P_1$ and the control pressure port $P_3$ are communicated with each other via the communication hole 61.

A seal member 62 is interposed between the housing 51 and the upper support block 52, a seal member 63 is interposed between the housing 51 and the lower support block 53, seal members 64 and 65 are interposed between the support blocks 52 and 53 and the drive valve 56, and a seal member 66 is interposed between the upper support block 52 and the external piston 58, thereby assuring sealing performance. The housing 51 is supported by a not-shown casing of the ABS 22. A seal member 67 is interposed between the housing 51 and the casing, thereby assuring sealing performance.

In the pressure control valve 44 in the brake apparatus for a vehicle of the embodiment, when the coil 60 is in a magnetic neutral state, the drive valve 56 is in a position where it is in contact with the upper support block 52 by the return spring 57, the communication hole 61 in the drive valve 56 is communicated with the first pressure chamber $R_{11}$, and the coupling port 61a and the coupling groove 61b are communicated with the pressure reduction port $P_2$. Therefore, the control pressure port $P_3$ and the pressure reduction port $P_2$ are communicated with each other via the first pressure chamber $R_{11}$ and the communication hole 61 and, on the other hand, the high-pressure port $P_1$ and the control pressure port $P_3$ are in an interrupted state.

When current is passed to the coil 60 in this state, the drive valve 56 moves downward by generated attraction force against the energizing force of the return spring 57. At this time, the control pressure acting from the first pressure chamber $R_{11}$ and the external pressure acting from the second pressure chamber $R_{12}$ to the external piston 58 become equal to each other. Consequently, without an adverse influence exerted by the control pressure and the external pressure onto the driving force for moving the drive valve 56 downward, the drive valve 56 can be properly moved downward. When the drive valve 56 moves downward, the coupling port 61a and the coupling groove 61b are switched and become communicated with the high-pressure port $P_1$ in a state where the communication hole 61 in the drive valve 56 is communicated with the first pressure chamber $R_{11}$. Consequently, the high-pressure port $P_1$ and the control pressure port $P_3$ are communicated with each other via the communication hole 61 and, on the other hand, the pressure reduction port $P_2$ and the control pressure port $P_3$ are interrupted.

Therefore, a pressure acting from the high-pressure supply pipe 43 through the high-pressure port $P_1$, that is, a hydraulic fluid of high pressure flows from the coupling groove 61b to the communication hole 61 via the coupling port 61a, flows from the communication hole 61 to the first pressure chamber $R_{11}$, and is discharged as a control pressure from the control pressure port $P_3$ to the control pressure supply pipe 45. In this case, by controlling the movement amount of the drive valve 56 with the value of current to the coil 60, the control pressure discharged to the control pressure supply pipe 45 can be adjusted.

When the value of current passed to the coil 60 is decreased in this state, the attraction force generated decreases, and the drive valve 56 moves upward by the energizing force of the return spring 57. While the communication hole 61 in the drive valve 56 is communicated with the first pressure chamber $R_{11}$, the coupling port 61a and the coupling groove 61b are switched and communicated with the pressure reduction port $P_2$. Therefore, the pressure reduction port $P_2$ and the control pressure port $P_3$ are communicated with each other via the first pressure chamber $R_{11}$ and the communication hole 61 and, on the other hand, the high-pressure port $P_1$ and the control pressure port $P_3$ are interrupted.

Therefore, the control pressure, that is, the hydraulic fluid discharged from the first pressure chamber $R_{11}$ to the control pressure supply pipe 45 via the control pressure port $P_3$ is returned from the first pressure chamber $R_{11}$ to the communication hole 61, flows to the pressure reduction chamber $P_{13}$ via the coupling port 61a and the coupling groove 61b, and is discharged from the pressure reduction port $P_2$ to the reduced-pressure supply pipe 47.

The coil 60 is demagnetized, the control pressure port $P_3$ and the pressure reduction port $P_2$ are communicated with each other via the first pressure chamber $R_{11}$ and the communication hole 61. On the other hand, when the external pressure, that is, the hydraulic fluid is supplied from the external pressure supply pipe 46 to the second pressure chamber $R_{12}$ via the external pressure port $P_4$ in a state where the high-pressure port P1 and the control pressure port $P_3$ are interrupted, the external piston 58 moves downward and presses the drive valve 56 downward. The drive valve 56 moves downward against the energizing force of the return spring 57 and, as described above, the coupling port 61a and the coupling groove 61b become communicated with the high-pressure port $P_1$ in a state where the communication hole 61 in the drive valve 56 is communicated with the first pressure chamber $R_{11}$.

Therefore, the high-pressure port $P_1$ and the control pressure port $P_3$ are communicated with each other via the first pressure chamber $R_{11}$ and the communication hole 61 and, on the other hand, the pressure reduction port $P_2$ and the control pressure port $P_3$ are interrupted. As described above, the hydraulic fluid of high pressure is supplied via the high-pressure supply pipe 43 and the high-pressure port $P_1$, flows from the coupling groove 61b to the communication hole 61 via the coupling port 61a, flows from the communication hole 61 to the first pressure chamber $R_{11}$, and is discharged as a control pressure from the control pressure port $P_3$ to the control pressure supply pipe 45. In this case, by controlling the external pressure acting from the external pressure supply pipe 46 onto the second pressure chamber $R_{12}$ via the external pressure port $P_4$, the control pressure discharged to the control pressure supply pipe 45 can be adjusted.

In the brake apparatus for a vehicle of the embodiment constructed as described above, as shown in FIG. 1, an electronic control unit (ECU) 71 (control pressure setting means) sets a target control pressure according to an operation force (pedal effort) input from the brake pedal 15 to the drive piston 13, makes the set target control pressure act on the rear pressure chamber $R_2$, and assists the drive piston 13 so that a proper control pressure is output from the front pressure chamber $R_1$, a brake hydraulic pressure is given to each of the wheel cylinders 21FR, 21FL, 21RR, and 21RL via the ABS 22 to operate the cylinders, and the braking force is applied to the front wheels FR and FL and the rear wheels RR and RL.

The brake pedal 15 is provided with a stroke sensor 72 for detecting a pedal stroke Sp of the brake pedal 15, and a pedal effort sensor 73 for detecting a pedal effort Fp, and outputs the detection results to the ECU 71. The first and second hydraulic pipes 24 and 28 are provided with a first pressure sensor 74 and a second pressure sensor 75 for detecting hydraulic pressure, respectively. The first pressure sensor 74 detects a control pressure $P_M$ supplied from the front pressure chamber $R_1$ to the wheel cylinders 21FR and 21FL of the front wheels FR and FL via the first hydraulic pipe 24, and outputs the detection result to the ECU 71. On the other hand, the second pressure sensor 75 detects a control pressure $P_A$ supplied from the rear pressure chamber $R_2$ to the wheel cylinders 21RR and 21RL of the rear wheels RR and RL via the second hydraulic pipe 28, and outputs the detection results to the ECU 71.

Further, the high-pressure supply pipe 43 extending from the accumulator 42 to the pressure control valve 44 is provided with a pressure sensor 76 for detecting hydraulic pressure. The pressure sensor 76 detects a hydraulic pressure $P_H$ flowing in the high-pressure supply pipe 43 extending from the accumulator 42 to the pressure control valve 44 and outputs a detection result to the ECU 71. Each of the front wheels FR and FL and the rear wheels RR and RL is provided with a wheel speed sensor 77, and detected wheel speeds are output to the ECU 71.

Therefore, the ECU 71 sets the target control pressure $P_{MT}$ on the basis of the pedal effort Fp of the brake pedal 15 detected by the pedal effort sensor 73 (or the pedal stroke Sp detected by the stroke sensor 72) and controls the drive valve 56 in the pressure control valve 44. On the other hand, the ECU 71 feeds back the control pressure $P_M$ detected by the first pressure sensor 74 and controls so that the target control pressure $P_{MT}$ and the control pressure $P_M$ match each other. In this case, the ECU 71 has a map indicating the target control pressures $P_{MT}$ according to the pedal efforts Fp and controls the pressure control valve 44 on the basis of the map.

When the diameter of the small-diameter piston 13b is expressed as $A_A$ and the diameter of the large-diameter piston 13c is expressed as $A_M$, the servo ratio of the master cylinder 11 is set by $A_M/A_A$. In the case where the control pressure $P_M$ discharged from the front pressure chamber $R_1$ in the master cylinder 11 to the first hydraulic pipe 24 and applied to the wheel cylinders 21FR and 21FL of the front wheels FR and FL and the control pressure $P_A$ discharged from the rear pressure chamber $R_2$ in the master cylinder 11 to the second hydraulic pipe 28 and applied to the wheel cylinders 21RR and 21RL of the rear wheels RR and RL are set to the same pressure, it is sufficient to set the tilt as $Rp/A_A$ in the map expressing the target control pressure $P_{MT}$ for the pedal effort Fp. Rp denotes a lever ratio of the brake pedal 15 and is $L_2/L_1$.

A braking force control in the brake apparatus for a vehicle in the embodiment will be described concretely. As shown in FIGS. 1 and 2, when an occupant steps on the brake pedal 15, the drive piston 13 moves forward (to the left in FIG. 1) by the operation force. The pedal effort sensor 73 detects the pedal effort Fp, and the ECU 71 sets the target control pressure $P_{MT}$ on the basis of the pedal effort Fp. The ECU 71 controls the pressure control valve 44 on the basis of the target control pressure $P_{MT}$ to make the predetermined control pressure $P_A$ act on the rear pressure chamber $R_2$. The ECU 71 feeds back the control pressure $P_M$ detected by the first pressure sensor 74 and controls so that the target control pressure $P_{MT}$ and the control pressure $P_M$ match each other.

When current is passed to the coil 60 in the pressure control valve 44, the drive valve 56 moves downward by the generated attraction force against the energizing force of the return spring 57. The communication hole 61 becomes communicated with the high-pressure port $P_1$ via the coupling port 61a and the coupling groove 61b. The high-pressure port $P_1$ is communicated with the control pressure port $P_3$ through the communication hole 61 and the first pressure chamber $R_{11}$. On the other hand, the pressure reduction port $P_2$ and the control pressure port $P_3$ are interrupted. Consequently, the hydraulic pressure of the accumulator 42 is supplied from the high-pressure supply pipe 43 to the high pressure port $P_1$, supplied to the first pressure chamber $R_{11}$ via the communication hole 61, and supplied from the control pressure port $P_3$ to the second hydraulic pipe 28 via the control pressure supply pipe 45. The hydraulic pressure supplied to the second hydraulic pipe 28 acts on the rear pressure chamber $R_2$ to assist the drive piston 13, so that the proper control hydraulic pressure $P_M$ is discharged from the front pressure chamber $R_1$ to the first hydraulic pipe 24.

Therefore, the control pressure $P_M$ is applied from the first hydraulic pipe 24 to the wheel cylinders 21FR and 21FL of the front wheels FR and FL, and the control pressure $P_A$ is applied from the second hydraulic pipe 28 to the wheel cylinders 21RR and 21RL of the rear wheels RR and RL. Thus, the braking force according to the operation force of the brake pedal 15 of the occupant can be generated to the front wheels FR and FL and the rear wheels RR and RL.

In the case where a failure occurs in the power supply system, by controlling the value of current to the coil 60 in the pressure control valve 44, the brake hydraulic pressure applied to the wheel cylinders 21FR, 21FL, 21RR, and 21RL cannot be controlled to proper hydraulic pressure. In the embodiment, the pressure control valve 44 is provided with the external piston 58 operated by the pressure (external pressure) generated in the front pressure chamber $R_1$ in the master cylinder 11. The drive valve 56 is controlled by the external piston 58, so that proper control pressure can be output.

At the time of a failure in the power supply system, when an occupant steps on the brake pedal 15, the drive piston 13 moves forward by the operation force. By the forward movement of the drive piston 13, the front pressure chamber $R_1$ is pressurized. Consequently, the hydraulic pressure in the front pressure chamber $R_1$ is discharged as external pressure to the first hydraulic pipe 24, and acts on the pressure control valve 44 via the external pressure supply pipe 46.

In the pressure control valve 44, the external pressure acts on the second pressure chamber $R_{12}$ from the external pressure supply pipe 46 via the external pressure port $P_4$, and the external piston 58 moves downward, thereby pressing the drive valve 56 downward. The communication hole 61 becomes communicated with the high-pressure port $P_1$ via the coupling port 61a and the coupling groove 61b. The high-pressure port $P_1$ is communicated with the control pressure port $P_3$ through the communication hole 61 and the first pressure chamber $R_{11}$. On the other hand, the pressure reduction port $P_2$ and the control pressure port $P_3$ are interrupted. Consequently, the hydraulic pressure of the accumulator 42 is supplied from the high-pressure supply pipe 43 to the high pressure port $P_1$, supplied to the first pressure chamber $R_{11}$ via the communication hole 61, and supplied from the control pressure port P3 to the second hydraulic pipe 28 via the control pressure supply pipe 45. The hydraulic pressure supplied to the second hydraulic pipe 28 acts on the rear pressure chamber $R_2$ to assist the drive piston 13, so that the proper control pressure $P_M$ is discharged from the front pressure chamber $R_1$ to the first hydraulic pipe 24.

Therefore, even if a failure occurs in the power supply system, the control pressure $P_M$ is applied from the first hydraulic pipe 24 to the wheel cylinders 21FR and 21FL of the front wheels FR and FL, and the control pressure $P_A$ is applied from the second hydraulic pipe 28 to the wheel cylinders 21RR and 21RL of the rear wheels RR and RL. Thus, the braking force according to the operation force of the brake pedal 15 of the occupant can be generated to the front wheels FR and FL and the rear wheels RR and RL.

As described above, the brake apparatus for a vehicle of the first embodiment is provided with the master cylinder 11 in which the front pressure chamber $R_1$ and the rear pressure chamber $R_2$ are defined by movably supporting the drive piston 13 in the cylinder 12 and which can output the hydraulic pressure in the front pressure chamber $R_1$ by moving the drive piston 13 with the brake pedal 15. The brake apparatus has the pressure control valve 44 in which the wheel cylinders 21FR and 21FL are coupled to the front pressure chamber $R_1$ and the drive valve 56 is moved by the electromagnetic force based on the target control pressure, thereby enabling the control pressure obtained by adjusting the hydraulic pressure from the accumulator 42 to be output to the rear pressure chamber $R_2$ and the wheel cylinders 21RR and 21RL and, by moving the drive valve 56 by the external piston 58 moved by the external pressure from the front pressure chamber $R_1$, the control pressure obtained by adjusting the hydraulic pressure from the accumulator 42 can be output to the rear pressure chamber $R_2$ and the wheel cylinders 21RR and 21RL.

Therefore, when the power supply system is normal, the ECU 71 sets the target control pressure $P_{MT}$ according to the pedal effort Fp and controls the pressure control valve 44 on the basis of the target control pressure $P_{MT}$, thereby supplying the proper hydraulic pressure from the accumulator 42 to the rear pressure chamber $R_2$ by the pressure control valve 44 and assisting the drive piston 13. The proper control pressure can be supplied to each of the hydraulic pipes 24 and 28. The control oil is made act on the wheel cylinders 21FR, 21FL, 21RR, and 21RL via the ABS 22, and proper braking force according to the operation force of the brake pedal 15 of the occupant for the front wheels FR and FL and the rear wheels RR and RL can be generated.

On the other hand, when a failure occurs in the power supply system, the drive piston 13 moves according to the operation of the brake pedal 15, the front pressure chamber $R_1$ is pressurized, and the hydraulic pressure in the front pressure chamber $R_1$ acts as the external pressure on the pressure control valve 44. As a result, the proper hydraulic pressure is supplied from the accumulator 42 to the rear pressure chamber $R_2$ by the pressure control valve 44 to assist the drive piston 13. The proper control pressure can be supplied to the hydraulic pipes 24 and 28. The control oil can be made act on the wheel cylinders 21FR, 21FL, 21RR, and 21RL via the ABS 22, and proper braking force according to the operation force of the brake pedal 15 of the occupant can be generated to the front wheels FR and FL and the rear wheels RR and RL.

As described above, in the embodiment, by applying the pressure control valve 44 which is operated by the electromagnetic force and the external pressure, the control pressure according to the operation of the brake pedal 15 of the occupant can be reliably generated irrespective of the state of the power supply system. As a result, the hydraulic path is simplified and the structure can be simplified. In addition, the manufacture cost can be reduced. Moreover, proper brake control can be realized, and reliability and safety can be improved.

Second Embodiment

Figure 3:
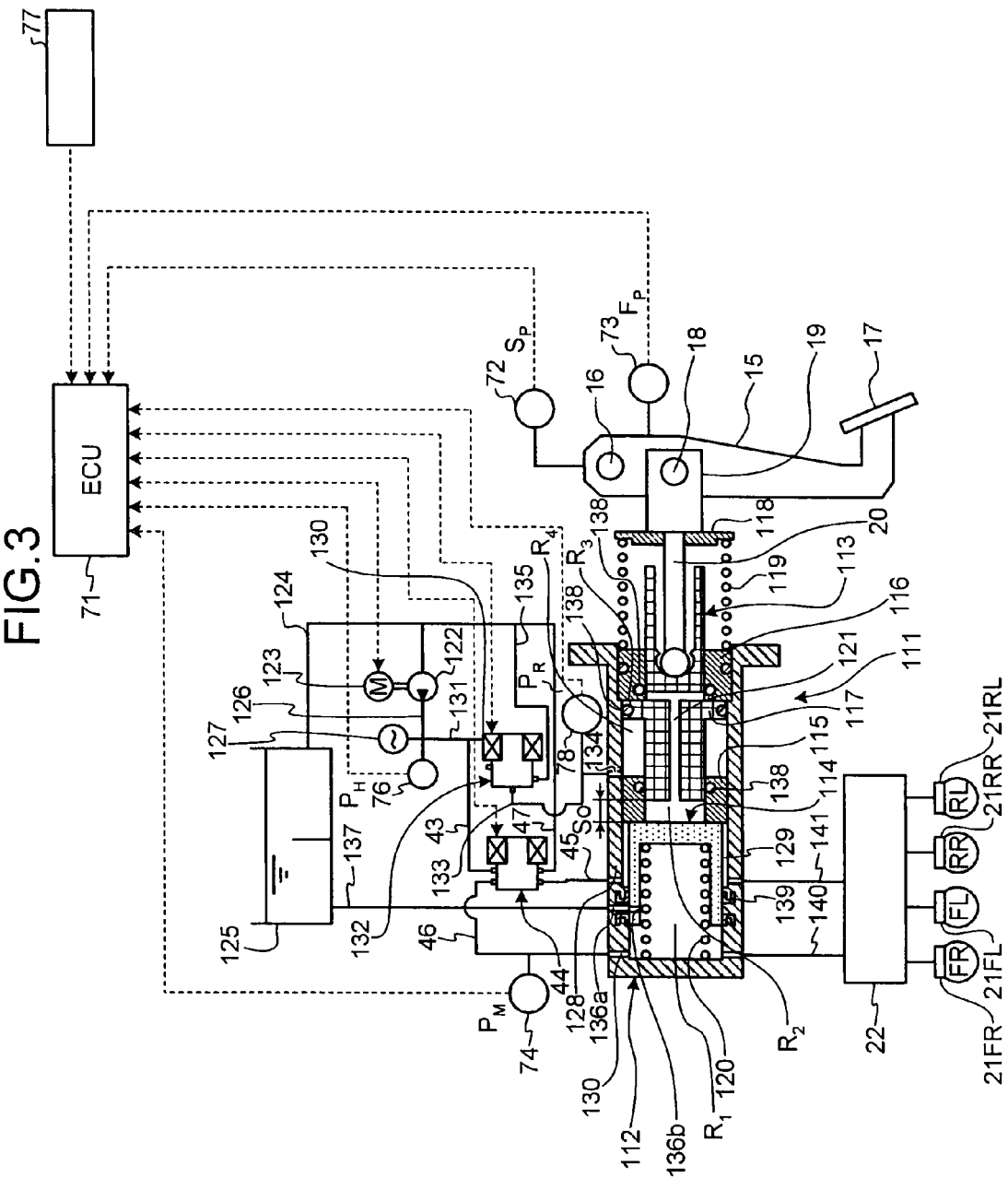
FIG. 3 is a schematic configuration diagram showing a brake apparatus for a vehicle according to a second embodiment of the invention.
Figure 4:
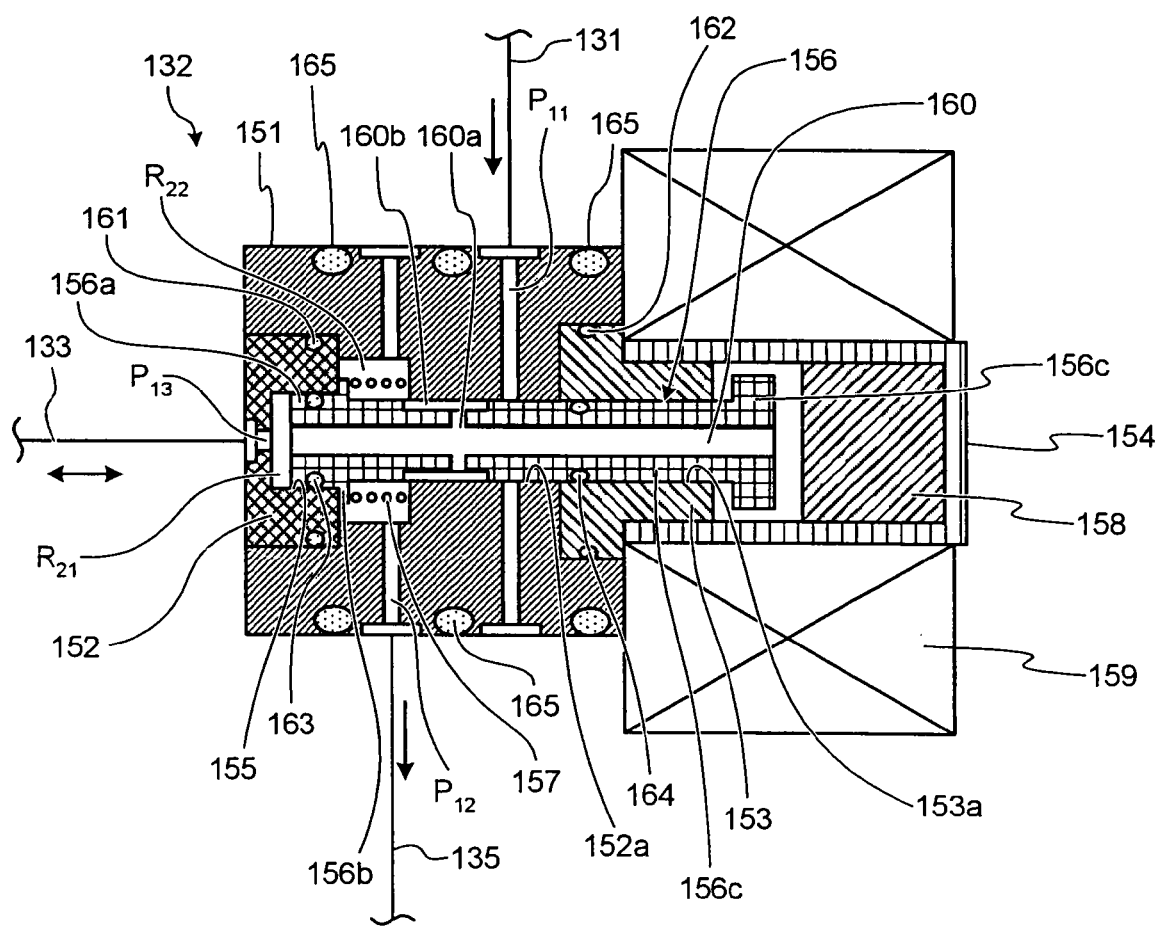
FIG. 4 is a cross sectional diagram of a reaction force control valve in the brake apparatus for a vehicle of the second embodiment.

FIG. 3 is a schematic configuration diagram showing a brake apparatus for a vehicle according to a second embodiment of the invention. FIG. 4 is a cross sectional diagram of a reaction force control valve in the brake apparatus for a vehicle of the second embodiment. The configuration of the pressure control valve in the brake apparatus for a vehicle of the second embodiment is similar to that of the first embodiment and will be described using FIG. 2. The same reference numerals are designated to members having functions similar to those of the first embodiment and repetitive description will not be given.

In the brake apparatus for a vehicle of the second embodiment, as shown in FIG. 3, a master cylinder 111 is constructed so that an input piston 113 as a drive piston and a pressure piston 114 are supported movably in the axial direction in a cylinder 112. The cylinder 112 has a cylindrical shape whose bottom end is open and whose front end is closed. In the cylinder 112, the input piston 113 and the pressure piston 114 are disposed coaxially and supported movably in the axial direction. To the base end of the input piston 113 disposed on the base end side of the cylinder 112, the operation rod 20 of the brake pedal 15 is coupled. By an operation of the brake pedal 15 of the occupant, the input piston 113 can be moved via the operation rod 20. The input piston 113 is movably supported by the inner peripheral faces of front and rear support members 115 and 116 each having a cylindrical shape and having an external peripheral face fixed to the inner peripheral face of the cylinder 112 by press-fit or screwing. A disc-shaped flange 117 is movably supported by the inner peripheral face of the cylinder 112. The flange 117 comes into contact with the support members 115 and 116, thereby regulating the stroke of the input piston 113. The input piston 113 is energized and supported in a position where the flange 117 comes into contact with the support member 116 by a reaction force spring 119 stretched between the support member 116 and a bracket 118 of the brake pedal 15.

The pressure piston 114 disposed at the front end side of the cylinder 112 has a U shape in cross section, and its outer peripheral face is movably supported by the inner peripheral face of the cylinder 112. The front and rear ends of the pressure piston 114 come into contact with the cylinder 112 and the support member 115, thereby regulating the stroke of the pressure piston 114 and energizing and supporting the pressure piston 114 in a position where the pressure piston 114 comes into contact with the support member 115 by an energization spring 120 stretched between the pressure piston 114 and the cylinder 112. Therefore, the input piston 113 and the pressure piston 114 are held in a state where they are apart from each other with a predetermined interval (stroke) $S_0$. When the occupant operates the brake pedal 15 and the input piston 113 moves forward only by the predetermined stroke $S_0$, the input piston 113 comes into contact with the pressure piston 114 and can press it.

The input piston 113 and the pressure piston 114 are coaxially movably disposed in the cylinder 12 as described above, so that a front pressure chamber $R_1$ is defined in the forward direction (left in FIG. 3) of the pressure piston 114, a rear pressure chamber $R_2$ is defined in the backward direction (right in FIG. 3) in the pressure piston 114, that is, between the input piston 113 and the pressure piston 114, and a circulating pressure chamber $R_3$ is defined in the backward direction (right in FIG. 3) in the input piston 113, that is, between the input piston 113 and the support member 116. A reaction force chamber $R_4$ is formed between the support member 115 and the flange 117 of the input piston 113. The rear pressure chamber $R_2$ and the circulating pressure chamber $R_3$ are communicated with each other via a communication path 121 formed in the input piston 113.

A hydraulic pump 122 can be driven by a motor 123 and is coupled to a reservoir tank 125 via a pipe 124 and coupled to an accumulator 127 via a pipe 126. Therefore, when the motor 123 is driven, the hydraulic pump 122 can boost pressure by supplying a hydraulic fluid stored in a reservoir tank 125 to the accumulator 127, and the accumulator 127 can store the hydraulic pressure of predetermined pressure. In the embodiment, a hydraulic supply source is constructed by the hydraulic pump 122 and the accumulator 127.

The accumulator 127 is coupled to the pressure control valve 44 via the high-pressure supply pipe 43. The pressure control valve 44 adjusts the hydraulic pressure accumulated in the accumulator 127 by electromagnetic force and can output the adjusted hydraulic pressure to the rear pressure chamber $R_2$ of the master cylinder 111. The pressure control valve 44 also adjusts the hydraulic pressure accumulated in the accumulator 127 by hydraulic pressure from the front pressure chamber $R_1$ in the master cylinder 111 and can output the adjusted hydraulic pressure to the rear pressure chamber $R_2$ in the master cylinder 111. Consequently, the pressure control valve 44 is coupled to a second pressure port 128 via the control pressure supply pipe 45, and the second pressure port 128 is communicated with the rear pressure chamber $R_2$ via an annular groove 129 formed in the outer peripheral part of the pressure piston 114. The second pressure port 128 is coupled to the first pressure port 130 in the front pressure chamber $R_1$ via the external pressure supply pipe 46, and coupled to the pipe 124 via the reduced-pressure supply pipe 47.

The accumulator 127 is coupled to a reaction force control valve 132 via a high-pressure branch pipe 131. The reaction force control valve 132 can adjust the hydraulic pressure accumulated in the accumulator 127 by the electromagnetic force and output the resultant to the reaction force chamber $R_4$ in the master cylinder 111. Consequently, the reaction force control valve 132 is coupled to a reaction force port 134 of the reaction chamber $R_4$ via a reaction force pressure supply pipe 133, and coupled to the pipe 124 via a reduced-pressure supply pipe 135.

In the front pressure chamber $R_1$ in the master cylinder 111, auxiliary ports 136a and 136b are formed so as to penetrate the cylinder 112 and the pressure piston 114. The auxiliary ports 136a and 136b are coupled to the reservoir tank 125 via a hydraulic pipe 137. By attaching an O-ring 138 and a one-way seal 139 in a main part between the cylinder 112, the input piston 113, and pressure piston 114, leakage of hydraulic pressure is prevented.

On the other hand, the front wheels FR and FL and the rear wheels RR and RL are provided with the wheel cylinders 21FR, 21FL, 21RR, and 21RL for operating a brake apparatus, and can be operated by the ABS 22. To the first pressure port 130 communicated with the front pressure chamber $R_1$, a first hydraulic pipe 140 is coupled. The first hydraulic pipe 140 is coupled to the wheel cylinders 21FR and 21FL of the front wheels FR and FL via the ABS 22. A second hydraulic pipe 141 is coupled to the second pressure port 128 formed in the rear pressure chamber $R_2$. The second hydraulic pipe 141 is coupled to the wheel cylinders 21RR and 21RL of the rear wheels RR and RL via the ABS 22.

The pressure control valve 44 and the reaction force control valve 132 will be described in detail. Since the pressure control valve 44 has a structure similar to that described in the first embodiment, the description will not be repeated.

In the reaction force control valve 132, as shown in FIG. 4, a housing 151 has a cylindrical shape. A first support block 152 is fit in one end of the housing 151. A second support block 153 having a cylindrical shape is fit in the other end of the housing 151. A cylindrical-shaped case 154 having a U-shape in cross section is fit in the second support block 153. Consequently, the inside becomes a sealed state. In the housing 151, a support hole 155 is formed. A drive valve 156 is movably supported by the support hole 155. The drive valve 156 has a rod shape and is constructed by a first support part 156a formed at one end, a first flange 156b formed next to the first support part 156a, a second support part 156c formed in a column shape and having a predetermined length, and a second flange 156d formed at the other end. The first support part 156a fits in a support hole 152a in the first support block 152, and the second support part 156c fits in the support hole 155 in the housing 151 and a support hole 153a in the second support block 153, so that the drive valve 156 is supported movably in the housing 151. A return spring 157 is interposed between the housing 151 and the first flange 156b in the drive valve 156. The drive valve 156 is positioned in a position where the first flange 156b is in contact with the under face of the first support block 152 by the energizing force of the return spring 157.

In a lower part of the case 154, an attracting member 158 made of iron is fixed. On the outside of the case 154, a coil 159 is wound so as to face the attracting member 158. The attracting member 158 can generate an attraction force by an electromagnetic force generated by passing current to the coil 159. By the attraction force, the drive valve 156 can be attracted via the second flange 156d. The drive valve 156 can be moved downward against the energizing force of the return spring 157.

Further, since the drive valve 156 is fit in the housing 151 and movably supported, a pressure chamber $R_{21}$ is defined by the first support block 152 and the drive valve 156. On the other hand, a communication hole 160 is formed in a center portion of the drive valve 156 so as to penetrate in the axial direction. One end of the communication hole 160 is communicated with the pressure chamber $R_{21}$. A plurality of coupling ports 160a are formed in the radial direction in an almost intermediate position in the axial direction, and an annular coupling groove 160b is positioned outside of the coupling ports 160a and formed in the peripheral face of the drive valve 156. The communication hole 160, the coupling ports 160a, and the coupling groove 160b are communicated with each other.

In the housing 151, a high-pressure port $P_{11}$ via which the outside and the support hole 155 are communicated with each other is formed, and a pressure reduction port $P_{12}$ via which the outside and a reduced-pressure chamber $R_{22}$ housing the return spring 157 are communicated with each other is formed. The high-pressure port $P_{11}$ and the pressure reduction port $P_{12}$ can be communicated with the communication hole 160 via the coupling groove 160b and the coupling ports 160a in different movement positions in the drive valve 156. A reaction pressure port $P_{13}$ via which the outside and the pressure chamber $R_{21}$ are communicated with each other is formed in the first support block 152. The high-pressure port $P_{11}$ is coupled to the accumulator 127 (see FIG. 3) via the high-pressure branch pipe 131, the pressure reduction port $P_{12}$ is coupled to the pipe 124 via the reduced-pressure supply pipe 135, and the reaction force pressure port $P_{13}$ is coupled to the reaction force port 134 via the reaction force pressure supply pipe 133.

Therefore, when current is not passed to the coil 159, the drive valve 156 is positioned in contact with the first support block 152 by the energizing force of the return spring 157. The communication hole 160 in the drive valve 156 is communicated with the pressure chamber $R_{21}$ and, on the other hand, the coupling port 160a and the coupling groove 160b are communicated with the pressure reduction port $P_{12}$ via a reduced-pressure chamber $R_{22}$. Thus, the reaction force pressure port $P_{13}$ and the pressure reduction port $P_{12}$ are communicated with each other via the communication hole 160.

On the other hand, when current is passed to the coil 159, the drive valve 156 moves downward by the attraction force against the energizing force of the return spring 157. The coupling port 160a and the coupling groove 160b become communicated with the high-pressure port $P_{11}$ in a state where the communication hole 160 in the drive valve 156 is communicated with the pressure chamber $R_{21}$, so that the high-pressure port $P_{11}$ and the reaction force pressure port $P_{13}$ are communicated with each other via the communication hole 160.

A seal member 161 is interposed between the housing 151 and the first support block 152, a seal member 162 is interposed between the housing 151 and the second support block 153, and seal members 163 and 164 are interposed between the support blocks 152 and 153 and the drive valve 156, thereby assuring sealing performance. The housing 151 is supported by a not-shown casing of the ABS 22. A seal member 165 is interposed between the housing 151 and the casing, thereby assuring sealing performance.

In the reaction force control valve 132 in the brake apparatus for a vehicle of the embodiment, when the coil 159 is in a magnetic neutral state, the drive valve 156 is in a position where it is in contact with the first support block 152 by the return spring 157, the communication hole 160 in the drive valve 156 is communicated with the pressure chamber $R_{21}$, and the coupling port 160a and the coupling groove 160b are communicated with the pressure reduction port $P_{12}$. Therefore, the reaction force pressure port $P_{13}$ and the pressure reduction port $P_{12}$ are communicated with each other via the pressure chamber $R_{21}$ and the communication hole 160 and, on the other hand, the high-pressure port $P_{11}$ and the reaction force pressure port $P_{11}$ are in an interrupted state.

When current is passed to the coil 159 in this state, the drive valve 156 moves by generated attraction force against the energizing force of the return spring 157. The second coupling port 160a and the coupling groove 160b are switched and become communicated with the high-pressure port $P_{11}$ in a state where the communication hole 160 in the drive valve 156 is communicated with the pressure chamber $R_{21}$. Consequently, the high-pressure port $P_{11}$ and the reaction force pressure port $P_{13}$ are communicated with each other via the pressure chamber $R_{21}$ and the communication hole 160 and, on the other hand, the pressure reduction port $P_{12}$ and the reaction force pressure port $P_{13}$ are interrupted.

Therefore, a pressure acting from the high-pressure branch pipe 131 through the high-pressure port $P_{11}$, that is, a hydraulic fluid of high pressure flows from the coupling groove 160b to the communication hole 160 via the coupling port 160a, flows from the communication hole 160 to the pressure chamber $R_{21}$, and is discharged as a reaction force pressure from the reaction force pressure port $P_{13}$ to the reaction force pressure supply pipe 133. In this case, by controlling the movement amount of the drive valve 156 with the value of current to the coil 159, the reaction force pressure discharged to the reaction force pressure supply pipe 133 can be adjusted.

When the value of current passed to the coil 159 is decreased in this state, the attraction force generated decreases, and the drive valve 156 moves by the energizing force of the return spring 157. While the communication hole 160 in the drive valve 156 is communicated with the pressure chamber $R_{21}$, the coupling port 160a and the coupling groove 160b are switched and communicated with the pressure reduction port $P_{12}$. Therefore, the pressure reduction port $P_{12}$ and the reaction force pressure port $P_{13}$ are communicated with each other via the pressure chamber $R_{21}$ and the communication hole 160 and, on the other hand, the high-pressure port $P_{11}$ and the reaction force pressure port $P_{13}$ are interrupted.

Therefore, the reaction force pressure, that is, the hydraulic fluid discharged from the pressure chamber $R_{21}$ to the reaction force pressure supply pipe 133 via the reaction force pressure port $P_3$ is returned from the pressure chamber $R_{21}$ to the communication hole 160, flows to the reduced-pressure chamber $P_{22}$ via the coupling port 160a and the coupling groove 160b, and is exhausted from the pressure reduction port $P_{12}$ to the reduced-pressure supply pipe 135.

In the brake apparatus for a vehicle of the embodiment constructed as described above, as shown in FIG. 3, the electronic control unit (ECU) 71 sets a target control pressure according to the operation force (pedal effort) Fp input from the brake pedal 15 to the input piston 113, makes the set target control pressure act on the rear pressure chamber $R_2$, and assists the pressure piston 114 so that a proper control pressure is output from the front pressure chamber $R_1$, a brake hydraulic pressure is given to each of the wheel cylinders 21FR, 21FL, 21RR, and 21RL via the ABS 22 to operate the cylinders, and the braking force is applied to the front wheels FR and FL and the rear wheels RR and RL.

The brake pedal 15 is provided with the stroke sensor 72 for detecting the pedal stroke Sp of the brake pedal 15, and the pedal effort sensor 73 for detecting the pedal effort Fp, and outputs the detection results to the ECU 71. The external pressure supply pipe 46 is provided with the first pressure sensor 74 for detecting hydraulic pressure. The first pressure sensor 74 detects an hydraulic pressure supplied from the front pressure chamber $R_1$ to the pressure control valve 44, that is, the control pressure $P_M$ supplied from the front pressure chamber $R_1$ to the wheel cylinders 21FR and 21FL of the front wheels FR and FL via the first hydraulic pipe 140, and outputs the detection result to the ECU 71.

Further, the high-pressure supply pipe 43 extending from the accumulator 127 to the pressure control valve 44 is provided with the pressure sensor 76 for detecting hydraulic pressure. The pressure sensor 76 detects a hydraulic pressure $P_H$ flowing in the high-pressure supply pipe 43 extending from the accumulator 127 to the pressure control valve 44 and outputs a detection result to the ECU 71. In this case, the pressure sensor 76 similarly detects the hydraulic pressure flowing in the high-pressure branch pipe 131 extending from the accumulator 127 to the reaction force control valve 132. The reaction force pressure supply pipe 133 extending from the reaction force control valve 132 to the reaction force chamber $R_4$ is provided with the pressure sensor 78 for detecting the hydraulic pressure. The pressure sensor 78 detects a reaction force pressure $P_R$ supplied from the reaction force control valve 132 to the reaction force chamber $R_4$ and outputs the detection result to the ECU 71. Each of the front wheels FR and FL and the rear wheels RR and RL is provided with the wheel speed sensor 77, and detected wheel speeds are output to the ECU 71.

Therefore, the ECU 71 sets the target control pressure $P_{MT}$ on the basis of the pedal effort Fp of the brake pedal 15 detected by the pedal effort sensor 73 (or the pedal stroke Sp detected by the stroke sensor 72) and controls the drive valve 56 in the pressure control valve 44. On the other hand, the ECU 71 feeds back the control pressure $P_M$ detected by the first pressure sensor 74 and controls so that the target control pressure $P_{MT}$ and the control pressure $P_M$ match each other.

The reaction force given to the brake pedal 15 is a value obtained by adding the spring force of the reaction force spring 119 and the reaction force hydraulic pressure $P_R$ acting on the reaction force chamber $R_4$, and the spring force is a constant value determined by specifications of the spring. Therefore, the ECU 71 sets the target reaction force hydraulic pressure $P_{RT}$ on the basis of the pedal effort Fp of the brake pedal 15 detected by the pedal effort sensor 73 (or the pedal stroke Sp detected by the stroke sensor 72) and controls the drive valve 156 in the reaction force control valve 132. On the other hand, the ECU 71 feeds back the reaction force hydraulic pressure $P_R$ detected by the pressure sensor 78 and controls so that the target reaction force hydraulic pressure $P_{RT}$ and the reaction force hydraulic pressure $P_R$ match each other. In this case, the ECU 71 has a map indicating the target reaction force hydraulic pressures $P_{RT}$ according to the pedal efforts Fp and controls the reaction force control valve 132.

A braking force control in the brake apparatus for a vehicle in the embodiment will be described concretely. As shown in FIG. 3, when an occupant steps on the brake pedal 15, the input piston 113 moves forward by the operation force, the pressure piston 114 moves forward while the predetermined stroke $S_0$ is maintained, and the hydraulic pressure in the rear pressure chamber $R_2$ flows in the circulating pressure chamber $R_3$ via the communication path 121. Consequently, the input piston 113 becomes free, and the hydraulic pressure in the rear pressure chamber $R_2$ does not act as a reaction force on the brake pedal 15 via the input piston 113.

The pedal effort sensor 73 detects the pedal effort Fp, and the ECU 71 sets the target control pressure $P_{MT}$ on the basis of the pedal effort Fp. The ECU 71 controls the pressure control valve 44 on the basis of the target control pressure $P_{MT}$ to make the predetermined control pressure $P_A$ act on the rear pressure chamber $R_2$. The ECU 71 feeds back the control pressure $P_M$ detected by the first pressure sensor 74 and controls so that the target control pressure $P_{MT}$ and the control pressure $P_M$ match each other.

As shown in FIGS. 2 and 3, current is passed to the coil 60 in the pressure control valve 44, and the drive valve 56 moves downward by the generated attraction force against the energizing force of the return spring 57. The communication hole 61 becomes communicated with the high-pressure port $P_1$ via the coupling port 61a and the coupling groove 61b. The high-pressure port $P_1$ is communicated with the control pressure port $P_3$ through the communication hole 61 and the first pressure chamber $R_{11}$. On the other hand, the pressure reduction port $P_2$ and the control pressure port $P_3$ are interrupted. Consequently, the hydraulic pressure of the accumulator 127 is supplied from the high-pressure supply pipe 43 to the high pressure port $P_1$, supplied to the first pressure chamber $R_{11}$ via the communication hole 61, and supplied from the control pressure port $P_3$ to the rear pressure chamber $R_2$ via the control pressure supply pipe 45. The hydraulic pressure supplied to the rear pressure chamber $R_2$ assists the pressure piston 114, so that the proper control pressure $P_M$ is discharged from the front pressure chamber $R_1$ to the first hydraulic pipe 140.

Therefore, the control pressure $P_M$ is applied from the first hydraulic pipe 140 to the wheel cylinders 21FR and 21FL of the front wheels FR and FL via the ABS 22, and the control pressure $P_A$ is applied from the second hydraulic pipe 141 to the wheel cylinders 21RR and 21RL of the rear wheels RR and RL via the ABS 22. Thus, the braking force according to the operation force of the brake pedal 15 of the occupant can be generated to the front wheels FR and FL and the rear wheels RR and RL.

As shown in FIG. 3, the ECU 17 sets the target reaction force hydraulic pressure $P_{RT}$ on the basis of the pedal effort Fp of the brake pedal 15 detected by the pedal effort sensor 73. The ECU 71 controls the reaction force control valve 132 on the basis of the target reaction force hydraulic pressure $P_{RT}$ and makes the predetermined reaction force hydraulic pressure $P_R$ act on the reaction force chamber $R_4$. The ECU 71 feeds back the reaction force hydraulic pressure $P_R$ detected by the pressure sensor 78 and controls so that the target reaction force hydraulic pressure $P_{RT}$ and the reaction force hydraulic pressure $P_R$ match each other.

As shown in FIGS. 3 and 4, current is passed to the coil 159 in the reaction force control valve 132, and the drive valve 156 is moved by the generated attraction force against the energizing force of the return spring 157. The communication hole 160 becomes communicated with the high-pressure port $P_{11}$ via the second coupling port 160a and the coupling groove 160b. The high-pressure port $P_{13}$ is communicated with the reaction force pressure port $P_{13}$ through the communication hole 160 and the pressure chamber $R_{21}$. On the other hand, the pressure reduction port $P_{12}$ and the reaction force pressure port $P_{13}$ are interrupted. Consequently, the hydraulic pressure of the accumulator 127 is supplied from the high-pressure branch pipe 131 to the high pressure port $P_1$, supplied to the pressure chamber $R_{21}$ via the communication hole 160, and supplied from the reaction force pressure port $P_{13}$ to the reaction force pressure chamber $R_4$ via the reaction force pressure supply pipe 133. The hydraulic pressure supplied to the reaction force chamber $R_4$ acts on the brake pedal 15 via the input piston 113, and the operation reaction force corresponding to the braking force of the front wheels FR and FL and the rear wheels RR and RL can be given to the occupant.

In the case where a failure occurs in the power supply system, by controlling the value of current to the coil 159 in the pressure control valve 44 as shown in FIG. 3, the brake hydraulic pressure applied to the wheel cylinders 21FR, 21FL, 21RR, and 21RL cannot be controlled to proper hydraulic pressure. In the embodiment, the pressure control valve 44 is provided with the external piston 58 operated by the pressure (external pressure) generated in the front pressure chamber $R_1$ in the master cylinder 111. The drive valve 156 is controlled by the external piston 58, so that proper control pressure can be output.

At the time of a failure in the power supply system, when an occupant steps on the brake pedal 15, the input piston 113 moves forward only by the predetermined stroke $S_0$ by the operation force. The front pressure chamber $R_1$ is pressurized and the hydraulic pressure in the front pressure chamber $R_1$ acts as external pressure on the pressure control valve 44 via the external pressure supply pipe 46.

In the pressure control valve 44, as shown in FIGS. 2 and 3, the external pressure acts on the second pressure chamber $R_{12}$ from the external pressure supply pipe 46 via the external pressure port $P_4$, and the external piston 58 moves downward, thereby pressing the drive valve 56 downward. The communication hole 61 becomes communicated with the high-pressure port $P_1$ via the coupling port 61a and the coupling groove 61b. The high-pressure port $P_1$ is communicated with the control pressure port $P_3$ through the communication hole 61 and the first pressure chamber $R_{11}$. On the other hand, the pressure reduction port $P_2$ and the control pressure port $P_3$ are interrupted. Consequently, the hydraulic pressure of the accumulator 127 is supplied from the high-pressure supply pipe 43 to the high pressure port $P_1$, supplied to the first pressure chamber $R_{11}$ via the communication hole 61, and supplied from the control pressure port $P_3$ to the rear pressure chamber $R_2$ via the control pressure supply pipe 45. The hydraulic pressure acted on the rear pressure chamber $R_2$ assists the pressure piston 114, so that the proper control pressure $P_M$ is discharged from the front pressure chamber $R_1$ to the first hydraulic pipe 140.

The control pressure $P_M$ is applied from the first hydraulic pipe 140 to the wheel cylinders 21FR and 21FL of the front wheels FR and FL via the ABS 22, and the control pressure $P_A$ is applied from the second hydraulic pipe 141 to the wheel cylinders 21RR and 21RL of the rear wheels RR and RL. Thus, the braking force according to the operation force of the brake pedal 15 of the occupant can be generated to the front wheels FR and FL and the rear wheels RR and RL.

As described above, the brake apparatus for a vehicle of the second embodiment is provided with the master cylinder 111 in which the front pressure chamber $R_1$ and the rear pressure chamber $R_2$ are defined by movably supporting the input piston 113 and the pressure piston 114 in series in the cylinder 112 and which can output the hydraulic pressure in the front pressure chamber $R_1$ via the pressure piston 114 by moving the input piston 113 with the brake pedal 15. The wheel cylinders 21FR and 21FL are coupled to the front pressure chamber $R_1$, and the wheel cylinders 21RR and 21RL are coupled to the rear pressure chamber $R_2$. The brake apparatus has the pressure control valve 44 which can output the control pressure obtained by adjusting the hydraulic pressure from the accumulator 127 by moving the drive valve 56 by the electromagnetic force based on the target control pressure to the rear pressure chamber $R_2$, and can output the control pressure obtained by adjusting the hydraulic pressure from the accumulator 127 by moving the drive valve 156 by the external piston 58 moved by the external pressure from the front pressure chamber $R_1$ to the rear pressure chamber $R_2$.

Therefore, when the power supply system is normal, the ECU 71 sets the target control pressure $P_{MT}$ according to the pedal effort Fp and controls the pressure control valve 44 on the basis of the target control pressure $P_{MT}$, thereby supplying the proper hydraulic pressure from the accumulator 127 to the rear pressure chamber $R_2$ by the pressure control valve 44 and assisting the pressure piston 114. The proper control pressure can be supplied to each of the hydraulic pipes 140 and 141. The control oil is made act on the wheel cylinders 21FR, 21FL, 21RR, and 21RL via the ABS 22, and proper braking force according to the operation force of the brake pedal 15 of the occupant for the front wheels FR and FL and the rear wheels RR and RL can be generated.

At this time, the ECU 71 sets the target reaction force pressure $P_{RT}$ according to the pedal effort Fp and controls the reaction force control valve 132 on the basis of the target reaction force pressure $P_{RT}$, thereby supplying the proper hydraulic pressure from the accumulator 127 to the reaction force chamber $R_4$ by the reaction force control valve 132. The hydraulic pressure acted on the reaction force chamber $R_4$ acts on the brake pedal 15 via the input piston 113. The operation reaction force corresponding to the braking force of the front wheels FR and FL and the rear wheels RR and RL can be given to the occupant.

On the other hand, when a failure occurs in the power supply system, the input piston 113 and the pressure piston 114 move integrally according to the operation of the brake pedal 15, so that the front pressure chamber $R_1$ is pressurized and the hydraulic pressure in the front pressure chamber $R_1$ acts as the external pressure on the pressure control valve 44. As a result, the proper hydraulic pressure is supplied from the accumulator 127 to the rear pressure chamber $R_2$ by the pressure control valve 44 to assist the pressure piston 114. The proper control pressure can be supplied to the hydraulic pipes 140 and 141. The control oil can be made act on the wheel cylinders 21FR, 21FL, 21RR, and 21RL via the ABS 22, and proper braking force according to the operation force of the brake pedal 15 of the occupant can be generated to the front wheels FR and FL and the rear wheels RR and RL.

As described above, in the embodiment, by applying the pressure control valve 44 which is operated by the electromagnetic force and the external pressure and also the reaction force control valve 132 which is operated by the electromagnetic force, the control pressure according to the operation of the brake pedal 15 of the occupant can be reliably generated irrespective of the state of the power supply system, and the reaction force according to the operation of the brake pedal 15 can be generated for the occupant. As a result, the hydraulic path is simplified and the structure can be simplified. In addition, the manufacture cost can be reduced. Moreover, the proper braking force control and the reaction force control can be realized, and reliability and safety can be improved.

Third Embodiment

Figure 5:
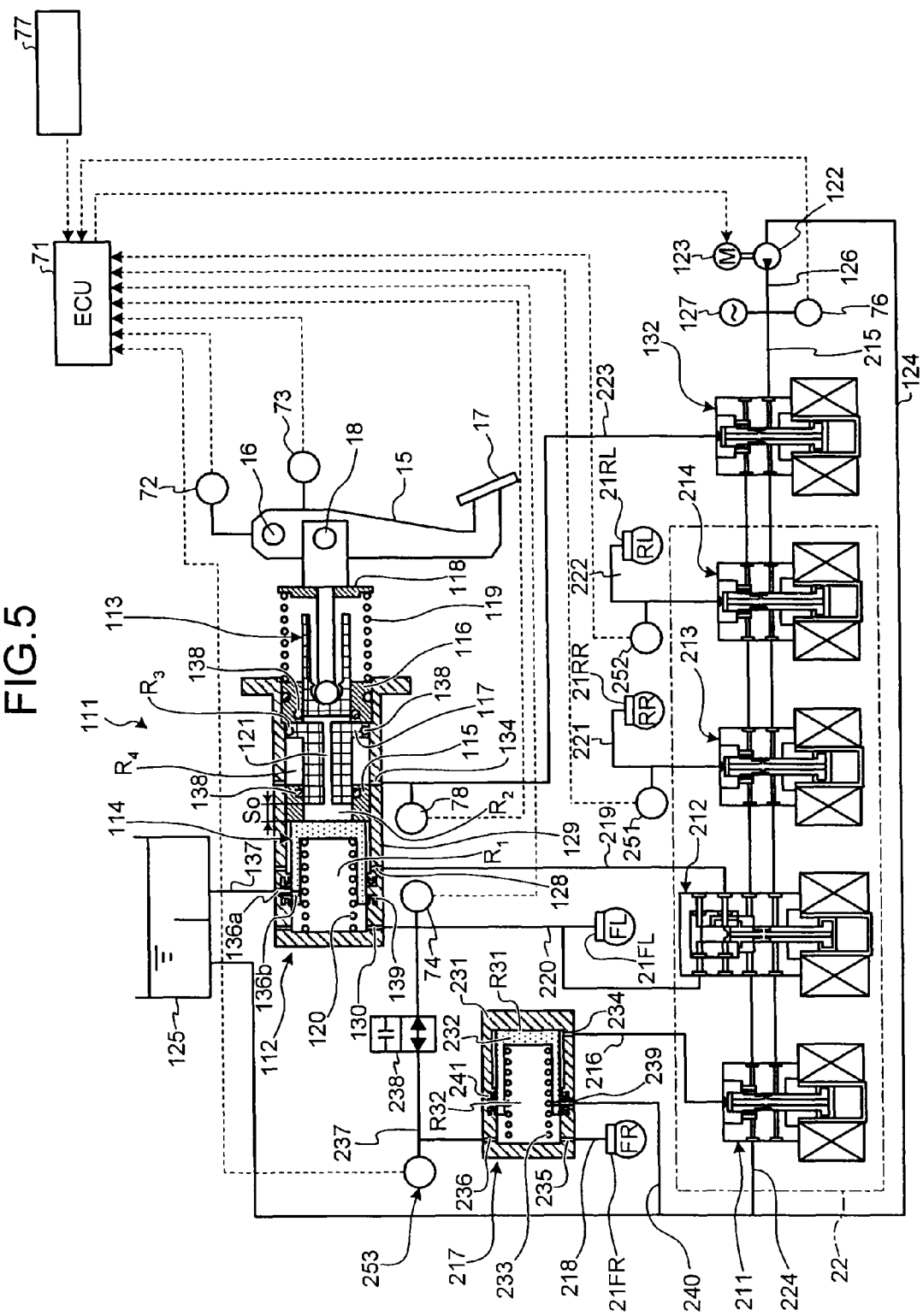
FIG. 5 is a schematic configuration diagram showing a brake apparatus for a vehicle according to a third embodiment of the invention.

FIG. 5 is a schematic configuration diagram showing a brake apparatus for a vehicle according to a third embodiment of the invention. The same reference numerals are designated to members having functions similar to those of the foregoing embodiments and repetitive description will not be given.

In the brake apparatus for a vehicle of the third embodiment, as shown in FIG. 5, the master cylinder 111 is constructed by the cylinder 112, the input piston 113, and the pressure piston 114. The cylinder 112 has a cylindrical shape. In the cylinder 112, the input piston 113 and the pressure piston 114 are disposed coaxially and supported movably. To the base end of the input piston 113, the operation rod 20 of the brake pedal 15 is coupled. By an operation of the brake pedal 15 of the occupant, the input piston 113 can be moved.

The input piston 113 is movably supported by the support members 115 and 116, and the flange 117 is movably supported. The input piston 113 is energized and supported in a position where the flange 117 comes into contact with the support member 116 by the reaction force spring 119. The pressure piston 114 is energized and supported in the position where it comes into contact with the support member 115 by the energization spring 120. Therefore, the input piston 113 and the pressure piston 114 are held in a state where they are apart from each other with a predetermined interval (stroke) $S_0$. When the occupant operates the brake pedal 15 and the input piston 113 moves forward only by the predetermined stroke $S_0$, the input piston 113 comes into contact with the pressure piston 114 and can press it.

The front pressure chamber $R_1$ is defined in the forward direction (left in FIG. 5) in the pressure piston 114, the rear pressure chamber $R_2$ is defined in the backward direction (right in FIG. 5) in the pressure piston 114, that is, between the input piston 113 and the pressure piston 114, and the circulating pressure chamber $R_3$ is defined in the backward direction (right in FIG. 5) in the input piston 113, that is, between the input piston 113 and the support member 116. The reaction force chamber $R_4$ is formed between the support member 115 and the flange 117 of the input piston 113. The rear pressure chamber $R_2$ and the circulating pressure chamber $R_3$ are communicated with each other via the communication path 121 formed in the input piston 113.

On the other hand, the front wheels FR and FL and the rear wheels RR and RL are provided with the wheel cylinders 21FR, 21FL, 21RR, and 21RL for operating the brake apparatus, and can be independently operated by the ABS 22. The ABS 22 has four pressure control valves 211, 212, 213, and 214. The pressure control valve 212 has a configuration similar to that of the pressure control valve (see FIG. 2) of the second embodiment. Each of the pressure control valves 211, 213, and 214 has a configuration similar to that of the reaction force control valve 132 (see FIG. 4) in the second embodiment.

The hydraulic pump 112 can be driven by the motor 123 and is coupled to the reservoir tank 125 via the pipe 124 and coupled to the accumulator 127 via the pipe 126. The accumulator 127 is coupled to the first, second, third, and fourth pressure control valves 211, 212, 213, and 214 via a high-pressure supply pipe 215. The pressure control valves 211, 212, 213, and 214 adjust the hydraulic pressure accumulated in the accumulator 127 by the electromagnetic force and can output the adjusted hydraulic pressure to the rear pressure chamber $R_2$ of the master cylinder 111, and can adjust the hydraulic pressure accumulated in the accumulator 127 by hydraulic pressure from the front pressure chamber $R_1$ in the master cylinder 111 and output the adjusted hydraulic pressure to the rear pressure chamber $R_2$ in the master cylinder 111.

Consequently, the high-pressure supply pipe 215 from the accumulator 127 is coupled to the high-pressure ports of the pressure control valves 211, 212, 213, and 214. The control pressure port of the first pressure control valve 211 is coupled to a power separating mechanism 217 via a first control pressure supply pipe 216, and the power separating mechanism 217 is coupled to the wheel cylinder 21FR via a first control pressure transmission pipe 218. The control pressure port of the second pressure control valve 212 is coupled to the second pressure port 128 in the master cylinder 111 via a second control pressure supply pipe 219, and the second pressure port 128 is communicated with the rear pressure chamber $R_2$ via the annular groove 129 formed in the peripheral part of the pressure piston 114. The external pressure port of the second pressure control valve 212 is coupled to the first pressure port 130 communicated with the front pressure chamber $R_1$ in the master cylinder 111 via an external pressure supply pipe 220, and the external pressure supply pipe 220 is coupled to the wheel cylinder 21FL. The control pressure port of the third pressure control valve 213 is coupled to the wheel cylinder 21RR via a third control pressure supply pipe 221. The control pressure port of the fourth pressure control valve 214 is coupled to the wheel cylinder 21RL via a fourth control pressure supply pipe 222.

Further, the accumulator 127 is coupled to the reaction force control valve 132 via the high-pressure supply pipe 215. The reaction force control valve 132 can adjust the hydraulic pressure accumulated in the accumulator 127 by the electromagnetic force and output the resultant to the reaction chamber $R_4$ in the master cylinder 111. Consequently, a reaction force pressure port of the reaction force control valve 132 is coupled to the reaction force port 134 communicated with the reaction force chamber $R_4$ in the master cylinder 111 via a reaction force supply pipe 223. Reduction pressure ports of the pressure control valves 211, 212, 213, and 214 and the reaction force control valve 132 are coupled to the pipe 124 via a reduced-pressure supply pipe 224.

Since the configurations and actions of the pressure control valves 211, 212, 213, and 214 and the reaction force control valve 132 are similar to those of the pressure control valve 44 and the reaction force control valve 132 described in the first and second embodiments, the description will not be repeated.

The power separating mechanism 217 separates the power of the hydraulic system on the master cylinder 111 side and that of the hydraulic system on the pressure force control valve 211, thereby preventing an operation error caused by intrusion of air into the hydraulic system on the master cylinder 111 side at the time of occurrence of a failure in the power supply unit. Specifically, a power separation piston 232 is movably supported in a cylinder 231 having a hollow shape and is energized to one side and supported by an energization spring 233, thereby defining two pressure chambers $R_{31}$ and $R_{32}$. The first control pressure supply pipe 216 is coupled to a first input port 234 communicated with the pressure chamber $R_{31}$ and, on the other hand, an output port 235 communicated with the pressure chamber $R_{32}$ is coupled to the second control pressure transmission pipe 218.

A second input port 236 communicated with the pressure chamber $R_{32}$ and the external pressure supply pipe 220 are coupled to each other via an external pressure branch pipe 237, and an open/close valve 238 is attached to the external pressure branch pipe 237. The open/close valve 238 is an open/close valve of the normal open type and is closed when power is supplied. In the embodiment, as a first wheel cylinder, the wheel cylinder FR which is operated by the control pressure adjusted by the first pressure control valve 211 is applied. As the second wheel cylinder, the wheel cylinder FL which is operated by the control pressure adjusted by the second pressure control valve 212 is applied. The external pressure branch pipe 237 as a hydraulic line coupling the wheel cylinders FR and FL is provided with the open/close valve 238. In the cylinder 231, an auxiliary port 239 communicated with a side face of the power separation piston 232 is formed and coupled to the pipe 124 via an auxiliary pipe 240. One-way seals 241 are attached on both sides of the auxiliary port 239, and leakage of hydraulic pressure is prevented.

Therefore, when the external pressure branch pipe 237 is closed by the open/close valve 238, the control pressure adjusted by the first pressure control valve 211 is output to the wheel cylinder FR via the power separating mechanism 217, and the control pressure adjusted by the second pressure control valve 212 is discharged to the external pressure supply pipe 220 via the rear pressure chamber $R_2$, the pressure piston 114, and the front pressure chamber $R_1$ in the master cylinder 111 and output to the wheel cylinder 21FL. On the other hand, when the external pressure branch pipe 237 is opened by the open/close valve 238, the control pressure discharged from the front pressure chamber $R_1$ in the master cylinder 111 is output to the wheel cylinder FR via the power separating mechanism 217, and is output to the wheel cylinder 21FL via the external pressure supply pipe 220.

In the brake apparatus for a vehicle of the embodiment constructed as described above, the electronic control unit (ECU) 71 sets a target control pressure according to an operation force (pedal effort) input from the pedal brake 15 to the input piston 113, makes the set target control pressure act on the rear pressure chamber $R_2$, and assists the pressure piston 114 so that a proper control pressure is output from the front pressure chamber $R_1$, a brake hydraulic pressure is given to each of the wheel cylinders 21FR, 21FL, 21RR, and 21RL via the ABS 22 to operate the cylinders, and the braking force is applied to the front wheels FR and FL and the rear wheels RR and RL.

The brake pedal 15 is provided with the stroke sensor 72 for detecting the pedal stroke Sp of the brake pedal 15, and the pedal effort sensor 73 for detecting the pedal effort Fp, and outputs the detection results to the ECU 71. The external pressure supply pipe 220 of the second pressure control valve 212 is provided with the first pressure sensor 74 for detecting hydraulic pressure. The first pressure sensor 74 detects the control pressure $P_M$ supplied from the front pressure chamber $R_1$ to the pressure control valve 44 and the wheel cylinder 21FR of the front wheel FR, and outputs the detection result to the ECU 71.

Further, the high-pressure supply pipe 215 extending from the accumulator 127 to the pressure control valves 211, 212, 213, and 214 and the reaction force control valve 132 is provided with the pressure sensor 76 for detecting hydraulic pressure. The pressure sensor 76 detects the hydraulic pressure $P_H$ flowing in the high-pressure supply pipe 215 extending from the accumulator 127 to the pressure control valves 211, 212, 213, and 214 and the reaction force control valve 132, and outputs a detection result to the ECU 71. The reaction force supply pipe 223 extending from the reaction control valve 132 to the reaction force chamber $R_4$ is provided with the pressure sensor 78 for detecting the hydraulic pressure. The pressure sensor 78 detects the reaction force pressure $P_R$ supplied from the reaction force control valve 132 to the reaction force chamber $R_4$, and outputs the detection result to the ECU 71. Each of the front wheels FR and FL and the rear wheels RR and RL is provided with the wheel speed sensor 77, and detected wheel speeds are output to the ECU 71.

Further, the control pressure supply pipes 221 and 222 of the third and fourth pressure control valves 213 and 214 are provided with third and fourth pressure sensors 251 and 252 for detecting hydraulic pressure. The third and fourth pressure sensors 251 and 252 detect the control pressure supplied from the pressure control valves 213 and 214 to the wheel cylinders 21RR and 21RL of the rear wheels RR and RL, and output the detection result to the ECU 71. A fifth pressure sensor 253 for detecting hydraulic pressure is provided between the power separating mechanism 217 in the external pressure branch pipe 237 and the open/close valve 238. The fifth pressure sensor 253 detects the control pressure supplied from the first pressure control valve 211 to the wheel cylinder 21FR of the front wheel FR and outputs the detection result to the ECU 71.

Therefore, the ECU 71 sets the target control pressure on the basis of the pedal effort Fp of the brake pedal 15 detected by the pedal effort sensor 73 and controls the pressure control valves 211, 212, 213, and 214. On the other hand, the ECU 71 feeds back the control pressure detected by the pressure sensors 74, 251, 252, and 253, and controls so that the target control pressure and the control pressure match each other. The ECU 71 sets the target reaction force pressure on the basis of the pedal effort Fp of the brake pedal 15 detected by the pedal effort sensor 73 and controls the reaction force control valve 132. On the other hand, the ECU 71 feeds back the reaction force hydraulic pressure detected by the pressure sensor 78 and controls so that the target reaction force hydraulic pressure and the reaction force hydraulic pressure match each other.

A braking force control in the brake apparatus for a vehicle in the embodiment will be described concretely. When an occupant steps on the brake pedal 15, the input piston 113 moves forward by the operation force, and the pressure piston 114 moves forward while the predetermined stroke $S_0$ is maintained. The pedal effort sensor 73 detects the pedal effort Fp. The ECU 71 sets the target control pressure on the basis of the pedal effort Fp and controls the pressure control valves 211, 212, 213, and 214 on the basis of the target control pressure.

Specifically, in the first pressure control valve 211, when the drive valve is moved by the electromagnetic force, the hydraulic pressure in the accumulator 127 is supplied from the pipe 126 to the high-pressure port, and supplied from the control pressure port to the power separating mechanism 217 via the first control pressure supply pipe 216. By the movement of the power separation piston 232 of the power separating mechanism 217, the control pressure is applied to the wheel cylinder 21FR in the front wheel FR via the control pressure transmission pipe 218. In the second pressure control valve 212, when the drive valve is moved by the electromagnetic force, the hydraulic pressure in the accumulator 127 is supplied from the pipe 126 to the high-pressure port, and supplied from the control pressure port to the rear pressure chamber $R_2$ via the second control pressure supply pipe 219. The hydraulic pressure acting on the rear pressure chamber $R_2$ assists the pressure piston 114, so that the pressure is applied as the control pressure to the wheel cylinder 21FL of the front wheel FL from the front pressure chamber $R_1$ via the external pressure supply pipe 220. Further, in the third and fourth pressure control valves 213 and 214, the drive valve is moved by the electromagnetic force, so that the hydraulic pressure of the accumulator 127 is supplied from the pipe 126 to the high-pressure port and applied as a control pressure from the control pressure port to the wheel cylinders 21RR and 21RL of the rear wheels RR and RL via the third and fourth control pressure supply pipes 221 and 222.

Therefore, the control pressures are independently applied from the pressure control valves 211, 212, 213, and 214 of the ABS 22 to the wheel cylinders 21FR and 21FL of the front wheels FR and FL, and the braking force according to the operation force on the brake pedal 15 of the occupant can be generated to the front wheels FR and FL and the rear wheels RR and RL.

The ECU 71 sets the target reaction force hydraulic pressure on the basis of the pedal effort Fp of the brake pedal 15 detected by the pedal effort sensor 73, controls the reaction force control valve 132 on the basis of the target reaction force hydraulic pressure, and makes predetermined reaction force hydraulic pressure $P_R$ on the reaction force chamber $R_4$. Specifically, when the drive valve is moved by the electromagnetic force in the reaction force control valve 132, the hydraulic pressure in the accumulator 127 is supplied from the high-pressure branch pipe 131 to the high-pressure port, and supplied from the reaction force pressure port to the reaction force chamber $R_4$ via the reaction force pressure supply pipe 223. The hydraulic pressure acting on the reaction force chamber $R_4$ acts on the brake pedal 15 via the input piston 113, so that the operation reaction force corresponding to the braking force of the front wheels FR and FL and the rear wheels RR and RL can be given to the occupant.

In the case where a failure occurs in the power supply system, when an occupant steps on the brake pedal 15, the input piston 113 moves forward only by the predetermined stroke $S_0$ by the operation force, the input piston 113 comes into contact with the pressure piston 114, and both of the pistons 113 and 114 move forward integrally. When the front pressure chamber $R_1$ is pressurized, the hydraulic pressure in the front pressure chamber $R_1$ acts as external pressure on the second pressure control valve 212 via the external pressure supply pipe 220. The external pressure acts on the external pressure port from the external pressure supply pipe 220, and the external piston moves and presses the drive valve, thereby supplying the hydraulic pressure in the accumulator 127 from the pipe 126 to the high-pressure port, and supplying the hydraulic pressure from the control pressure port to the rear pressure chamber $R_2$ via the first control pressure supply pipe 219. Since the hydraulic pressure acted on the rear pressure chamber $R_2$ assists the pressure piston 114, proper brake hydraulic pressure is discharged from the front pressure chamber $R_1$ to the external pressure supply pipe 220.

Therefore, the control pressure is applied from the external pressure supply pipe 220 to the wheel cylinder 21FR of the front wheel FR via the external pressure branch pipe 237 and the power separating mechanism 217 opened by the open/close valve 238, and the control pressure is applied from the external pressure supply pipe 220 to the wheel cylinder 21FL of the front wheel FL. Thus, the braking force according to the operation force of the brake pedal 15 of the occupant can be generated to the front wheels FR and FL.

As described above, the brake apparatus for a vehicle of the third embodiment is provided with the master cylinder 111 in which the front pressure chamber $R_1$ and the rear pressure chamber $R_2$ are defined by movably supporting the input piston 113 and the pressure piston 114 in series in the cylinder 112 and which can output the hydraulic pressure in the front pressure chamber $R_1$ via the pressure piston 114 by moving the input piston 113 with the brake pedal 15. The brake apparatus has the pressure control valves 211, 212, 213, and 214 capable of outputting the control pressure obtained by adjusting the hydraulic pressure from the accumulator 127 by the electromagnetic force based on the target control pressure to the wheel cylinders 21FR, 21FL, 21RR, and 21RL. By the second pressure control valve 212, the control pressure obtained by adjusting the hydraulic pressure from the accumulator 127 by the external pressure from the front pressure chamber $R_1$ can be output to the rear pressure chamber $R_2$.

Therefore, when the power supply system is normal, the ECU 71 sets the target control pressure according to the pedal effort Fp and controls the pressure control valves 211, 212, 213, and 214 on the basis of the target control pressure, thereby making the control pressure from the accumulator 127 act independently on the wheel cylinders 21FR, 21FL, 21RR, and 21RL, and the proper braking force according to the operation force on the brake pedal 15 of the occupant can be generated to each of the front wheels FR and FL and the rear wheels RR and RL.

At this time, the ECU 71 sets the target reaction force hydraulic pressure according to the pedal effort Fp and controls the reaction force control valve 132 on the basis of the target reaction force hydraulic pressure, thereby supplying the proper hydraulic pressure from the accumulator 127 to the reaction force chamber $R_4$ by the reaction force control valve 132. The hydraulic pressure acted on the reaction force chamber $R_4$ acts on the brake pedal 15 via the input piston 113. The operation reaction force corresponding to the braking force of the front wheels FR and FL and the rear wheels RR and RL can be given to the occupant.

On the other hand, when a failure occurs in the power supply system, the input piston 113 and the pressure piston 114 move integrally according to the operation of the brake pedal 15, so that the front pressure chamber $R_1$ is pressurized and the hydraulic pressure in the front pressure chamber $R_1$ acts as the external pressure on the second pressure control valve 212. As a result, the proper hydraulic pressure is supplied from the accumulator 127 to the rear pressure chamber $R_2$ by the second pressure control valve 212 to assist the pressure piston 114. The proper control pressure can be supplied and can be made act on the wheel cylinders 21FR and 21FL, and proper braking force according to the operation force of the brake pedal 15 of the occupant can be generated to the front wheels FR and FL.

At this time, the control pressure generated in the front pressure chamber $R_1$ in the master cylinder 111 is discharged to the external pressure supply pipe 220, supplied to the power separating mechanism 217 via the external pressure branch pipe 237 opened by the open/close valve 238, applied to the wheel cylinder 21FR of the front wheel FR from the first control pressure transmission pipe 218, and applied to the wheel cylinder 21FL of the front wheel FL directly from the external pressure supply pipe 220. Consequently, for example, even when air enters the high pressure system having the accumulator 127 at the time of a failure in the power supply system, the air does not enter the hydraulic pressure supply system of the master cylinder 111. The control pressure generated in the front pressure chamber $R_1$ can be properly supplied to the wheel cylinders 21FR and 21FL, and the braking force according to the operation force on the brake pedal 15 of the occupant can be generated to the front wheels FR and FL.

As described above, in the embodiment, by applying the pressure control valves 211, 212, 213, and 214 each operated by the electromagnetic force and the external pressure and also applying the reaction force control valve 132 which is operated by the electromagnetic force, the control pressure according to the operation on the brake pedal 15 of the occupant can be reliably generated irrespective of the state of the power supply system, and the reaction force according to the operation on the brake pedal 15 can be generated for the occupant. As a result, the hydraulic path is simplified and the structure can be simplified. In addition, the manufacture cost can be reduced. Moreover, the proper braking force control and the reaction force control can be realized, and reliability and safety can be improved.

Fourth Embodiment

Figure 6:
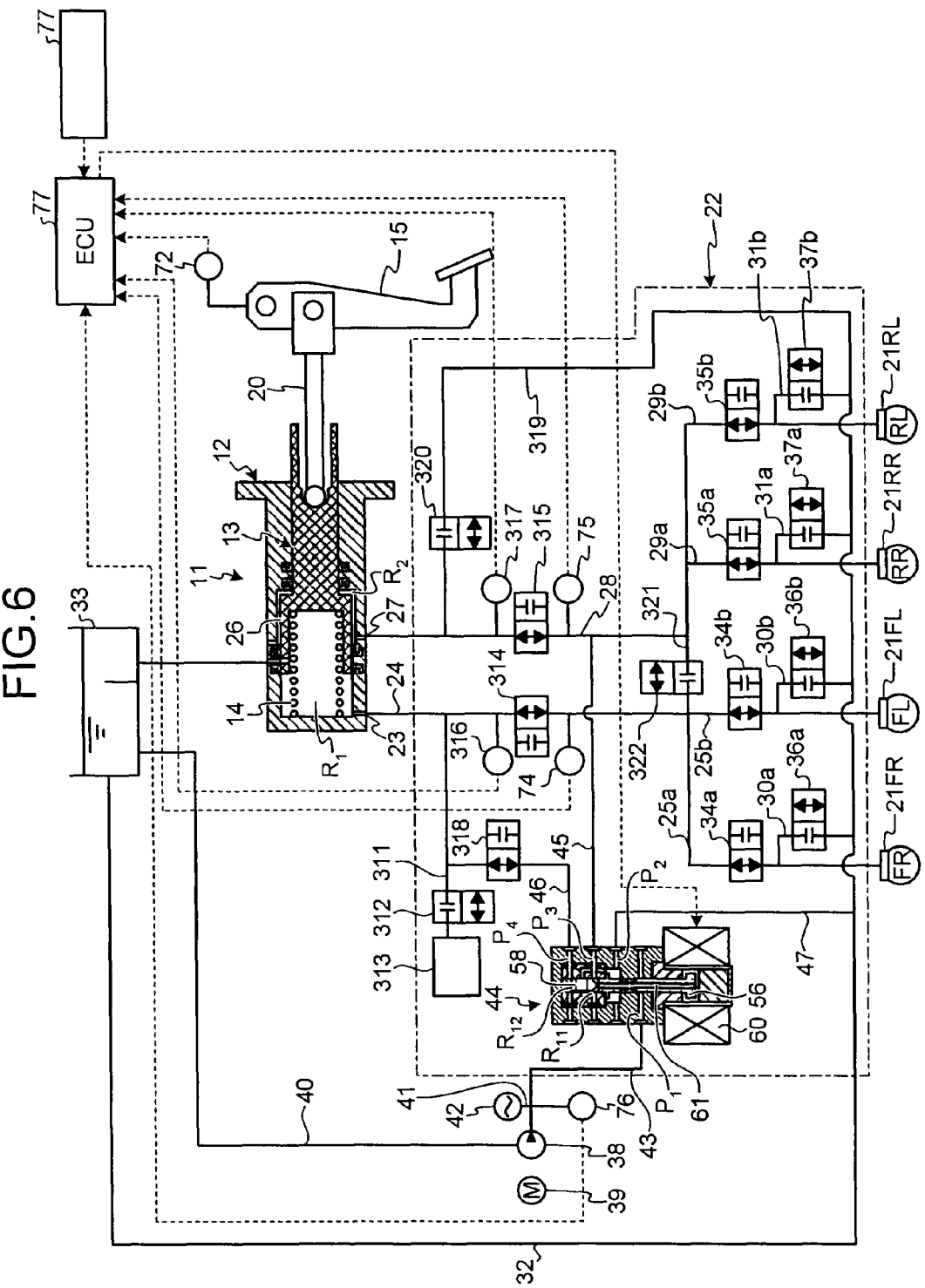
FIG. 6 is a schematic configuration diagram showing a brake apparatus for a vehicle according to a fourth embodiment of the invention.

FIG. 6 is a schematic configuration diagram showing a brake apparatus for a vehicle according to a fourth embodiment of the invention. The same reference numerals are designated to members having functions similar to those of the foregoing embodiments and repetitive description will not be given.

In the brake apparatus for a vehicle of the fourth embodiment, as shown in FIG. 6, the master cylinder 11 is constructed so that the drive piston 13 is supported movably in the axial direction in the cylinder 12. The drive piston 13 is supported so as to be energized in one direction by the energizing force of the reaction force spring 14. The front end of the operation rod 20 in the brake pedal 15 is coupled to the drive piston 13. Therefore, when the driver steps on the pedal 17 and the brake pedal 15 is operated, the operation force is transmitted to the drive piston 13 via the operation rod 20, and the drive piston 13 can move forward against the energizing force of the reaction force spring 14. In the cylinder 12, the front pressure chamber $R_1$ and the rear pressure chamber $R_2$ are defined by the drive piston 13.

On the other hand, the front wheels FR and FL and rear wheels RR and RL are provided with the wheel cylinders 21FR, 21FL, 21RR, and 21RL for operating the brake apparatus, and can be operated by the ABS 22. Specifically, the two hydraulic pipes 24 and 28 are coupled to the master cylinder 11. To the external pressure supply pipe 46 which is coupled to the first hydraulic pipe 24 and will be described later, a stroke simulator 313 is connected via a simulator cut valve 312 which is open when current is passed via a coupling pipe 311. The stroke simulator 313 generates a pedal stroke according to the pedal effort on the brake pedal 15 of the driver. Master cut valves 314 and 315 which are closed when current is passed are attached to the hydraulic pipes 24 and 28. Master cylinder pressure sensors 316 and 317 for detecting the hydraulic pressure in the hydraulic pipes 24 and 28 are attached on the upstream side (on the master cylinder 11 side) of the master cut valves 314 and 315.

The hydraulic pump 38 can be driven by the motor 39 and is coupled to the reservoir tank 33 via the pipe 40 and coupled to the accumulator 42 via the pipe 41. The accumulator 42 is coupled to the pressure control valve 44 via the high-pressure supply pipe 43. The pressure control valve 44 adjusts the hydraulic pressure accumulated in the accumulator 42 by electromagnetic force and can output the adjusted hydraulic pressure to the wheel cylinders 21RR and 21RL of the ABS 22. The pressure control valve 44 also adjusts the hydraulic pressure accumulated in the accumulator 42 by hydraulic pressure from the front pressure chamber $R_1$ in the master cylinder 11 and can output the adjusted hydraulic pressure to the rear pressure chamber $R_2$ in the master cylinder 11 and the wheel cylinders 21RR and 21RL of the ABS 22. Consequently, the pressure control valve 44 is coupled to the second hydraulic pipe 28 via the control pressure supply pipe 45, coupled to the first hydraulic pipe 24 via the external pressure supply pipe 46, and coupled to the third hydraulic pipe 32 via the reduced-pressure supply pipe 47.

The external pressure supply pipe 46 coupling the front pressure chamber $R_1$ in the master cylinder 11 and the pressure control valve 44 is provided with an open/close valve 318 which is closed when current is passed. Further, a coupling pipe 319 coupling the rear pressure chamber $R_2$ in the master cylinder 11 and the third hydraulic pipe 32 is provided with a negative pressure preventing valve 320 which is open when current is passed. At the tips of the hydraulic pipes 24 and 28, the hydraulic supply pipes 25a and 25b for the front wheels and the hydraulic supply pipes 29a and 29b for the rear wheels are coupled via a coupling pipe 321. The coupling pipe 321 is provided with an open/close valve 322 which is open when current is passed.

A braking force control by the brake apparatus for a vehicle in the embodiment will be described concretely. When an occupant steps on the brake pedal 15, the drive piston 13 is moved forward by the operation force. At this time, the stroke sensor 72 detects the pedal stroke Sp, and the ECU 71 sets the target control pressure on the basis of the pedal stroke Sp. The ECU 71 controls the pressure control valve 44 on the basis of the target control pressure to make the predetermined control pressure act on the ABS 22.

Normally, the master cut valves 314 and 315 are closed and, on the other hand, the simulator cut valve 312 is opened, the open/close valve 318 is closed, the negative pressure preventing valve 320 is opened, and the open/close valve 322 is opened. Consequently, when current is passed to the coil 60 in the pressure control valve 44 and the drive valve 56 is moved by the generated attraction force, the high-pressure port $P_1$ becomes communicated with the control pressure port $P_3$ via the communication hole 61. The hydraulic pressure in the accumulator 42 is supplied from the high pressure supply pipe 43 to the high-pressure port $P_1$, supplied to the first pressure chamber $R_{11}$ via the communication hole 61, and supplied to the second hydraulic pipe 28 via the control pressure supply pipe 45 from the control pressure port $P_3$. The hydraulic pressure supplied to the second hydraulic pipe 28 is discharged to the ABS 22. Since the open/close valve 318 provided for the external pressure supply pipe 46 is in the closed state at this moment, the hydraulic pressure in the front pressure chamber $R_1$ in the master cylinder 11 does not act on the pressure control valve 44 via the external pressure supply pipe 46. Since the negative pressure preventing valve 320 provided for the coupling pipe 319 is in the open state, when the drive piston 13 in the master cylinder 11 moves forward, the hydraulic pressure is added to the rear pressure chamber $R_2$ from the reservoir tank 33, and the drive piston 13 operates properly.

Therefore, the control pressure of the second hydraulic pipe 28 is supplied to the hydraulic pressure supply pipes 29*a* and 29*b* on the rear wheel side, and is also supplied to the hydraulic pressure supply pipes 25*a* and 25*b* on the front wheel side via the coupling pipe 321 opened by the open/close valve 322. That is, the brake hydraulic pressure is applied to the wheel cylinders 21FR and 21FL of the front wheels FR and FL, and applied to the wheel cylinders 21RR and 21RL of the rear wheels RR and RL. As a result, the braking force according to the operation force on the brake pedal 15 of the occupant can be generated to the front wheels FR and FL and the rear wheels RR and RL.

The master cut valves 314 and 315 are closed and the simulator cut valve 312 is opened. When the driver steps on the brake pedal 15, the master cylinder 11 generates a hydraulic pressure according to the operation amount. Specifically, the hydraulic pressure in the front pressure chamber $R_1$ acts on the stroke simulator 313 from the first hydraulic pipe 24 via the simulator cut valve 312. According to the pedal effort on the brake pedal 15, the operation amount of the brake pedal 15 is adjusted. That is, the pedal operation amount (pedal stroke) according to the pedal effort is generated. The pedal stroke is detected by the stroke sensor 72. The pedal stroke can be also calculated from the hydraulic pressures detected by the master cylinder pressure sensors 316 and 317. When the pedal strokes do not match, the abnormal state of the sensors 72, 316, and 317 or the abnormal state of the master cylinder 11 and the hydraulic pressure supply pipes 24 and 28 is determined.

In the case where a failure occurs in the power supply system, the master cut valves 314 and 315 are opened, the simulator cut valve 312 is closed, the open/close valve 318 is opened, the negative pressure preventing valve 320 is closed, and the open/close valve 322 is closed.

Consequently, when an occupant steps on the brake pedal 15, the drive piston 13 is moved forward by the operation force. By the forward movement of the drive piston 13, the front pressure chamber $R_1$ is pressurized. Consequently, the hydraulic pressure in the front pressure chamber $R_1$ is discharged as external pressure to the first hydraulic pipe 24, discharged to the pressure control valve 44 via the external pressure supply pipe 46, and discharged to the front wheel side of the ABS 22 through the master cut valve 314.

In the pressure control valve 44, the external pressure acts on the second pressure chamber $R_{12}$ from the external pressure supply pipe 46 via the external pressure port $P_4$, and the external piston 58 moves forward, thereby pressing the drive valve 56. The high-pressure port $P_1$ is communicated with the control pressure port $P_3$ via the communication hole 61. Consequently, the hydraulic pressure of the accumulator 42 is supplied from the high-pressure supply pipe 43 to the high pressure port $P_1$. supplied to the first pressure chamber $R_{11}$ via the communication hole 61, and supplied from the control pressure port $P_3$ to the second hydraulic pipe 28 via the control pressure supply pipe 45. The hydraulic pressure acts and assists from the second hydraulic pipe 28 onto the rear pressure chamber $R_2$ via the master cut valve 315, and is discharged to the rear wheel side of the ABS 22.

The hydraulic pressure of the front pressure chamber $R_1$ in the master cylinder 11 is supplied to the hydraulic supply pipes 25*a* and 25*b* on the front wheel side through the first hydraulic pipe 24, and the hydraulic pressure of the rear pressure chamber $R_2$ is supplied to the hydraulic supply pipes 29*a* and 29*b* on the rear wheel side through the second hydraulic pipe 28. That is, the brake hydraulic pressure is applied to the wheel cylinders 21FR and 21FL of the front wheels FR and FL, and applied to the wheel cylinders 21RR and 21RL of the rear wheels RR and RL. Thus, the braking force according to the operation force of the brake pedal 15 of the occupant can be generated to the front wheels FR and FL and the rear wheels RR and RL.

As described above, the brake apparatus for a vehicle of the fourth embodiment is provided with the master cylinder 11 in which the front pressure chamber $R_1$ and the rear pressure chamber $R_2$ are defined by movably supporting the drive piston 13 in the cylinder 12 and which can output the hydraulic pressure in the front pressure chamber $R_1$ by moving the drive piston 13 with the brake pedal 15. The wheel cylinders 21FR, 21FL, 21RR, and 21RL are coupled to the front pressure chamber $R_1$ and rear pressure chamber $R_2$ via the master cut valves 314 and 315. When the master cut valves 314 and 315 are closed, the hydraulic pressure adjusted by the pressure control valve 44 can be output to the wheel cylinders 21FR, 21FL, 21RR, and 21RL. When the master cut valves 314 and 315 are open, the hydraulic pressure in the front pressure chamber $R_1$ can be output to the wheel cylinders 21FR and 21FL, and the hydraulic pressure adjusted by the pressure control valve 44 can be output to the rear pressure chamber $R_2$ and the wheel cylinders 21RR and 21RL.

Therefore, when the power supply system is normal, the ECU 71 sets the target control pressure according to the pedal stroke Sp and controls the pressure control valve 44 on the basis of the target control pressure, so that the proper hydraulic pressure can be supplied from the accumulator 42 to the second hydraulic pipe 28 by the pressure control valve 44. The control oil is made act on the wheel cylinders 21FR, 21FL, 21RR, and 21RL via the ABS 22, and proper braking force according to the operation force on the brake pedal 15 of the occupant can be generated for the front wheels FR and FL and the rear wheels RR and RL.

On the other hand, when a failure occurs in the power supply system, by opening of the master cut valves 314 and 315, the drive piston 13 moves according to the operation of the brake pedal 15, the front pressure chamber $R_1$ is pressurized, and the hydraulic pressure in the front pressure chamber $R_1$ acts as the external pressure on the pressure control valve 44. As a result, the proper hydraulic pressure is supplied from the accumulator 42 to the rear pressure chamber $R_2$ by the pressure control valve 44 to assist the drive piston 13. The proper control pressure can be supplied to the hydraulic pipes 24 and 28. The control oil can be made act on the wheel cylinders 21FR, 21FL, 21RR, and 21RL via the ABS 22, and proper braking force according to the operation force on the brake pedal 15 of the occupant can be generated to the front wheels FR and FL and the rear wheels RR and RL.

In the embodiment, the external pressure supply pipe 46 coupling the front pressure chamber $R_1$ in the master cylinder 11 and the pressure control valve 44 is provided with the open/close valve 318 which is closed when current is passed. Therefore, when the power supply system is normal, the external pressure supply pipe 46 is closed by the open/close valve 318, so that the hydraulic pressure in the front pressure chamber $R_1$ in the master cylinder 11 does not act on the pressure control valve 44 but a regenerative cooperation control can be performed. On the other hand, at the time of a failure in the power supply system, the external pressure supply pipe 46 is opened by the open/close valve 318. As a result, the hydraulic pressure in the front pressure chamber $R_1$ in the master cylinder 11 can be made act as an external pressure on the pressure control valve 44.

The coupling pipe 319 coupling the rear pressure chamber $R_2$ in the master cylinder 11 and the reservoir tank 33 is provided with the negative pressure preventing valve 320 which is opened when current is passed. Therefore, since the coupling pipe 319 is opened by the negative pressure preventing valve 320 when the power supply system is normal, when the drive piston 13 in the master cylinder 11 moves forward, the hydraulic pressure is added to the rear pressure chamber $R_2$ from the reservoir tank 33, and the drive piston 13 can be operated properly. On the other hand, the coupling pipe 319 is closed by the negative pressure preventing valve 320 when the power supply system fails. Thus, leakage of the hydraulic pressure from the rear pressure chamber $R_2$ can be prevented.

Further, the coupling pipe 321 coupling the hydraulic pressure supply pipes 25a and 25b of the front wheels FR and FL and the hydraulic pressure supply pipes 29a and 29b of the rear wheels RR and RL is provided with the open/close valve 322 which is open when current is passed. Therefore, since the coupling pipe 321 is opened by the open/close valve 322 when the power supply system is normal, the hydraulic pressure adjusted by the pressure control valve 44 can be made act on the wheel cylinders 21FR, 21FL, 21RR, and 21RL. On the other hand, the coupling pipe 321 is closed by the open/close valve 322 when the power supply system fails. Thus, the master cylinder 11 can be properly assisted by the hydraulic pressure adjusted by the pressure control valve 44.

As described above, in the embodiment, by applying the pressure control valve 44 which is operated by the electromagnetic force and the external pressure, the control pressure according to the operation of the brake pedal 15 of the occupant can be reliably generated irrespective of the state of the power supply system. As a result, the hydraulic path is simplified and the structure can be simplified. In addition, the manufacture cost can be reduced. Moreover, proper braking force control can be realized, and reliability and safety can be improved.

Fifth Embodiment

Figure 7:
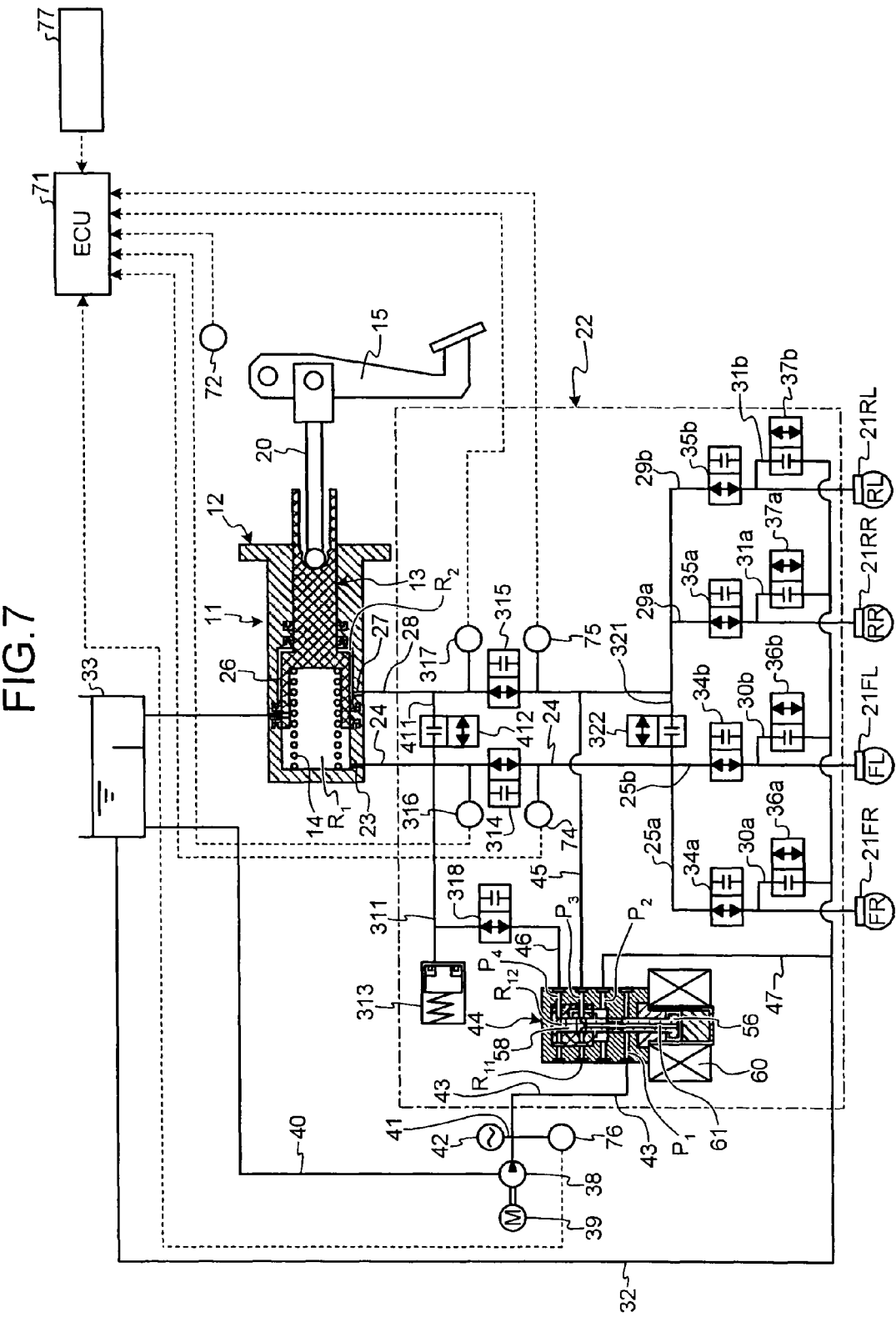
FIG. 7 is a schematic configuration diagram showing a brake apparatus for a vehicle according to a fifth embodiment of the invention.

FIG. 7 is a schematic configuration diagram showing a brake apparatus for a vehicle according to a fifth embodiment of the invention. The same reference numerals are designated to members having functions similar to those of the foregoing embodiments and repetitive description will not be given.

In the brake apparatus for a vehicle of the fifth embodiment, as shown in FIG. 7, the master cylinder 11 is constructed so that the drive piston 13 is supported movably in the axial direction in the cylinder 12. The drive piston 13 is supported so as to be energized in one direction by the energizing force of the reaction force spring 14. The front end of the operation rod 20 in the brake pedal 15 is coupled to the drive piston 13. Therefore, when the driver steps on the brake pedal 15, the operation force is transmitted to the drive piston 13 via the operation rod 20, and the drive piston 13 can move forward against the energizing force of the reaction force spring 14. In the cylinder 12, the front pressure chamber $R_1$ and the rear pressure chamber $R_2$ are defined by the drive piston 13.

On the other hand, the front wheels FR and FL and rear wheels RR and RL are provided with the wheel cylinders 21FR, 21FL, 21RR, and 21RL for operating the brake apparatus, and can be operated by the ABS 22. Specifically, the two hydraulic pipes 24 and 28 are coupled to the master cylinder 11. To the external pressure supply pipe 46 which is coupled to the first hydraulic pipe 24, the stroke simulator 313 is connected via the coupling pipe 311. The master cut valves 314 and 315 which are closed when current is passed are attached to the hydraulic pipes 24 and 28. The master cylinder pressure sensors 316 and 317 for detecting the hydraulic pressure in the hydraulic pipes 24 and 28 are attached on the upstream side (on the master cylinder 11 side) of the master cut valves 314 and 315.

The hydraulic pump 38 can be driven by the motor 39 and is coupled to the reservoir tank 33 via the pipe 40 and coupled to the accumulator 42 via the pipe 41. The accumulator 42 is coupled to the pressure control valve 44 via the high-pressure supply pipe 43. The pressure control valve 44 adjusts the hydraulic pressure accumulated in the accumulator 42 by electromagnetic force and can output the adjusted hydraulic pressure to the wheel cylinders 21RR and 21RL of the ABS 22. The pressure control valve 44 also adjusts the hydraulic pressure accumulated in the accumulator 42 by hydraulic pressure from the front pressure chamber $R_1$ in the master cylinder 11 and can output the adjusted hydraulic pressure to the rear pressure chamber $R_2$ in the master cylinder 11 and the wheel cylinders 21RR and 21RL of the ABS 22. Consequently, the pressure control valve 44 is coupled to the second hydraulic pipe 28 via the control pressure supply pipe 45, coupled to the first hydraulic pipe 24 via the external pressure supply pipe 46, and coupled to the third hydraulic pipe 32 via the reduced-pressure supply pipe 47.

The external pressure supply pipe 46 coupling the front pressure chamber $R_1$ in the master cylinder 11 and the pressure control valve 44 is provided with the open/close valve 318 which is closed when current is passed. Further, a coupling pipe 411 coupling the first hydraulic pipe 24 communicated with the front pressure chamber $R_1$ in the master cylinder 11 and the second hydraulic pipe 28 communicated with the rear pressure chamber $R_2$ is provided. The coupling pipe 411 is provided with a negative pressure preventing valve 412 which is open when current is passed. At the tips of the hydraulic pipes 24 and 28, the hydraulic supply pipes 25a and 25b for the front wheels and the hydraulic supply pipes 29a and 29b for the rear wheels are coupled via the coupling pipe 321. The coupling pipe 321 is provided with the open/close valve 322 which is open when current is passed.

A braking force control by the brake apparatus for a vehicle in the embodiment will be described concretely. When an occupant steps on the brake pedal 15, the drive piston 13 is moved forward by the operation force. At this time, the stroke sensor 72 detects the pedal stroke Sp, and the ECU 71 sets the target control pressure on the basis of the pedal stroke Sp. The ECU 71 controls the pressure control valve 44 on the basis of the target control pressure to make the predetermined control pressure act on the ABS 22.

Normally, the master cut valves 314 and 315 are closed and, the open/close valve 318 is closed, the negative pressure preventing valve 412 is opened, and the open/close valve 322 is opened. Consequently, when current is passed to the coil 60 in the pressure control valve 44 and the drive valve 56 is moved by the generated attraction force, the high-pressure port $P_1$ becomes communicated with the control pressure port $P_3$ via the communication hole 61. The hydraulic pressure in the accumulator 42 is supplied from the high pressure supply pipe 43 to the high-pressure port $P_1$, supplied to the first pressure chamber $R_{11}$ via the communication hole 61, and supplied to the second hydraulic pipe 28 via the control pressure supply pipe 45 from the control pressure port $P_3$. The hydraulic pressure supplied to the second hydraulic pipe 28 is discharged to the ABS 22. Since the open/close valve 318 provided for the external pressure supply pipe 46 is in the closed state at this moment, the hydraulic pressure in the front pressure chamber $R_1$ in the master cylinder 11 does not act on the pressure control valve 44 via the external pressure supply pipe 46. Since the negative pressure preventing valve 412 provided for the coupling pipe 411 is in the open state, when the drive piston 13 in the master cylinder 11 moves forward, the hydraulic pressure discharged from the front pressure chamber $R_1$ to the first hydraulic pipe 24 flows to the second hydraulic pipe 28 via the coupling pipe 411 and is added to the rear pressure chamber $R_2$. Thus, the drive piston 13 operates properly.

Therefore, the control pressure of the second hydraulic pipe 28 is supplied to the hydraulic pressure supply pipes 29a and 29b on the rear wheel side, and is also supplied to the hydraulic pressure supply pipes 25a and 25b on the front wheel side via the coupling pipe 321 opened by the open/close valve 322. That is, the brake hydraulic pressure is applied to the wheel cylinders 21FR and 21FL of the front wheels FR and FL, and applied to the wheel cylinders 21RR and 21RL of the rear wheels RR and RL. As a result, the braking force according to the operation force on the brake pedal 15 of the occupant can be generated to the front wheels FR and FL and the rear wheels RR and RL.

When a failure occurs in the power supply system, the master cut valves 314 and 315 are opened, the open/close valve 318 is opened, the negative pressure preventing valve 412 is closed, and the open/close valve 322 is closed. Consequently, when the occupant steps on the brake pedal 15, the drive piston 13 is moved forward by the operation force, and the front pressure chamber $R_1$ is pressurized by the forward movement of the drive piston 13. As a result, the hydraulic pressure in the front pressure chamber $R_1$ is discharged as an external pressure to the first hydraulic pipe 24, discharged to the pressure control valve 44 via the external pressure supply pipe 46, and discharged to the front wheel side of the ABS 22 via the master cut valve 314.

In the pressure control valve 44, the external pressure acts on the second pressure chamber $R_{12}$ from the external pressure supply pipe 46 via the external pressure port $P_4$, and the external piston 58 moves forward, thereby pressing the drive valve 56. The high-pressure port $P_1$ becomes communicated with the control pressure port $P_3$ via the communication hole 61. Consequently, the hydraulic pressure of the accumulator 42 is supplied from the high-pressure supply pipe 43 to the high pressure port $P_1$, supplied to the first pressure chamber $R_{11}$ via the communication hole 61, and supplied from the control pressure port $P_3$ to the second hydraulic pipe 28 via the control pressure supply pipe 45. The hydraulic pressure acts and assists from the second hydraulic pipe 28 onto the rear pressure chamber $R_2$ via the master cut valve 315, and is discharged to the rear wheel side of the ABS 22.

The hydraulic pressure of the front pressure chamber $R_1$ in the master cylinder 11 is supplied to the hydraulic supply pipes 25a and 25b on the front wheel side through the first hydraulic pipe 24, and the hydraulic pressure of the rear pressure chamber $R_2$ is supplied to the hydraulic supply pipes 29a and 29b on the rear wheel side through the second hydraulic pipe 28. That is, the brake hydraulic pressure is applied to the wheel cylinders 21FR and 21FL of the front wheels FR and FL, and applied to the wheel cylinders 21RR and 21RL of the rear wheels RR and RL. Thus, the braking force according to the operation force on the brake pedal 15 of the occupant can be generated to the front wheels FR and FL and the rear wheels RR and RL.

As described above, the brake apparatus for a vehicle of the fifth embodiment is provided with the master cylinder 11 in which the front pressure chamber $R_1$ and the rear pressure chamber $R_2$ are defined by movably supporting the drive piston 13 in the cylinder 12 and which can output the hydraulic pressure in the front pressure chamber $R_1$ by moving the drive piston 13 with the brake pedal 15. The wheel cylinders 21FR, 21FL, 21RR, and 21RL are coupled to the front pressure chamber $R_1$ and rear pressure chamber $R_2$ via the master cut valves 314 and 315. When the master cut valves 314 and 315 are closed, the hydraulic pressure adjusted by the pressure control valve 44 can be output to the wheel cylinders 21FR, 21FL, 21RR, and 21RL. When the master cut valves 314 and 315 are open, the hydraulic pressure in the front pressure chamber $R_1$ can be output to the wheel cylinders 21FR and 21FL, and the hydraulic pressure adjusted by the pressure control valve 44 can be output to the rear pressure chamber $R_2$ and the wheel cylinders 21RR and 21RL.

Therefore, when the power supply system is normal, the ECU 71 sets the target control pressure according to the pedal stroke Sp and controls the pressure control valve 44 on the basis of the target control pressure, so that the proper control pressure can be supplied from the accumulator 42 to the second hydraulic pipe 28 by the pressure control valve 44. The control oil is made act on the wheel cylinders 21FR, 21FL, 21RR, and 21RL via the ABS 22, and proper braking force according to the operation force on the brake pedal 15 of the occupant can be generated for the front wheels FR and FL and the rear wheels RR and RL.

On the other hand, when a failure occurs in the power supply system, by opening of the master cut valves 314 and 315, the drive piston 13 moves according to the operation of the brake pedal 15, the front pressure chamber $R_1$ is pressurized, and the hydraulic pressure in the front pressure chamber $R_1$ acts as the external pressure on the pressure control valve 44. As a result, the proper hydraulic pressure is supplied from the accumulator 42 to the rear pressure chamber $R_2$ by the pressure control valve 44 to assist the drive piston 13. The proper control pressure can be supplied to the hydraulic pipes 24 and 28. The control oil can be made act on the wheel cylinders 21FR, 21FL, 21RR, and 21RL via the ABS 22, and proper braking force according to the operation force on the brake pedal 15 of the occupant can be generated to the front wheels FR and FL and the rear wheels RR and RL.

In the embodiment, the coupling pipe 411 coupling the first hydraulic pipe 24 communicated with the front pressure chamber $R_1$ in the master cylinder 11 and the second hydraulic pipe 28 communicated with the rear pressure chamber $R_2$ is provided with the negative pressure preventing valve 412 which is opened when current is passed. Therefore, when the power supply system is normal, the coupling pipe 411 is opened by the negative pressure preventing valve 412, so that the hydraulic pressure discharged from the front pressure chamber $R_1$ to the first hydraulic pipe 24 when the drive piston 13 in the master cylinder 11 moves forward flows to the second hydraulic pipe 28 via the coupling pipe 411 and added to the rear pressure chamber $R_2$. Consequently, the drive piston 13 can be operated properly. On the other hand, the coupling pipe 411 is closed by the negative pressure preventing valve 412 when the power supply system fails. By making the control pressure from the pressure control valve 44 act only on the rear pressure chamber $R_2$, the pressure piston 14 can be assisted properly. Since a part of the hydraulic pressure discharged from the front pressure chamber $R_1$ flows in the rear pressure chamber $R_2$ when the power supply system is normal, the supply amount of the hydraulic pressure flowing from the front pressure chamber $R_1$ to the stroke simulator 313 is reduced. Therefore, the simulator cut valve can be made unnecessary, and it can contribute to simplification of the structure and reduction in the cost.

Sixth Embodiment

Figure 8:
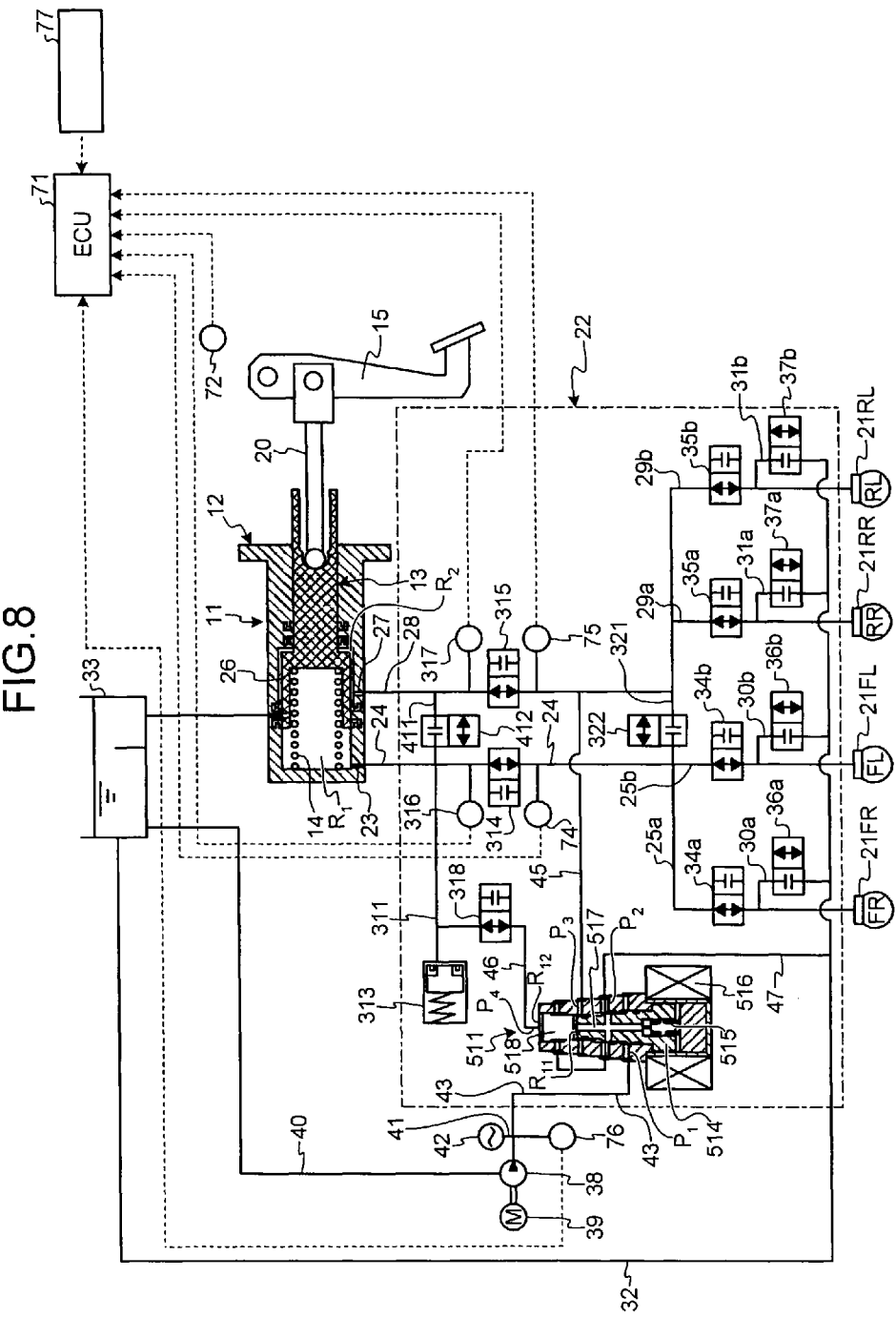
FIG. 8 is a schematic configuration diagram showing a brake apparatus for a vehicle according to a sixth embodiment of the invention.
Figure 9:
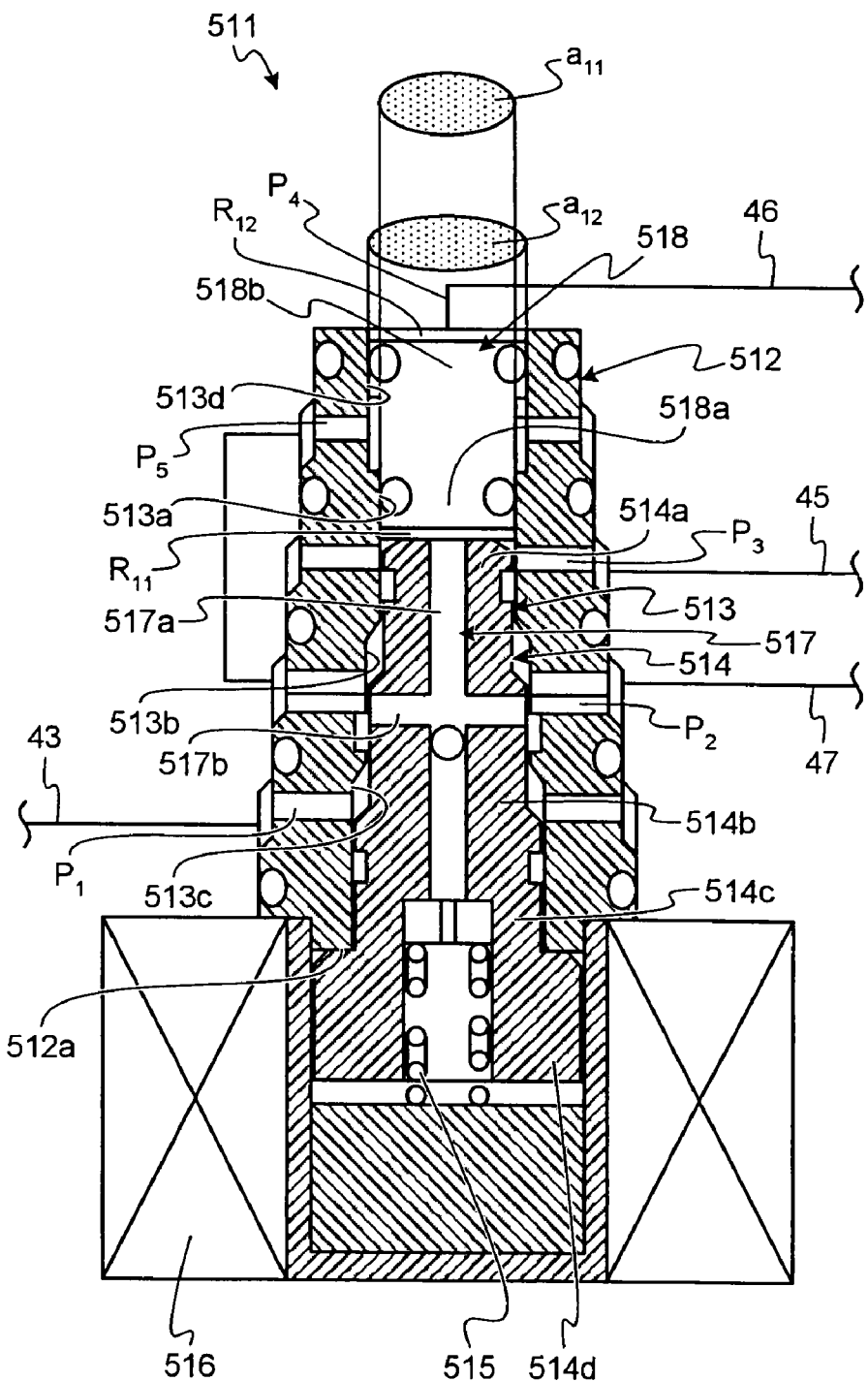
FIG. 9 is a cross sectional diagram of a pressure control valve in the brake apparatus for a vehicle of the sixth embodiment.

FIG. 8 is a schematic configuration diagram showing a brake apparatus for a vehicle according to a sixth embodiment of the invention. FIG. 9 is a cross sectional diagram of a pressure control valve in the brake apparatus for a vehicle of the sixth embodiment. The same reference numerals are designated to members having functions similar to those of the foregoing embodiments and repetitive description will not be given.

In the brake apparatus for a vehicle of the sixth embodiment, as shown in FIG. 8, the master cylinder 11 is constructed so that the drive piston 13 is supported movably in the axial direction in the cylinder 12. The drive piston 13 is supported so as to be energized in one direction by the energizing force of the reaction force spring 14. In the brake pedal 15, the front end of the operation rod 20 is coupled to the drive piston 13. Therefore, when the driver steps on the brake pedal 15, the operation force is transmitted to the drive piston 13 via the operation rod 20, and the drive piston 13 can move forward against the energizing force of the reaction force spring 14. In the cylinder 12, the front pressure chamber $R_1$ and the rear pressure chamber $R_2$ are defined by the drive piston 13.

On the other hand, the front wheels FR and FL and rear wheels RR and RL are provided with the wheel cylinders 21FR, 21FL, 21RR, and 21RL and can be operated by the ABS 22. Specifically, the two hydraulic pipes 24 and 28 are coupled to the master cylinder 11. To the external pressure supply pipe 46 which is coupled to the first hydraulic pipe 24, the stroke simulator 313 is connected via the coupling pipe 311. The master cut valves 314 and 315 which are closed when current is passed are attached to the hydraulic pipes 24 and 28. The master cylinder pressure sensors 316 and 317 for detecting the hydraulic pressure in the hydraulic pipes 24 and 28 are attached on the upstream side (on the master cylinder 11 side) of the master cut valves 314 and 315.

The hydraulic pump 38 can be driven by the motor 39 and is coupled to the reservoir tank 33 via the pipe 40 and coupled to the accumulator 42 via the pipe 41. The accumulator 42 is coupled to a pressure control valve 511 via the high-pressure supply pipe 43. The pressure control valve 511 adjusts the hydraulic pressure accumulated in the accumulator 42 by electromagnetic force and can output the adjusted hydraulic pressure to the wheel cylinders 21RR and 21RL of the ABS 22. The pressure control valve 511 also adjusts the hydraulic pressure accumulated in the accumulator 42 by hydraulic pressure from the front pressure chamber $R_1$ in the master cylinder 11 and can output the adjusted hydraulic pressure to the rear pressure chamber $R_2$ in the master cylinder 11 and the wheel cylinders 21RR and 21RL of the ABS 22.

In the pressure control valve 511, as shown in FIG. 9, a housing 512 has a cylindrical shape. By forming a plurality of steps in the axial direction in a through hole 513 formed on the inside, three support holes 513a, 513b, and 513c whose diameters increase downward are formed. A drive valve 514 is supported movably in the vertical direction in the through hole 513. The drive valve 514 has support parts 514a, 514b, and 514c movably supported in the support holes 513a, 513b, and 513c and a large-diameter part 514d. The drive valve 514 is supported so as to be energized upward by a return spring 515. Consequently, the large-diameter part 514d is energized and supported in a position where it comes into contact with the step portion 512a. By passing current to a solenoid 516, the large-diameter part 514d can be moved downward by an electromagnetic force generated.

In the housing 512, the high-pressure port $P_1$, the pressure reduction port $P_2$, and the control pressure port $P_3$ are formed. On the other hand, in the drive valve 514, a communication path 517 where a first through hole 517a along the axial direction and a through hole 517b along the radial direction cross each other is formed.

In an upper part of the through hole 513 in the housing 512, a support hole 513d having a diameter larger than that of the support hole 513a is formed. In the through hole 513, an external piston 518 is supported in series above the drive valve 514 so as to be movable in the vertical direction. The external piston 518 has support parts 518a and 518b movably supported in the support holes 513a and 513d.

The drive valve 514 and the external piston 518 are movably supported in the housing 512. By the housing 512, the drive valve 514, and the external piston 518, the first pressure chamber $R_{11}$ is formed on the front side of the external piston 518. By the housing 512 and the external piston 518, the second pressure chamber $R_{12}$ is defined and formed in a position on the rear side of the external piston 518. In the housing 512, the external pressure port $P_4$ and an adjusted pressure port $P_5$ are formed. The control pressure port $P_3$ is communicated with the first pressure chamber $R_{11}$ positioned between the drive valve 514 and the external piston 518. The pressure reduction port $P_2$ and the adjusted pressure port P5 are communicated with each other on the outside.

In this case, the external piston 518 has the steps, and a pressure reception area $a_{11}$ of the first pressure chamber $R_{11}$ defined between the external piston 518 and the drive valve 514 on the front side is set to be smaller than a pressure reception area $a_{12}$ of the second pressure chamber $R_{12}$ on which the hydraulic pressure from the front pressure chamber $R_1$ acts on the rear side of the external piston 518. That is, the outer diameters of the support parts 558a and 558b of the external piston 518 are set so that the pressure reception area $a_{11}$ of the hydraulic pressure received by the support part 518a in the external piston 518 from the first pressure chamber $R_{11}$ and the pressure reception area $a_{12}$ of the hydraulic pressure received by the support part 518b in the external piston 518 satisfy the relation $a_{11} < a_{12}$.

Therefore, when current is not passed to the solenoid 516, the drive valve 514 is positioned upward by the energizing force of the return spring 515. The control pressure port $P_3$, the first pressure chamber $R_{11}$, and the pressure reduction port $P_2$ are communicated with each other via the communication path 517, and the high-pressure port $P_1$ is interrupted. On the other hand, when current is passed to the solenoid 516, the drive valve 514 moves downward by the electromagnetic force against the energizing force of the return spring 515. The high-pressure port $P_1$, the first pressure chamber $R_{11}$, and the control pressure port $P_3$ become communicated with each other via the communication path 517, and the pressure reduction port $P_2$ is interrupted. When the external pressure acts on the external pressure port $P_4$, the external piston 518 moves downward, and the drive valve 514 is moved downward against the energizing force of the return spring 515. Similarly, the high-pressure port $P_1$, the first pressure chamber $R_{11}$, and the control pressure port $P_3$ are communicated with each other via the communication path 517.

As shown in FIG. 8, the high-pressure supply pipe 43 extending from the hydraulic pipe 38 and the accumulator 42 is coupled to the high-pressure port $P_1$ of the pressure control valve 511. In the pressure control valve 511, the control pressure port $P_3$ is coupled to the second hydraulic pipe 28 via the control pressure supply pipe 45, the external pressure port $P_4$ is coupled to the first hydraulic pipe 24 via the external pressure supply pipe 46, and the reduced-pressure port $P_2$ is coupled to the third hydraulic pipe 32 via the reduced-pressure supply pipe 47.

The braking force control in the brake apparatus for a vehicle of the embodiment will be described concretely. When the occupant steps on the brake pedal 15, the drive piston 13 is moved forward by the operation force. At this moment, the stroke sensor 72 detects the pedal stroke Sp, and the ECU 71 sets a target control pressure on the basis of the pedal stroke Sp. The ECU 71 controls the pressure control valve 511 on the basis of the target control pressure, and makes a predetermined control pressure act on the ABS 22.

Normally, the master cut valves 314 and 315 are closed, the open/close valve 318 is closed, the negative pressure preventing valve 412 is opened, and the open/close valve 322 is opened. Consequently, when current is passed to the solenoid 516 in the pressure control valve 511 and the drive valve 514 is moved by the electromagnetic force generated, the high-pressure port $P_1$ becomes communicated with the control pressure port $P_3$ via the communication path 517. The hydraulic pressure in the accumulator 42 is supplied from the high pressure supply pipe 43 to the high-pressure port $P_1$, supplied to the first pressure chamber $R_{11}$ via the communication path 517, and supplied to the second hydraulic pipe 28 via the control pressure supply pipe 45 from the control pressure port $P_3$. The hydraulic pressure supplied to the second hydraulic pipe 28 is discharged to the ABS 22.

Therefore, the control pressure of the second hydraulic pipe 28 is supplied to the hydraulic pressure supply pipes 29a and 29b on the rear wheel side, and is also supplied to the hydraulic pressure supply pipes 25a and 25b on the front wheel side via the coupling pipe 321 opened by the open/close valve 322. That is, the brake hydraulic pressure is applied to the wheel cylinders 21FR and 21FL of the front wheels FR and FL, and applied to the wheel cylinders 21RR and 21RL of the rear wheels RR and RL. As a result, the braking force according to the operation force on the brake pedal 15 of the occupant can be generated to the front wheels FR and FL and the rear wheels RR and RL.

In the case where a failure occurs in the power supply system, the master cut valves 314 and 315 are opened, the open/close valve 318 is opened, the negative pressure preventing valve 412 is closed, and the open/close valve 322 is closed. Consequently, when an occupant steps on the brake pedal 15, the drive piston 13 is moved forward by the operation force. By the forward movement of the drive piston 13, the front pressure chamber $R_1$ is pressurized. Consequently, the hydraulic pressure in the front pressure chamber $R_1$ is discharged as external pressure to the first hydraulic pipe 24, discharged to the pressure control valve 511 via the external pressure supply pipe 46, and discharged to the front wheel side of the ABS 22 through the master cut valve 314.

In the pressure control valve 511, the external pressure acts on the second pressure chamber $R_{12}$ from the external pressure supply pipe 46 via the external pressure port P4, and the external piston 518 moves forward, thereby pressing the drive valve 514. The high-pressure port $P_1$ is communicated with the control pressure port P3 via the communication path 517. Consequently, the hydraulic pressure of the accumulator 42 is supplied from the high-pressure supply pipe 43 to the high pressure port P1, supplied to the first pressure chamber $R_{11}$ via the communication path 517, and supplied from the control pressure port P3 to the second hydraulic pipe 28 via the control pressure supply pipe 45.

In this case, in the external piston 518, the pressure reception area $a_{11}$ of the first pressure chamber $R_{11}$ is set smaller than the pressure reception area $a_{12}$ of the second pressure chamber $R_{12}$. Therefore, the drive force of the pressure control valve 511 for pressing the drive valve 514 becomes larger than the hydraulic pressure acted from the front pressure chamber $R_1$ onto the second pressure chamber $R_{12}$. The hydraulic pressure higher than the hydraulic pressure discharged from the front pressure chamber $R_1$ is discharged to the control pressure supply pipe 45. The control pressure from the pressure control valve 511 acts from the second hydraulic pipe 28 to the rear pressure chamber $R_2$ via the master cut valve 315 to assist the drive piston 13, and is discharged to the rear wheel side of the ABS 22.

The hydraulic pressure of the front pressure chamber $R_1$ in the master cylinder 11 is supplied to the hydraulic supply pipes 25a and 25b on the front wheel side through the first hydraulic pipe 24, and the hydraulic pressure of the rear pressure chamber $R_2$ is supplied to the hydraulic supply pipes 29a and 29b on the rear wheel side through the second hydraulic pipe 28. That is, the brake hydraulic pressure is applied to the wheel cylinders 21FR and 21FL of the front wheels FR and FL, and applied to the wheel cylinders 21RR and 21RL of the rear wheels RR and RL. Thus, the braking force according to the operation force of the brake pedal 15 of the occupant can be generated to the front wheels FR and FL and the rear wheels RR and RL.

A servo ratio Rs of the master cylinder 11 in the case where a failure occurs in the power supply system is defined as follows.

$$Rs = [A_1 - (A_1 - A_2)] \times (a_{12}/a_{11})$$

$$a_{12} > a_{11}$$

$$A_1 > (A_2 - A_2) \times (a_{12}/a_{11})$$

As described above, the brake apparatus for a vehicle of the sixth embodiment is provided with the master cylinder 11 in which the front pressure chamber $R_1$ and the rear pressure chamber $R_2$ are defined by movably supporting the drive piston 13 in the cylinder 12 and which can output the hydraulic pressure in the front pressure chamber $R_1$ by moving the drive piston 13 with the brake pedal 15. The brake apparatus has the pressure control valve 511 which can output the control pressure to the rear pressure chamber $R_2$ and the wheel cylinders 21RR and 21RL. The control pressure is obtained by adjusting the hydraulic pressure from the accumulator 42 by coupling the wheel cylinders 21FR and 21FL to the front pressure chamber $R_1$ and moving the drive valve 514 by the electromagnetic force based on the target control pressure.

The pressure control valve 511 can output the control pressure to the rear pressure chamber $R_2$ and the wheel cylinders 21RR and 21RL. The control pressure is obtained by adjusting the hydraulic pressure from the accumulator 42 by moving the drive valve 514 by the external pressure from the front pressure chamber $R_1$. The pressure reception area $a_{11}$ of the first pressure chamber $R_{11}$ defined between the external piston 518 and the drive valve 514 on the front side of the external piston 518 is set to be smaller than the pressure reception area $a_{12}$ of the second pressure chamber $R_{12}$ on which the hydraulic pressure from the front pressure chamber $R_1$ acts on the rear side of the external piston 518.

Therefore, when the power supply system fails, the drive piston 13 moves according to the operation on the brake pedal 15, the front pressure chamber $R_1$ is pressurized, and the hydraulic pressure in the front pressure chamber $R_1$ acts as an external pressure on the pressure control valve 511. The hydraulic pressure from the accumulator 42 and increased by the pressure control valve 511 acts on the rear pressure chamber $R_2$ and assists the drive piston 13. Consequently, the proper control pressure can be supplied to each of the hydraulic pipes 24 and 28. The proper control oil is made act on the wheel cylinders 21FR, 21FL, 21RR, and 21RL via the ABS 22, and proper braking force according to the operation force on the brake pedal 15 of the occupant can be generated for the front wheels FR and FL and the rear wheels RR and RL.

By introducing the hydraulic pressure higher than that of the front pressure chamber $R_1$ into the rear pressure chamber $R_2$ in the master cylinder 11, the servo ratio can be set to be high, an operation reaction force can be assured, and safety can be improved.

Seventh Embodiment

Figure 10:
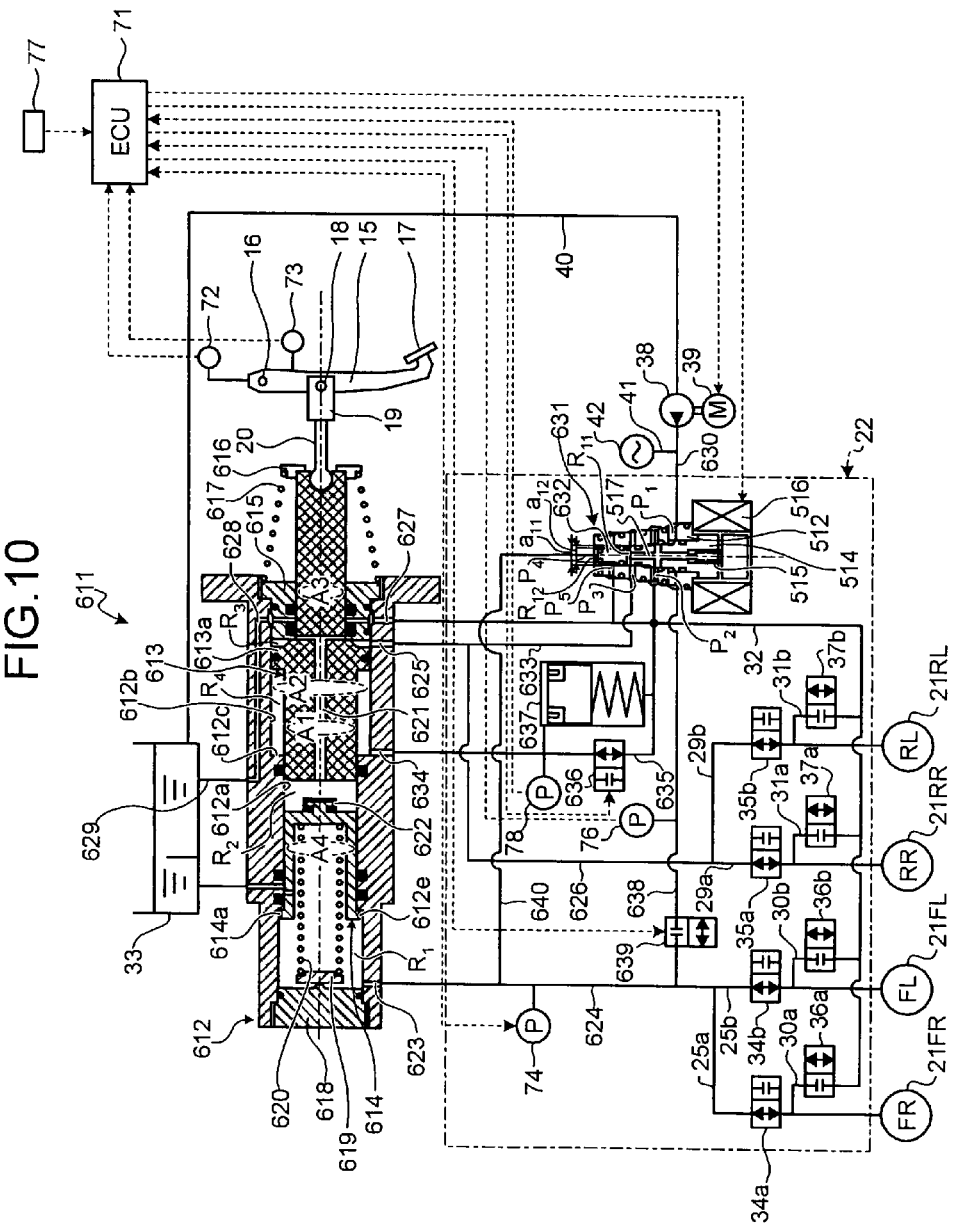
FIG. 10 is a schematic configuration diagram showing a brake apparatus for a vehicle according to a seventh embodiment of the invention.

FIG. 10 is a schematic configuration diagram showing a brake apparatus for a vehicle according to a seventh embodiment of the invention. The same reference numerals are designated to members having functions similar to those of the foregoing embodiments and repetitive description will not be given.

In the brake apparatus for a vehicle of the seventh embodiment, as shown in FIG. 10, a master cylinder 611 is constructed so that an input piston 613 as a drive piston and a pressure piston 614 are supported movably in the axial direction in a cylinder 612. To the base end of the input piston 613 disposed on the base end side of the cylinder 612, the operation rod 20 of the brake pedal 15 is coupled. By an operation on the brake pedal 15 of the occupant, the input piston 613 can be moved via the operation rod 20. The outer peripheral face of the input piston 613 engages with a first inner peripheral face 612a of the cylinder 12 and movably supported along the axial direction. The outer peripheral face of a flange 613a engages with a second inner peripheral face 612b having a diameter larger than that of the first inner peripheral face 612a of the cylinder 612 and is supported movably along the axial direction. The flange 613a comes into contact with a step portion 612c between the first and second inner peripheral faces 612a and 612b, thereby regulating the stroke on the forward travel side. When the flange 613a comes into contact with a support member 615, the stroke on the backward travel side is regulated.

The input piston 613 is supported so as to be energized in a position where the flange 613a comes into contact with the support member 615 by a reaction force spring 617 interposed between the support member 615 and a bracket 616.

The pressure piston 614 is disposed at the front end side of the input piston 613 in the cylinder 612. The outer peripheral face of the pressure piston 614 is movably supported by the first inner peripheral face 612a of the cylinder 612. The outer peripheral face of a flange 614a is movably supported by a third inner peripheral face 612d. When the flange 614a comes into contact with a lid member 618 or a step portion 612e, the stroke of the pressure piston 614 is regulated. The pressure piston 614 is supported and energized in a position where the flange 614a comes into contact with the step portion 612e by the energizing force of an energization spring 620 interposed between the pressure piston 614 and a support plate 619.

As described above, the input piston 613 and the pressure piston 614 are coaxially disposed in the cylinder 612 so that they can move relative to each other, thereby defining the front pressure chamber $R_1$, the rear pressure chamber $R_2$, the circulating pressure chamber $R_3$, and the reaction force chamber $R_4$. The rear pressure chamber $R_2$ and the circulating pressure chamber $R_3$ are communicated with each other via a communication path 621 formed in the input piston 613. When the input piston 613 approaches the pressure piston 614, a seal member (closing member) 622 is attached to the rear end face of the pressure piston 614.

On the other hand, the front wheels FR and FL and the rear wheels RR and RL are provided with the wheel cylinders 21FR, 21FL, 21RR, and 21RL and can be operated by the ABS 22. Specifically, a first hydraulic pipe 624 is coupled to a first pressure port 623 communicated with the front pressure chamber $R_1$ in the master cylinder 611. The first hydraulic pipe 624 is coupled to the wheel cylinders 21FR and 21FL via the hydraulic pressure supply pipes 25a and 25b. A second hydraulic pipe 626 is coupled to a second pressure port 625 communicated with the circulating pressure chamber $R_3$ in the master cylinder 611. The second hydraulic pipe 626 is coupled to the wheel cylinders 21RR and 21RL via the hydraulic pressure supply pipes 29a and 29b.

The hydraulic exhaust pipes 30a and 30b are coupled to the hydraulic supply pipes 25a and 25b, and the hydraulic exhaust pipes 31a and 31b are coupled to the hydraulic supply pipes 29a and 29b. The ends of the hydraulic exhaust pipes 30a, 30b, 31a, and 31b are gathered and coupled to the third hydraulic pipe 32. The third hydraulic pipe 32 is coupled to a fourth pressure port 627 of the master cylinder 611 and coupled to the reservoir tank 33 from the fifth pressure port 627 via a hydraulic supply/exhaust pipe 629.

In the hydraulic supply pipes 25a, 25b, 29a, and 29b, the pressure boosting valves 34a, 34b, 35a, and 35b are disposed. In the hydraulic exhaust pipes 30a, 30b, 31a, and 31b, the pressure reducing valves 36a, 36b, 37a, and 37b are disposed.

The hydraulic pump 38 can be driven by the motor 39 and is coupled to the reservoir tank 33 via the pipe 40 and coupled to the accumulator 42 via the pipe 41. The hydraulic pump 38 and the accumulator 42 are coupled to a pressure control valve 631 via a high-pressure supply pipe 630. The pressure control valve 631 can adjust the hydraulic pressure accumulated in the accumulator 42 by the electromagnetic force and output the adjusted hydraulic pressure to the rear pressure chamber $R_2$ in the master cylinder 611 and the wheel cylinders 21RR and 21RL of the ABS 22. The pressure control valve 631 can make the pressure piston 614 move forward by the hydraulic pressure to the rear pressure chamber $R_2$, and output the hydraulic pressure from the front pressure chamber $R_1$ in the master cylinder 611 to the wheel cylinders 21FR and 21FL in the ABS 22.

The pressure control valve 631 has a configuration similar to that of the pressure control valve 511 in the foregoing sixth embodiment except for the shape of the external piston. The drive valve 514 and an external piston 632 are movably supported in the housing 512, thereby forming the first pressure chamber $R_{11}$ on the front side of the external piston 518, and defining and forming the second pressure chamber $R_{12}$ on the rear side of the external piston 518. In this case, the external piston 632 has the steps, and the pressure reception area $a_{11}$ of the first pressure chamber $R_{11}$ defined between the external piston 518 and the drive valve 514 on the front side is set to be smaller than the pressure reception area $a_{12}$ of the second pressure chamber $R_{12}$ on which the hydraulic pressure from the front pressure chamber $R_1$ acts on the rear side of the external piston 518. That is, the outer diameter of the external piston 518 is set so that the pressure reception area $a_{11}$ of the hydraulic pressure received by the external piston 518 from the first pressure chamber $R_{11}$ and the pressure reception area $a_{12}$ of the hydraulic pressure received by the external piston 632 from the front pressure chamber $R_1$ satisfy the relation $a_{11} < a_{12}$.

Therefore, when current is not passed to the solenoid 516, the drive valve 514 is positioned upward by the energizing force of the return spring 515. The control pressure port $P_3$, the first pressure chamber $R_{11}$, and the pressure reduction port $P_2$ are communicated with each other via the communication path 517, and the high-pressure port $P_1$ is interrupted. On the other hand, when current is passed to the solenoid 516, the drive valve 514 moves downward by the electromagnetic force against the energizing force of the return spring 515. The high-pressure port $P_1$, the first pressure chamber $R_{11}$, and the control pressure port $P_3$ become communicated with each other via the communication path 517, and the pressure reduction port $P_2$ is interrupted. When the external pressure acts on the external pressure port $P_4$, the external piston 632 moves downward, and the drive valve 514 is moved downward against the energizing force of the return spring 515. Similarly, the high-pressure port $P_1$, the first pressure chamber $R_{11}$, and the control pressure port $P_3$ are communicated with each other via the communication path 517.

The high-pressure supply pipe 630 extending from the hydraulic pump 38 and the accumulator 42 is coupled to the high-pressure port $P_1$ of the pressure control valve 631. In the pressure control valve 631, the control pressure port P3 is coupled to the second hydraulic pipe 626 via the control pressure supply pipe 633.

One end of a fourth hydraulic pipe 635 is coupled to a third pressure port 634 communicated with the reaction force chamber $R_4$ in the master cylinder 611. The other end is coupled to the third hydraulic pipe 32 and the pressure reduction $P_2$ of the pressure control valve 631. A reaction force control valve 636 is attached to the fourth hydraulic pipe 635. The reaction force control valve 636 is an open/close valve of the normal open type and is closed when power is supplied. The fourth hydraulic pipe 635 is also provided with a stroke simulator 637.

Further, a coupling pipe 638 is stretched between the high-pressure port $P_1$ of the pressure control valve 631 and the first hydraulic pipe 624, and a communication valve 639 is attached to the coupling pipe 638. The communication valve 639 is an open/close valve of the normally-closed type and is opened when power is supplied. One end of an external pressure supply pipe 640 is coupled to the external port $P_4$ of the pressure control valve 631, and the other end is coupled to the first hydraulic pipe 624. Therefore, when the hydraulic pressure in the front pressure chamber $R_1$ acts as the external pressure on the external port $P_4$ via the first hydraulic pipe 624 and the external pressure supply pipe 640, the external piston 632 can be moved downward.

The ECU 71 (control pressure setting means) sets a target control pressure according to an operation force (pedal stroke or pedal effort) input from the pedal brake 15 to the input piston 613, outputs the set target control pressure to the wheel cylinders 21RR and 21RL of the rear wheel side by the pressure control valve 631, makes the target control pressure act on the rear pressure chamber $R_2$, assists the pressure piston 614, and outputs the control pressure from the front pressure chamber $R_1$ to the wheel cylinders 21FR and 21FL on the front wheel side. As a result, the proper brake hydraulic pressure is applied to each of the wheel cylinders 21FR, 21FL, 21RR, and 21RL via the ABS 22, and the braking force is applied to the front wheels FR and FL and the rear wheels RR and RL.

The brake pedal 15 is provided with the stroke sensor 72 for detecting the pedal stroke Sp, and the pedal effort sensor 73 for detecting the pedal effort Fp, and outputs the detection results to the ECU 71. The first hydraulic pipe 36 is provided with the first pressure sensor 74 for detecting a control pressure (master cylinder pressure) Pm and outputs the detection result to the ECU 71. On the side of the third pressure port 634 more than the reaction force control valve 636 in the fourth hydraulic pipe 635, the pressure sensor 78 for detecting a reaction force hydraulic pressure Pf of the reaction force chamber $R_4$ is provided, and the detection result is output to the ECU 71. The communication pipe 638 is provided with the pressure sensor 76 for detecting the hydraulic pressure supplied from the accumulator 42 to the communication pipe 638 via the pressure control valve 631, and the detection result is output to the ECU 71. The front wheels FR and FL and the rear wheels RR and RL are provided with the wheel speed sensor 77 for detecting wheel speed, and the detection result is output to the ECU 71.

The braking force control in the brake apparatus for a vehicle of the embodiment will be described concretely. When the driver steps on the brake pedal 15, the input piston 613 is moved forward by the operation force via the operation rod 20 against the energizing force of the reaction force spring 617. At this moment, although supply/discharge of the hydraulic pressure to the reaction force chamber $R_4$ is stopped by the reaction force control valve 636, the rear pressure chamber $R_2$ and the circulating pressure chamber $R_3$ are communicated with each other via the communication path 621. Therefore, the hydraulic pressure in the rear pressure chamber $R_2$ flows in the circulating pressure chamber $R_3$ via the communication path 621, and the input piston 613 slightly moves forward.

When the brake pedal 15 is stepped on, the pedal effort sensor 73 detects the pedal effort Fp, and the ECU 71 sets a target control pressure Pmt on the basis of the pedal effort Fp. The ECU 71 controls the pressure control valve 631 on the basis of the target control pressure Pmt, and outputs a predetermined control pressure.

When current is passed to the solenoid 516 in the pressure control valve 631 and the drive valve 514 is moved by the electromagnetic force generated, the high-pressure port $P_1$ becomes communicated with the control pressure port $P_3$ via the communication path 517. The hydraulic pressure in the accumulator 42 is supplied from the high pressure supply pipe 43 to the high-pressure port $P_1$, supplied to the first pressure chamber $R_{11}$ via the communication path 517, and supplied to the second hydraulic pipe 626 via the control pressure supply pipe 633 from the control pressure port $P_3$. The hydraulic pressure supplied to the second hydraulic pipe 626 is supplied from the second pressure port 625 of the master cylinder 611 to the annular pressure chamber $R_3$, acts on the rear pressure chamber $R_2$ via the communication path 621, and assists the pressure piston 614. The pressure piston 614 presses the front pressure chamber $R_1$ so that the proper control hydraulic pressure is discharged from the front pressure chamber $R_1$ to the first hydraulic pipe 624.

Therefore, the control pressure is applied from the first hydraulic pipe 624 to the wheel cylinders 21FR and 21FL of the front wheels FR and FL, and the control pressure is applied from the second hydraulic pipe 626 to the wheel cylinders 21RR and 21RL of the rear wheels RR and RL. The braking force according to the operation force on the brake pedal 15 of the driver can be generated to the front wheels FR and FL and the rear wheels RR and RL.

In the case where a failure occurs in the power supply system, by passing current to the solenoid 516 of the pressure control valve 631, the brake hydraulic pressure applied to the wheel cylinders 21FR, 21FL, 21RR, and 21RL cannot be controlled to proper hydraulic pressure. In the embodiment, the fourth hydraulic pipe 635 coupled to the third pressure port 634 of the reaction force chamber $R_4$ is provided with the reaction force control valve 636 of the electromagnetic type. When no current is passed, the fourth hydraulic pipe 635 is opened and communicated with the reservoir tank 33.

Consequently, at the time of a failure in the power supply system, when the driver steps on the brake pedal 15, the input piston 13 is moved forward by the operation force via the operation rod 20 against the energizing force of the reaction force spring 617. Since the supply/discharge of the hydraulic pressure to/from the reaction force chamber $R_4$ is permitted by the reaction force control valve 636, the input piston 613 moves forward. In this case, when the input piston 613 moves forward by a predetermined stroke, the front face of the input piston 613 comes into contact with the rear face of the pressure piston 614, so that the communication path 621 is closed by a seal member 622. The pressure piston 614 moves forward together with the input piston 613. By the forward movement of the drive piston 614, the hydraulic pressure in the front pressure chamber $R_1$ is discharged as external pressure to the first hydraulic pipe 624, and discharged to the pressure control valve 631 via the external pressure supply pipe 640.

In the pressure control valve 631, the external pressure acts on the second pressure chamber $R_{12}$ from the external pressure supply pipe 640 via the external pressure port $P_4$, and the external piston 632 moves forward, thereby pressing the drive valve 514. The high-pressure port $P_1$ is communicated with the control pressure port $P_3$ via the communication path 517. Consequently, the hydraulic pressure of the accumulator 42 is supplied from the high-pressure supply pipe 43 to the high pressure port $P_1$, supplied to the first pressure chamber $R_{11}$ via the communication path 517, and supplied from the control pressure port $P_3$ to the second hydraulic pipe 626 via the control pressure supply pipe 633.

In this case, in the external piston 623, the pressure reception area $a_{11}$ of the first pressure chamber $R_{11}$ is set larger than the pressure reception area $a_{12}$ of the second pressure chamber $R_{12}$. Therefore, the drive force of the pressure control valve 631 for pressing the drive valve 514 becomes smaller than the hydraulic pressure acted from the front pressure chamber $R_1$ onto the second pressure chamber $R_{12}$. The hydraulic pressure lower than the hydraulic pressure discharged from the front pressure chamber $R_1$ is discharged to the external pressure supply pipe 640. The control pressure from the pressure control valve 631 acts from the second hydraulic pipe 626 to the annular pressure chamber $R_3$, thereby assisting the pressure piston 614 via the input piston 613.

Therefore, the hydraulic pressure in the front pressure chamber $R_1$ in the master cylinder 611 is increased and supplied to the hydraulic supply pipes 25a and 25b on the front wheel side through the first hydraulic pipe 624. That is, the brake hydraulic pressure is applied to the wheel cylinders 21FR and 21FL of the front wheels FR and FL, and the braking force according to the operation force of the brake pedal 15 of the occupant can be generated to the front wheels FR and FL.

A servo ratio Rs of the master cylinder 611 in the case where a failure occurs in the power supply system is defined as follows.

$Rs=[A_1-(A_2-A_3)]\times(a_{12}/a_{11})$ $A_1=(A_2-A_3)$ $Rs=A_1/(A_1-A_1\times a_{12}/a_{11})=1/(1-a_{12}/a_{11})=a_{11}/(a_{11}-a_{12})$ $a_{11}>a_{12}$ $a_{11}/(a_{11}-a_{12})>A_1/A_3$ As described above, in the brake apparatus for a vehicle of the seventh embodiment, the front pressure chamber $R_1$, the rear pressure chamber $R_2$, the circulating pressure chamber $R_3$, and the reaction force chamber $R_4$ are defined by movably supporting the input piston 613 and the pressure piston 614 in the cylinder 12. The rear pressure chamber $R_2$ and the circulating pressure chamber $R_3$ are made communicated with the communication path 621. The pressure piston 614 is provided with the seal member 622 for closing the communication path 621 when the input piston 613 approaches the pressure piston 614. The pressure control valve 631 is provided, which can output a control pressure obtained by adjusting the hydraulic pressure from the accumulator 42 to the rear pressure chamber $R_2$ from the circulating pressure chamber $R_3$ via the communication path 621. The pressure reception area $a_{11}$ of the first pressure chamber $R_{11}$ on the front side of the external piston 632 is set to be larger than the pressure reception area $a_{12}$ of the second pressure chamber $R_{12}$ on the rear side.

Therefore, when the power supply system fails, the input piston 613 presses the pressure piston 614 according to the operation on the brake pedal 15. The pressure piston 614 moves, the front pressure chamber $R_1$ is pressurized, and the hydraulic pressure in the front pressure chamber $R_1$ acts as an external pressure on the pressure control valve 631. The hydraulic pressure from the accumulator 42 and increased by the pressure control valve 631 acts on the circulating pressure chamber $R_3$ and assists the pressure piston 614 via the input piston 613. Consequently, the proper control pressure can be supplied to each of the hydraulic pipes 624 and 626. The proper control oil is made act on the wheel cylinders 21FR, 21FL, 21RR, and 21RL via the ABS 22, and proper braking force according to the operation force on the brake pedal 15 of the occupant can be generated for the front wheels FR and FL and the rear wheels RR and RL.

By closing the communication path 621 with the seal member 622 when the input piston 613 approaches the pressure piston 614 and introducing the hydraulic pressure lower than that of the front pressure chamber $R_1$ into the circulating pressure chamber $R_3$ from the pressure control valve 631, the servo ratio can be set to be high, an operation reaction force can be assured, and safety can be improved.

Eighth Embodiment

Figure 11:
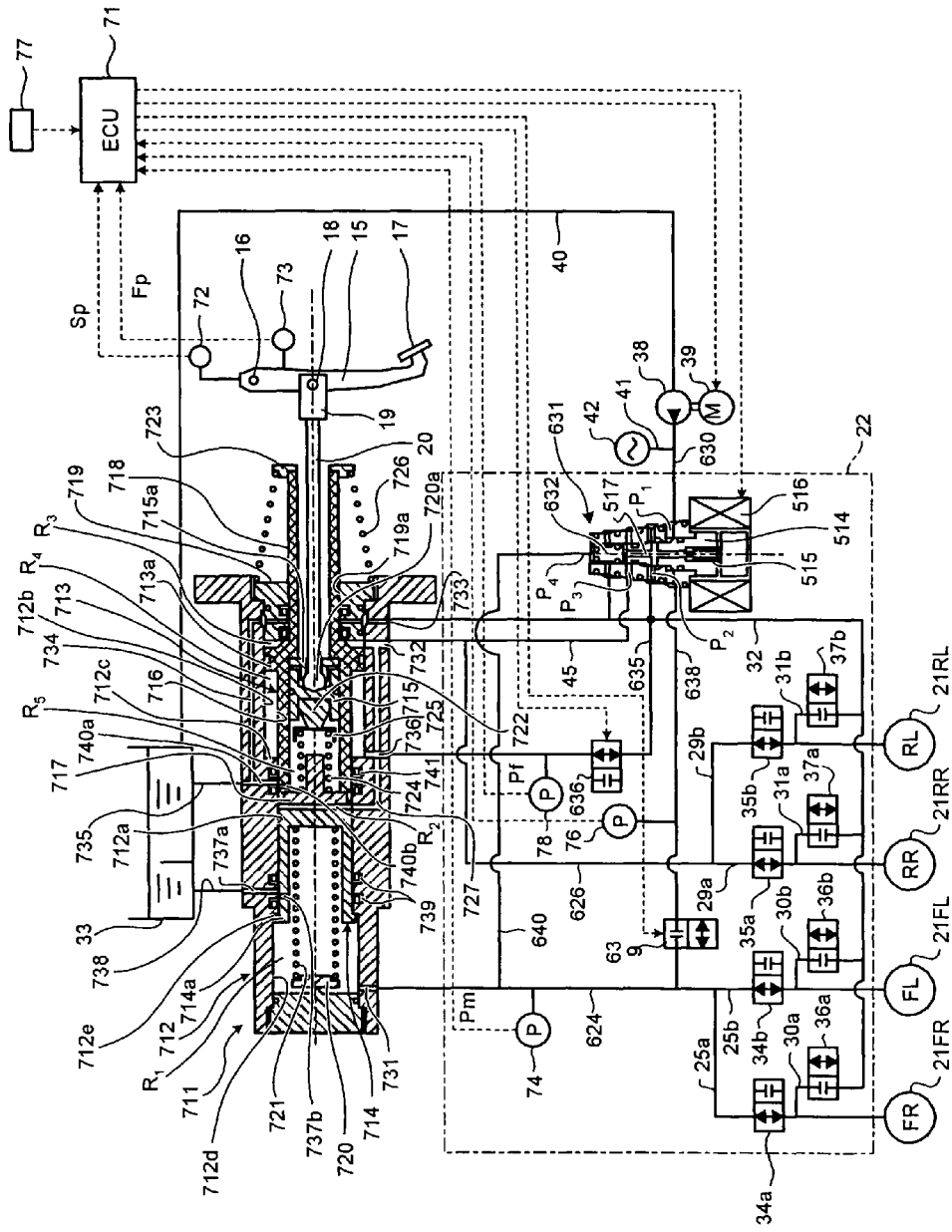
FIG. 11 is a schematic configuration diagram showing a brake apparatus for a vehicle according to an eighth embodiment of the invention.

FIG. 11 is a schematic configuration diagram showing a brake apparatus for a vehicle according to an eighth embodiment of the invention. The same reference numerals are designated to members having functions similar to those of the foregoing embodiments and repetitive description will not be given.

In the brake apparatus for a vehicle of the eighth embodiment, as shown in FIG. 11, a master cylinder 711 is constructed so that a backup piston 713 and a pressure piston 714 are disposed in series in a cylinder 712 and supported movably in the axial direction, and an input piston 715 is supported in the backup piston 713 so as to be movable in the axial direction.

The backup piston 713 is constructed by a body 116 positioned in the cylinder 712 and having a cylindrical shape, a lid 717 fixed to one end in the axial direction of the body 716, and a support part 718 projected from the other end in the axial direction of the body 717 and having a cylindrical shape. The outer peripheral face of the body 716 of the backup piston 713 engages with the first inner peripheral face 712a of the cylinder 712 and is supported movably in the axial direction. A flange 713a having a disc shape is integrally formed with the outer periphery on the base end side of the body 716 of the backup piston 713. The outer peripheral face of the flange 713a engages with a second inner peripheral face 712b having a diameter larger than that of the first inner peripheral face 712a of the cylinder 712, and is supported movably in the axial direction. Further, in the backup piston 713, a support part 718 is movably fit in a through hole 719a in the support part 719. When the flange 713a comes into contact with a step portion 712c between the first and second inner peripheral faces 712a and 712b, the stroke on the forward travel side is regulated. When the flange 713 comes into contact with the support part 719, the stroke on the backward travel side is regulated.

The pressure piston 714 is disposed on the front end side more than the backup piston 713 in the cylinder 712, and its outer peripheral face is movably supported by the inner peripheral face 712a of the cylinder 712. A flange 714a is formed integrally with the pressure piston 714, and the outer peripheral face of the flange 714a is supported movably in a third inner peripheral face 712d of the cylinder 712. When the flange 714a comes into contact with the bottom or a step portion 712e in the cylinder 712, the stroke of the pressure piston 714 is regulated. The pressure piston 714 is energized and supported in a position where the flange 714a is in contact with the step portion 712e by the energizing force of an energizing spring 721 interposed between the pressure piston 714 and the support plate 720.

The input piston 715 has a cylindrical shape. A press member 722 is fixed at the tip of the input piston 715. The outer peripheral face of the input piston 715 engages with the inner peripheral face of the backup piston 713. The input piston 715 is supported movably in the axial direction. An energizing spring 724 is interposed between the lid 717 of the backup piston 713 and the support plate 725. The input piston 715 is energized so as to be apart from the backup piston 713 and is energized and supported in a position where it is in contact with the step portion 713b in the backup piston 713.

On the other hand, the operation rod 20 is coupled to the brake pedal 15. The tip of the operation rod 20 passes through the backup piston 713 and enters the input piston 715. A coupling part 720a is retained by a retaining part 715a, thereby coupling the operation rod 20 to the input piston 715. An energizing spring 726 is interposed between the cylinder 712 (support member 719) and a support plate 723 of the backup piston 713.

Therefore, when the pedal 17 is stepped on, the brake pedal 15 swings around the support shaft 16 as a fulcrum, the operation force (pedal stroke) is transmitted to the input piston 715 via the operation rod 20, and the input piston 715 can move forward against the energizing force of the energizing springs 724 and 726. In this case, when the driver steps on the brake pedal 15, the input piston 715 moves forward via the operation rod 20, and the press member 722 moves forward against the energizing force of the energizing spring 724. Therefore, a stroke simulator (operation force absorbing mechanism) is constructed by the press member 722, the energizing spring 724, and the like.

As described above, by disposing the backup piston 713, the pressure piston 714, and the input piston 715 in the cylinder 712 coaxially and movably relative to each other, the front pressure chamber $R_1$, the rear pressure chamber $R_2$, the circulating pressure chamber $R_3$, the reaction force chamber $R_4$, and the pressure absorption chamber $R_5$ are defined. The rear pressure chamber $R_2$ and the circulating pressure chamber $R_3$ are communicated with each other via a communication path 727 formed in the cylinder 12.

On the other hand, the front wheels FR and FL and the rear wheels RR and RL are provided with the wheel cylinders 21FR, 21FL, 21RR, and 21RL which can be operated by the ABS 22. To a first pressure port 731 communicated with the front pressure chamber $R_1$ in the master cylinder 711, the first hydraulic pipe 624 is coupled. The second hydraulic pipe 626 is coupled to a second pressure port 732 communicated with the circulating pressure chamber $R_3$ in the master cylinder 711. The third hydraulic pipe 32 is coupled to a fourth pressure port 733 in the master cylinder 711 and is coupled from a fifth pressure port 734 to the reservoir tank 33 via a hydraulic pressure supply/discharge pipe 735. The fourth hydraulic pipe 635 is coupled to a third pressure port 736 communicated with the reaction force chamber $R_4$ in the master cylinder 711.

Return ports 737a and 737b communicated with the forward pressure chamber $R_1$ are formed in the master cylinder 711 and coupled to the reservoir tank 33 via a return pipe 738. In this case, one-way seals 739 are attached before and after the return port 737a in the cylinder 712. Further, supply/discharge ports 740a and 740b communicated with the pressure absorption chamber $R_5$ are formed in the master cylinder 711, and are coupled to the reservoir tank 33 via the hydraulic supply/discharge pipe 735. In this case, one-way seals 741 are attached before and after the supply/discharge port 740a in the cylinder 712.

In the embodiment, the pressure absorption chamber (operation force absorption chamber) $R_5$ is defined between the backup piston 713 and the input piston 715. When the backup piston 713 is held in a backward position where the backup piston 713 is in contact with the support member 719, the pressure absorption chamber $R_5$ is communicated with the reservoir tank 33 via the hydraulic supply/discharge pipe 735 from the supply/discharge ports 740a and 740b. Consequently, when the brake pedal 15 is stepped on and the input piston 715 moves forward, the volume of the pressure absorption chamber $R_5$ decreases, and the hydraulic pressure is discharged to the reservoir tank 33, so that the operation force of the brake pedal 15 is absorbed. On the other hand, when the brake pedal 15 is stepped on and the input piston 715 moves forward in a state where holding of the backup piston 713 is cancelled, the backup piston 713 moves forward together with the input piston 715. The supply/discharge port 740b of the backup piston 713 is deviated from the supply/discharge port 740a of the cylinder 712, and they do not communicate with each other. Therefore, the volume of the pressure absorption chamber $R_5$ does not decrease, and the operation force of the brake pedal 15 is transmitted to the backup piston 713 via the input piston 715 without being absorbed.

Since the ABS 22 of the embodiment is similar to that of the foregoing seventh embodiment, the description will not be repeated.

Therefore, the ECU 71 sets a target control pressure Pmt on the basis of a pedal effort (or the pedal stroke Sp detected by the stroke sensor 82) on the brake pedal 15 detected by the pedal effort sensor 73, drives the drive valve 514 in the pressure control valve 631, on the other hand, feeds back the control pressure Pm detected by the first pressure sensor 74, and performs a control so that the target control pressure Pmt and the control pressure Pm match each other. In this case, the ECU 71 has a control map indicating the target control pressure Pmt in correspondence with the pedal effort Fp, and controls the pressure control valve 631 on the basis of the control map.

At the time of normal operation of the power supply system for operating the pressure control valve 631 and the reaction force control valve 636, the pressure control valve 631 is controlled to adjust the output hydraulic pressure, and supply/discharge of the hydraulic pressure to/from the reaction force chamber $R_4$ is regulated (stopped) by the reaction force control valve 636. When the brake pedal 15 is stepped on by the driver, the input piston 715 moves forward via the operation rod 20, and the backup piston 713 is pressed and moved. In this case, the fourth hydraulic pipe 635 extending from the reaction force chamber $R_4$ to the reaction force control valve 636 through the third pressure port 736 is a closed circuit. Therefore, when the backup piston 713 moves forward slightly, the hydraulic pressure in the rear pressure chamber $R_2$ flows in the circulating pressure chamber $R_3$ via the communication path 112, the input piston 715 moves forward relative to the backup piston 713, and the hydraulic pressure of the pressure absorption chamber $R_5$ is discharged to the reservoir tank 33.

On the other hand, when the power supply system fails, the pressure control valve 631 cannot be electrically controlled, and supply/discharge of the hydraulic pressure to/from the reaction chamber $R_4$ is permitted (enabled) by the reaction force control valve 636. When the brake pedal 15 is stepped on by the driver, the input piston 715 moves forward via the operation rod 20. Since the reaction force control valve 636 is in an open state, the backup piston 713 is pushed, and the hydraulic pressure in the reaction chamber $R_4$ is discharged from the third pressure port 736 to the reservoir tank 33 via the reaction force control valve 636. The backup piston 713 moves forward and presses the pressure piston 714.

In the normal operation of the power supply system, supply/discharge of the hydraulic pressure to/from the reaction chamber $R_4$ is regulated by the reaction force control valve 636, and the control pressure acts on the rear pressure chamber $R_2$ from the accumulator 42 via the pressure control valve 631. Therefore, even when the brake pedal 15 is stepped on by the driver, the backup piston 713 does not move forward largely. In this case, when the backup piston 713 is held for a long period in a position where it is contact with the support member 719, there is the possibility that the seal member and the like repeats thermal expansion due to temperature changes in the master cylinder 711 and the brake hydraulic pressure and are fixed.

In the embodiment, in the normal operation of the power supply system, the backup piston 713 determines an operation state of the master cylinder 711 in which the backup piston 713 operates. At this time, poor operation of the backup piston 713 is determined on the basis of the hydraulic pressure of the reaction force chamber $R_4$. That is, when the brake pedal 15 is stepped down, the input piston 715 moves forward via the operation rod 20 ad the backup piston 713 is pressed. Consequently, the backup piston 713 slightly moves forward, and the hydraulic pressure of the reaction force chamber $R_4$ fluctuates, so that poor operation of the backup piston 713 can be determined on the basis of the hydraulic pressure in the reaction force chamber $R_4$.

In this case, the oil passage areas in the master cylinder 711 have to be set so as to satisfy the following conditions. The hydraulic pressure of the accumulator 42 is adjusted by the pressure control valve 631, a brake pressure acting on the rear pressure chamber $R_2$ and the circulating pressure chamber $R_3$ in the master cylinder 711 via the control pressure supply pipe 45 is expressed as Pb, the reaction force hydraulic pressure in the reaction force chamber $R_4$ detected by the second pressure sensor 75 is expressed as Pf, the pedal effort detected by the pedal effort sensor 73 is expressed as Fp, front brake pressure area in the backup piston 713 is expressed as Abf, rear brake pressure area is expressed as Abr, and the area of the reaction force chamber $R_4$ is expressed as Afi. When the oil passage area of the first inner peripheral face 712a of the cylinder 712 in the master cylinder 711 is A1, that of the second inner peripheral face 712b is A2, and that of the through hole 719a through which the backup piston 713 penetrates is A3, the following relations are satisfied.

Front brake pressure area Abf=A1

Rear brake pressure area $Abr=A2-A3$

Area Afi of reaction force chamber $R_4=A2-A1$

The conditions that, when the brake pedal 15 is stepped down, the backup piston 713 moves and the hydraulic pressure in the reaction force chamber $R_4$ increases are expressed by the following equation.

$Fp+Pb \times Abr > Pb \times Abf$

That is, it is sufficient that the operation force equal to or larger than the pressure of fixing the backup piston 713 is entered from the brake pedal 15. The reaction force hydraulic pressure Pf in the reaction chamber $R_4$ can be obtained by the following equation.

$PF=(Fp+Pb \times Abr-Pb \times Abf)/Afi$

A braking force control in the brake apparatus for a vehicle in the embodiment will be described concretely. When the driver steps on the brake pedal 15, the input piston 715 moves forward by the operation force via the operation rod 20 against the energizing force of the energizing spring 726. Although supply/discharge of the hydraulic pressure to/from the reaction force chamber $R_4$ is stopped by the reaction force control valve 636, since the rear pressure chamber $R_2$ and the circulating pressure chamber $R_3$ are communicated with each other via the communication path 727, the hydraulic pressure in the rear pressure chamber $R_2$ flows in the circulating pressure chamber $R_3$ via the communication path 727, the backup piston 713 moves forward slightly, and the press member 722 makes the energizing spring 724 bend, thereby absorbing the operation force.

When the brake pedal 15 is stepped on, the pedal effort sensor 73 detects the pedal effort Fp, and the ECU 71 sets the target control pressure Pmt on the basis of the pedal effort Fp. The ECU 71 controls the pressure control valve 631 on the basis of the target control pressure Pmt to output a predetermined control pressure.

Specifically, in the pressure control valve 631, current is passed to the solenoid 516, and the drive valve 514 is moved downward by the electromagnetic force generated against the energizing force of the return spring 515. The high-pressure port 21 and the control pressure port $P_3$ are communicated with each other through the communication path 517 in the drive valve 514. On the other hand, the pressure reduction port $P_2$ and the control pressure port $P_3$ are interrupted. Consequently, the hydraulic pressure of the accumulator 42 is supplied from the high-pressure supply pipe 630 to the high pressure port $P_1$, flows to the control pressure port $P_3$ via the communication path 517, and supplied from the control pressure port $P_3$ to the second hydraulic pipe 626 via the control pressure supply pipe 45. The hydraulic pressure supplied to the second hydraulic pipe 626 passes from the second pressure port 732 in the master cylinder 711 via the communication path 727, acts on the rear pressure chamber $R_2$, and assists the pressure piston 714. Therefore, the pressure piston 714 presses the front pressure chamber $R_1$, and proper control hydraulic pressure is discharged from the front pressure chamber $R_1$ to the first hydraulic pipe 624.

Therefore, the control pressure is applied from the first hydraulic pipe 624 to the wheel cylinders 21FR and 21FL of the front wheels FR and FL, and the control pressure is applied from the second hydraulic pipe 626 to the wheel cylinders 21RR and 21RL of the rear wheels RR and RL. The braking force according to the operation on the brake pedal 15 of the driver can be generated for the front wheels FR and FL and the rear wheels RR and RL.

At this time, by closing the reaction force control valve 636, the brake pedal 15 is stepped on in a state where the fourth hydraulic pipe 635 from the reaction force chamber $R_4$ to the reaction force control valve 636 through the third pressure port 736 is closed. The ECU 71 determines whether the hydraulic pressure Pf in the reaction force chamber $R_4$ detected by the pressure sensor 78 has been increased or not.

When it is determined that the hydraulic pressure Pf of the reaction force chamber $R_4$ has increased, the ECU 71 determines that the backup piston 713 is not fixed but normally operates. On the other hand, when it is determined that the hydraulic pressure Pf of the reaction force chamber $R_4$ has not increased, the ECU 71 determines that the backup piston 713 is fixed and does not normally operate, and turns on a warning lamp.

In such a manner, poor operation of the backup piston 713 can be easily determined on the basis of the rise in the hydraulic pressure in the reaction force chamber $R_4$ at the time of brake operation in the normal operation of the power supply system.

In the case where a failure occurs in the power supply system, the reaction force control valve 636 does not pass current to the fourth hydraulic pipe 635 coupled to the third pressure port 736 of the reaction force chamber $R_4$, and the fourth hydraulic pipe 635 is open and communicated with the reservoir tank 33.

Consequently, when the driver steps on the brake pedal 15 at the time of a failure in the power supply system, the input piston 715 is moved forward by the operation force via the operation rod 20 against the energizing force of the energizing spring 726. Since the supply/discharge of the hydraulic pressure to/from the reaction force chamber $R_4$ by the reaction force control valve 636 is permitted, the backup piston 713 moves forward together with the input piston 715. In this case, when the backup piston 713 moves forward by a predetermined stroke, the supply/discharge port 737a of the cylinder 712 is deviated from the supply/discharge port 737b of the backup piston 713, and the hydraulic pressure in the pressure absorption chamber $R_5$ is not discharged to the reservoir tank 33. Consequently, the input piston 715 can properly move the backup piston 713.

When the backup piston 713 moves forward together with the input piston 715, the backup piston 713 presses the press piston 714, the pressure piston 714 moves forward, and the front pressure chamber $R_1$ is pressurized, so that the hydraulic pressure in the front pressure chamber $R_1$ is discharged to the first hydraulic pipe 624. The hydraulic pressure discharged from the front pressure chamber $R_1$ to the first hydraulic pipe 624 acts as an external pressure on the external port $P_4$ of the pressure control valve 631 through the external pressure supply pipe 640, thereby moving the external piston 632 downward and moving the drive valve 514 downward. In a manner similar to the above, the high-pressure port $P_1$ and the control pressure port $P_3$ become communicated with each other via the communication path 517 in the drive valve 514. The hydraulic pressure of the accumulator 42 is adjusted by the pressure control valve 631 and the adjusted pressure is supplied to the second hydraulic pipe 626 through the control pressure supply pipe 45, acts on the rear pressure chamber $R_2$ in the master cylinder 711, and assists the pressure piston 714.

Therefore, even when the power supply system fails, the control pressure is applied from the first hydraulic pipe 724 to the wheel cylinders 21FR and 21FL of the front wheels FR and FL, and the control pressure is applied from the second hydraulic pipe 626 to the wheel cylinders 21RR and 21RL of the rear wheels RR and RL. Thus, the braking force according to the operation force on the brake pedal 15 of the driver can be generated to the front wheels FR and FL and the rear wheels RR and RL.

As described above, in the brake apparatus for a vehicle of the eighth embodiment, by movably supporting the backup piston 713, the pressure piston 714, and the input piston 715 in the cylinder 712, the front pressure chamber $R_1$, the rear pressure chamber $R_2$, the circulating pressure chamber $R_3$, the reaction force chamber $R_4$, and the pressure absorption chamber $R_5$ are defined. The rear pressure chamber $R_2$ and the circulating pressure chamber $R_3$ are communicated with each other via the communication path 727. The pressure control valve 631 is provided, which can output a control pressure obtained by adjusting the hydraulic pressure from the accumulator 42 to the rear pressure chamber $R_2$ and the wheel cylinders 321 and 321RL. The reaction force control valve 636 for controlling supply/discharge of the hydraulic pressure to/from the reaction force chamber $R_4$ in accordance with the operation state of the master cylinder 711 is also provided.

Therefore, when the power supply system is normal, the ECU 71 sets the target control pressure Pmt according to the pedal effort Fp of the brake pedal 15 stepped on by the driver and controls the pressure control valve 631 on the basis of the target control pressure Pmt, thereby supplying the proper hydraulic pressure from the accumulator 42 to the rear pressure chamber $R_2$ by the pressure control valve 631 and assisting the pressure piston 714. The proper control pressure can be supplied to each of the hydraulic pipes 624 and 626. The control oil is made act on the wheel cylinders 21FR, 21FL, 21RR, and 21RL via the ABS 22, and proper braking force according to the operation force of the brake pedal 15 of the driver for the front wheels FR and FL and the rear wheels RR and RL can be generated.

On the other hand, when a failure occurs in the power supply system, supply/discharge of the hydraulic pressure to/from the reaction force chamber $R_4$ is permitted by the reaction force control valve 636. Therefore, when the driver steps on the brake pedal 15, the backup piston 713 moves forward and presses the pressure piston 714. By the pressure piston 714, the front pressure chamber $R_1$ is pressurized and the hydraulic pressure is output. Using the hydraulic pressure as an external pressure, the pressure control valve 631 can be operated. In a manner similar to the above, the control hydraulic pressure is made act on the wheel cylinders 21FR, 21FL, 21RR, and 21RL via the ABS 22, and the proper braking force according to the operation force of the brake pedal 15 of the driver can be generated for the front wheels FR and FL and the rear wheels RR and RL.

Since the pressure reception area $a_{11}$ of the first pressure chamber $R_{11}$ on the front side of the external piston 632 is set to be larger than the pressure reception area $a_{12}$ of the second pressure chamber $R_{12}$ on the rear side in the pressure control valve 631, by introducing the hydraulic pressure lower than that of the front pressure chamber $R_1$ into the circulating pressure chamber $R_3$ from the pressure control valve 631, the servo ratio is set to be high, the operation reaction force can be assured, and safety can be improved.

In the brake apparatus for a vehicle of the eighth embodiment, in normal operation of the power supply system, supply/exhaust of the hydraulic pressure to/from the reaction force chamber $R_4$ is stopped by the reaction force control valve 636. On the basis of rise in the hydraulic pressure in the reaction force chamber $R_4$ detected by the second pressure sensor 75, locking (poor operation) of the backup piston 713 is determined. Therefore, the poor operation of the backup piston 713 can be easily determined on the basis of the hydraulic pressure of the reaction force chamber $R_4$ during brake operation in the normal operation of the power supply system.

Although the case of applying the pressure control valve of the present invention to a spool-type three-way valve has bee described in the foregoing embodiments, also when the pressure control valve is applied to a poppet-type three-way valve, effects similar to those in the above description can be produced.

INDUSTRIAL APPLICABILITY

As described above, the brake apparatus for a vehicle of the present invention is directed to assure a proper braking force by enabling hydraulic pressure to be supplied to a wheel cylinder even when a power supply unit fails and can be suitably used as a brake apparatus of any kind.

The invention claimed is:

1. A brake apparatus for a vehicle comprising:
an operation member on which a braking operation is performed by an occupant;
a master cylinder in which a front pressure chamber and a rear pressure chamber are defined by movably supporting a drive piston in a cylinder and which can output a hydraulic pressure in the front pressure chamber by moving the drive piston by the operation member;
a control pressure setting unit for setting a target control pressure according to an operation force input from the operation member to the drive piston;
a hydraulic pressure supplying source;
a wheel cylinder coupled to the front pressure chamber and generating a braking force to a wheel; and
a pressure control valve capable of adjusting a hydraulic pressure from the hydraulic pressure supplying source by moving a drive valve by an electromagnetic force on the basis of the target control pressure, outputting the adjusted hydraulic pressure to the rear pressure chamber and the wheel cylinder, adjusting a hydraulic pressure from the hydraulic pressure supplying source by moving the drive valve by an external piston which is moved by the hydraulic pressure from the front pressure chamber, and outputting the adjusted hydraulic pressure to the rear pressure chamber and the wheel cylinder.

2. The brake apparatus for a vehicle according to claim 1, wherein the pressure control valve has a hollow-shaped housing provided with a high-pressure port, a pressure reduction port, a control pressure port, and an external pressure port,
the high-pressure port is coupled to the hydraulic pressure supplying source,
the pressure reduction port is coupled to a reservoir tank,
the control pressure port is coupled to the rear pressure chamber,
the external pressure port is coupled to the front pressure chamber,
the drive valve and the external piston are supported in series in the housing so as to be movable relative to each other,
the drive valve is supported so as to be energized in a direction of interrupting the high-pressure port and the control pressure port,
the pressure reduction port and the control pressure port are interrupted and the high-pressure port and the control pressure port are allowed to be communicated with each other by moving the drive valve with an electromagnetic force,
the pressure reduction port and the control pressure port are communicated with each other and the high-pressure port and the control pressure port can be interrupted by reducing the electromagnetic force of the solenoid and decreasing drive force of the drive valve, and
the pressure reduction port and the control pressure port are interrupted and the high-pressure port and the control pressure port can be communicated with each other by moving the drive valve via the external piston by a hydraulic pressure from the front pressure chamber.

3. The brake apparatus for a vehicle according to claim 1, wherein the drive piston has a step portion, and pressure reception area of the front pressure chamber is set to be larger than pressure reception area of the rear pressure chamber.

4. The brake apparatus for a vehicle according to claim 1, wherein the hydraulic pressure supplying source has an accumulator.

5. The brake apparatus for a vehicle according to claim 1, wherein the drive piston has an input piston and a pressure piston disposed in series in a cylinder,
an operation force on the operation member can be entered to the input piston,
the front pressure chamber is defined in front of the pressure piston,
the rear pressure chamber is defined between the input piston and the pressure piston,
a reaction force chamber is defined for the input piston, and
the hydraulic pressure supplying source is coupled to the reaction force chamber via a reaction control valve.

6. The brake apparatus for a vehicle according to claim 1, wherein the wheel cylinder on a front wheel side is coupled to the front pressure chamber, and the wheel cylinder on a rear wheel side is coupled to the rear pressure chamber.

7. The brake apparatus for a vehicle according to claim 1, wherein a hydraulic pressure adjusted by the pressure control valve is output to the rear pressure chamber, thereby enabling a hydraulic pressure in the front pressure chamber to be output to first and second wheel cylinders, and a hydraulic line coupling the first and second wheel cylinders is provided with an open/close valve.

8. The brake apparatus for a vehicle according to claim 7, wherein the hydraulic line coupling the first and second wheel cylinders is provided with the open/close valve and a power separating mechanism.

9. The brake apparatus for a vehicle according to claim 1, wherein a hydraulic line coupling the front pressure chamber and the wheel cylinder is provided with a master cut valve,
- a hydraulic pressure adjusted by the pressure control valve can be output to the wheel cylinder when the master cut valve is closed,
- the hydraulic pressure in the front pressure chamber can be output to the wheel cylinder when the master cut valve is opened, and
- a hydraulic pressure adjusted by the pressure control valve can be output to the rear pressure chamber and the wheel cylinder.

10. The brake apparatus for a vehicle according to claim 9, wherein a hydraulic line coupling the rear pressure chamber and a reservoir tank is provided with a negative pressure preventing valve.

11. The brake apparatus for a vehicle according to claim 9, wherein a hydraulic line coupling the front pressure chamber and the rear pressure chamber is provided with a negative pressure preventing valve.

12. The brake apparatus for a vehicle according to claim 9, wherein the hydraulic line coupling the front pressure chamber and the pressure control valve is provided with an open/close valve.

13. The brake apparatus for a vehicle according to claim 3, wherein the external piston has a step portion, and pressure reception area of a first pressure chamber defined between the external piston and the drive valve on the front side of the external piston is set to be smaller than pressure reception area of a second pressure chamber on which a hydraulic pressure from the front pressure chamber acts on the rear side of the external piston.

14. The brake apparatus for a vehicle according to claim 1, wherein the drive piston has an input piston and a pressure piston disposed in series in a cylinder,
- an operation force on the operation member can be entered to the input piston,
- the front pressure chamber is defined in front of the pressure piston,
- the rear pressure chamber is defined between the input piston and the pressure piston,
- a communication path for communicating the front pressure chamber and the rear pressure chamber with each other is provided,
- a closing member for closing the communication path when the input piston approaches the pressure piston is provided,
- the external piston has a step portion, and
- pressure reception area of the first pressure chamber defined between the external piston and the drive valve in front of the external piston is set to be larger than pressure reception area of a second pressure chamber on which a hydraulic pressure from the front pressure chamber acts on the rear side of the external piston.

15. The brake apparatus for a vehicle according to claim 1, wherein the drive piston has an input piston and a pressure piston disposed in series in a cylinder,
- an operation force on the operation member can be entered to the input piston,
- the front pressure chamber is defined in front of the pressure piston,
- the rear pressure chamber is defined between the input piston and the pressure piston,
- a hydraulic pressure can be supplied to the front pressure chamber and the rear pressure chamber from the pressure control valve,
- the external piston has a step portion, and
- pressure reception area of a first pressure chamber defined between the external piston and the drive valve on the front side of the external piston is set to be larger than pressure reception area of a second pressure chamber on which the hydraulic pressure from the front reaction chamber acts on the rear side of the external piston.

* * * * *